US006431448B1

(12) United States Patent
Nelson et al.

(10) Patent No.: US 6,431,448 B1
(45) Date of Patent: Aug. 13, 2002

(54) KEYED DATA-AND-PRINT ALBUM PAGE

(75) Inventors: David J. Nelson; Jose A. Rosario, both of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/568,884

(22) Filed: May 11, 2000

(51) Int. Cl.$^7$ .................................................. G06K 7/10

(52) U.S. Cl. .................... 235/462.13; 235/462; 402/79; 396/310

(58) Field of Search ............................ 235/462.13, 462; 402/79; 396/310

(56) References Cited

U.S. PATENT DOCUMENTS

| | | | | |
|---|---|---|---|---|
| 4,460,637 | A | 7/1984 | Miamoto et al. | 428/212 |
| 4,555,437 | A | 11/1985 | Tanck | 428/212 |
| 4,603,262 | A | 7/1986 | Eastman et al. | 250/566 |
| 4,642,247 | A | 2/1987 | Mouri et al. | 427/214 |
| 4,652,750 | A | 3/1987 | Eastman et al. | 250/239 |
| 4,695,288 | A | 9/1987 | Ducharme | 8/471 |
| 4,700,207 | A | 10/1987 | Vanier et al. | 503/227 |
| 4,741,969 | A | 5/1988 | Hayama et al. | 428/514 |
| 4,891,351 | A | 1/1990 | Byers et al. | 503/227 |
| 4,956,230 | A | 9/1990 | Edwards et al. | 428/341 |
| 5,059,126 | A | 10/1991 | Kimball | 434/308 |
| 5,093,147 | A | 3/1992 | Andrus et al. | 427/7 |
| 5,198,306 | A | 3/1993 | Kruse | 428/481 |
| 5,227,498 | A | 7/1993 | Lee et al. | 549/404 |
| 5,227,499 | A | 7/1993 | McGowan et al. | 549/404 |
| 5,276,472 | A | 1/1994 | Bell et al. | 354/76 |
| 5,286,286 | A | 2/1994 | Winnik et al. | 106/21 |
| 5,313,235 | A | 5/1994 | Inoue et al. | 354/76 |
| 5,314,336 | A | 5/1994 | Diamond et al. | 434/169 |
| 5,319,182 | A | 6/1994 | Havens et al. | 235/462 |
| 5,516,590 | A | 5/1996 | Olmstead et al. | 428/484 |
| 5,541,633 | A | 7/1996 | Winnik et al. | 347/98 |
| 5,684,069 | A | 11/1997 | Auslander | 524/88 |
| 5,695,918 | A | 12/1997 | Gray et al. | 430/522 |
| 5,714,245 | A | 2/1998 | Atherton et al. | 428/323 |
| 5,755,860 | A | 5/1998 | Zhu | 106/31.15 |
| 5,766,324 | A | 6/1998 | Ikegaya et al. | 106/31.15 |
| 5,791,692 | A | 8/1998 | Manico et al. | 283/67 |
| 6,139,210 | A | * 10/2000 | Nelson et al. | 402/79 |
| 6,148,173 | A | * 11/2000 | Bell | 434/309 |
| 6,163,656 | A | * 12/2000 | Yoshioka | 396/429 |
| 6,202,061 | B1 | * 3/2001 | Khosla et al. | 707/3 |
| 6,229,964 | B1 | * 6/2001 | Bell | 396/310 |

FOREIGN PATENT DOCUMENTS

| | | | |
|---|---|---|---|
| EP | 0 764 877 A1 | | 3/1997 |
| JP | 165789 | * | 6/2000 |
| WO | WO 96/35142 | | 11/1996 |

* cited by examiner

*Primary Examiner*—Karl D. Frech
*Assistant Examiner*—Allyson Sanders
(74) *Attorney, Agent, or Firm*—Robert Luke Walker

(57) ABSTRACT

A keyed data-and-print album page has a receiver having an array of image spaces, a plurality of invisible printed encodements, and a visible key. The image spaces each have a visible boundary. The encodements each have a margin. The encodements each at least partially overlap at least one of the image spaces. The margins are each in registration with at least one of the boundaries. The key indicates the relative geometry of the boundaries of the visible image spaces and the margins of the invisible encodements.

21 Claims, 21 Drawing Sheets

KEYED DATA-AND-PRINT ALBUM PAGE

CROSS REFERENCE TO RELATED APPLICATIONS

Reference is made to commonly assigned, co-pending U.S. patent application Ser. No. 09/568,881, entitled: METHOD AID COMPUTER PROGRAM FOR PREPARING ALBUM PAGES HAVING INVISIBLE DATA PATCHES, filed May 11, 2000, in the names of David J. Nelson and Jose A. Rosario.

FIELD OF THE INVENTION

The invention relates to photography and more particularly relates to keyed data-and-print album pages.

BACKGROUND OF THE INVENTION

Recent advances in magnetic storage on film and the availability of camera memory have opened the door to various possibilities for collecting and storing picture-taking data on photographic film and in film and digital cameras. Picture-taking data, recorded on a photographic print, has many uses. For example, the date, time, and location that the picture was taken can be used later in organizing prints. Advanced Photo System™ cameras currently collect some data that can be used to aid in photofinishing, and other data that can be placed on the backs of prints, or on an index print. Sound data is particularly useful, since the combination of both visual and audible information enhances the viewer's overall sensory experience and aids in the recollection of memories. The sound can have been recorded at the time that the photograph has been taken, or dictated as an annotation at a later time.

Data has been stored on or with prints in a variety of ways including, separated media, data-carrying picture holders, magnetic strips and other attachments, and printed information. Separated media, such as memory cards, tapes, and discs have high capacity, but also have high cost and risk of loss. Data-carrying picture holders, such as a talking photoalbums, have good capacity; but tend to be cumbersome and very costly. Magnetic strips and similar attachments require manipulation with a playback head or the like and require additional steps in the photofinishing chain or by the user to affix the strips to prints.

The most convenient data storage method is printing. Data can be in the form of words or symbols or can be provided in machine readable form as an encodement or symbology, such as a one- or two-dimensional bar code or other array of encoded data. Encodements provide a much greater storage density per unit area than words or symbols. The two-dimensional symbologies maximize the amount of information that can be encoded on a planar surface. Bar code symbols are formed from bars or elements that are typically rectangular in shape with a variety of possible widths. The specific arrangement of elements defines the character represented according to a set of rules and definitions specified by the encodement scheme used. The relative widths of the bars and the spaces between the adjacent bars is determined by the type of coding used, as is the actual size of the bars and spaces. The number of characters per inch represented by the bar code symbol is referred to as the density or resolution of the symbol. A number of different bar code symbologies exist including UPC/EAN, Code 39, Code 49, Code 128, Codabar, Interleaved 2 of 5, and PDF 417 used by Symbol Technologies, Inc., of Holtsville, N.Y., and the encodement scheme marketed as "PaperDisk" by Cobblestone Software, Inc., of Lexington, Mass. A wide variety of encodement readers are known. U.S. Pat. No. 4,603,262 discloses a simple, manually scanned reader for one-dimensional codes. More complex readers are needed for two-dimensional codes. These readers are held over the code, while the reader internally scans the code or captures an instantaneous two-dimensional image. A code can be read as a visible light image or as invisible radiation image. Some optical code readers illuminate visible bar codes with a beam of invisible or "nearly invisible" radiation and detect a resulting fluorescence or reflectance of an indicia. U.S. Pat. No. 4,603,262 and U.S. Pat. No. 4,652,750 teach reading a code by scanning with an invisible beam. U.S. Pat. No. 5,319,182 by Havens et. al., discusses the use of an integrated source-image sensor matrix in which an array of photonic devices can be configured to both emit light and detect light, for the purpose of reading indicia.

Machine readable encodements have been associated with images on media so that the sounds can be reproduced from the encodements. Such systems are shown, for example, in U.S. Pat. Nos. 5,276,472 and 5,313,235 in relation to photographic prints, and in U.S. Pat. Nos. 5,059,126 and 5,314,336 in relation to other objects or printed images.

The reverse side of photographic prints has often been used to store sound or other data because it does not interfere with the viewing of the print the way that front side storage schemes do; however, data printed on the backs of prints or on index prints is not conveniently available if the prints are placed in or are printed as album pages. Data can be printed in visible form on the front of prints, in a border or the like, but this can detract from the esthetics of the images on the prints. The size of a printed encodement is also limited by dimensions of the border.

It is possible to print data invisibly over a visible image. See U.S. Pat. Nos. 5,093,147; 5,286,286; 5,516,590; 5,541,633; 5,684,069; 5,755,860; and 5,766,324 for examples of differing dyes or inks that may be selected for thermal dye transfer printing or inkjet printing and which either absorb a selected impinging light wavelength or fluoresce in response to the impinging light radiation of emitted light beam. For reading, the encodement is illuminated using invisible electromagnetic radiation that is subject to modulation by the encodement. The resulting encodement radiation image is captured, decoded, and played back. The invisible radiation image is captured using a reader that is capable of capturing only invisible images within a selected band. The term "band" is used herein to refer to one or more contiguous or non-contiguous regions of the electromagnetic spectrum. The term "invisible" is used herein to describe material which is invisible or substantially invisible to the human eye when viewed under normal viewing conditions, that is, facing the viewer and under sunlight or normal room illumination such as incandescent lighting. The invisible encodement can be produced by development of a photographic mulsion layer, inkjet printing, thermal dye transfer printing or other printing ethod. (These procedures are also referred to generically herein as "invisible-rinting".)

Not all sound files or data files are the same size, when printed as n invisible encodement. The area taken up by the encodement varies with the mount of data and the storage density, which in turn is a finction of the resolving ower of the printing and detection equipment used. Digital sound files that are oderately compressed and of more than a second or two duration, represent relatively large printed encodements.

There is no space problem if an encodement is small relative to a related printed visible image. Large encodements are problematic, if for a given encodement format the encodement is unable to fit on the face of a related printed visible image. This is more complex problem if album pages are involved. Two types of album pages are "holder-type" album pages, in which printed sheets are held by a support, usually in pockets; and "image-type" album pages, in which multiple images are printed on a sheet that also acts as a support. U.S. Pat. No. 5,791,692 discloses an image-type album page. In any case, "album pages" as the term is used herein, have multiple images or sites for multiple images on each page. The visible images can have different sizes and shapes on a single album page. An album, that is a set of album pages held by a binding, can include pages having a variety of different groupings of sizes and shapes of visible images. These differences in sizes and shapes and groupings are appealing to users and can be required by different formats of photographic prints.

One solution to the problem of fitting data files on album pages, as invisible encodements, is to make all the encodements of a size that will fit on all the visible images, by cutting data files to length. This can be done with sound files, but is undesirable. With a set of sound files or other data files that are matched to a set of photographs, other issues arise. Not all of the data files may have the same value to the user. For example, some sound files in a set may be garbled or otherwise unusable. When sound files have been captured at the time of image capture, recording times and encodement sizes may differ and the relative value of the files to the user may be inverse to the length of the respective files, since the user is likely to record valued sounds for longer durations than sounds of little value. These issues make it impractical to treat all data files the same way for encodement printing.

Some encodement systems allow encodements to be printed in different area formats having different ratios of width to length. For example, the data provided in a square area can be reformatted to any of a variety of rectangular shapes. To differentiate from other types of encodements, data file encodements in which the area shape can be reformatted are referred to herein as "data patches".

Examples of encodement methods that produce data patches are schemes in accordance with Standard PDF 417 and the LS49042D Scanner System marketed by Symbol Technologies, Inc., of Holtsville, N.Y.; and the encodement scheme marketed as Paper Disk by Cobblestone Software, Inc., of Lexington, Mass.

Many encodements systems can be read by pointing a reader in an appropriate direction and then actuating the reader. With closely spaced encodements, some care in targeting may be required for play back of a desired encodement. With invisible data patches this becomes more problematic, particularly with data patches that are not limited to a fixed size and shape.

It is well known to provide separate or attached keys on maps, diagrams, and other collections of information.

It would thus be desirable to provide an improved album page that makes the reading of invisible data patches simple and easy.

SUMMARY OF THE INVENTION

The invention is defined by the claims. The invention, in its broader aspects, provides a keyed data-and-print album page has a receiver having an array of image spaces, a plurality of invisible printed encodements, and a visible key. The image spaces each have a visible boundary. The encodements each have a margin. The encodements each at least partially overlap at least one of the image spaces. The margins are each in registration with at least one of the boundaries. The key indicates the relative geometry of the boundaries of the visible image spaces and the margins of the invisible encodements.

It is an advantageous effect of at least some of the embodiments of the invention that a visible key is provided on the album page that shows the geometric relationship of the invisible data patches and visible image spaces.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
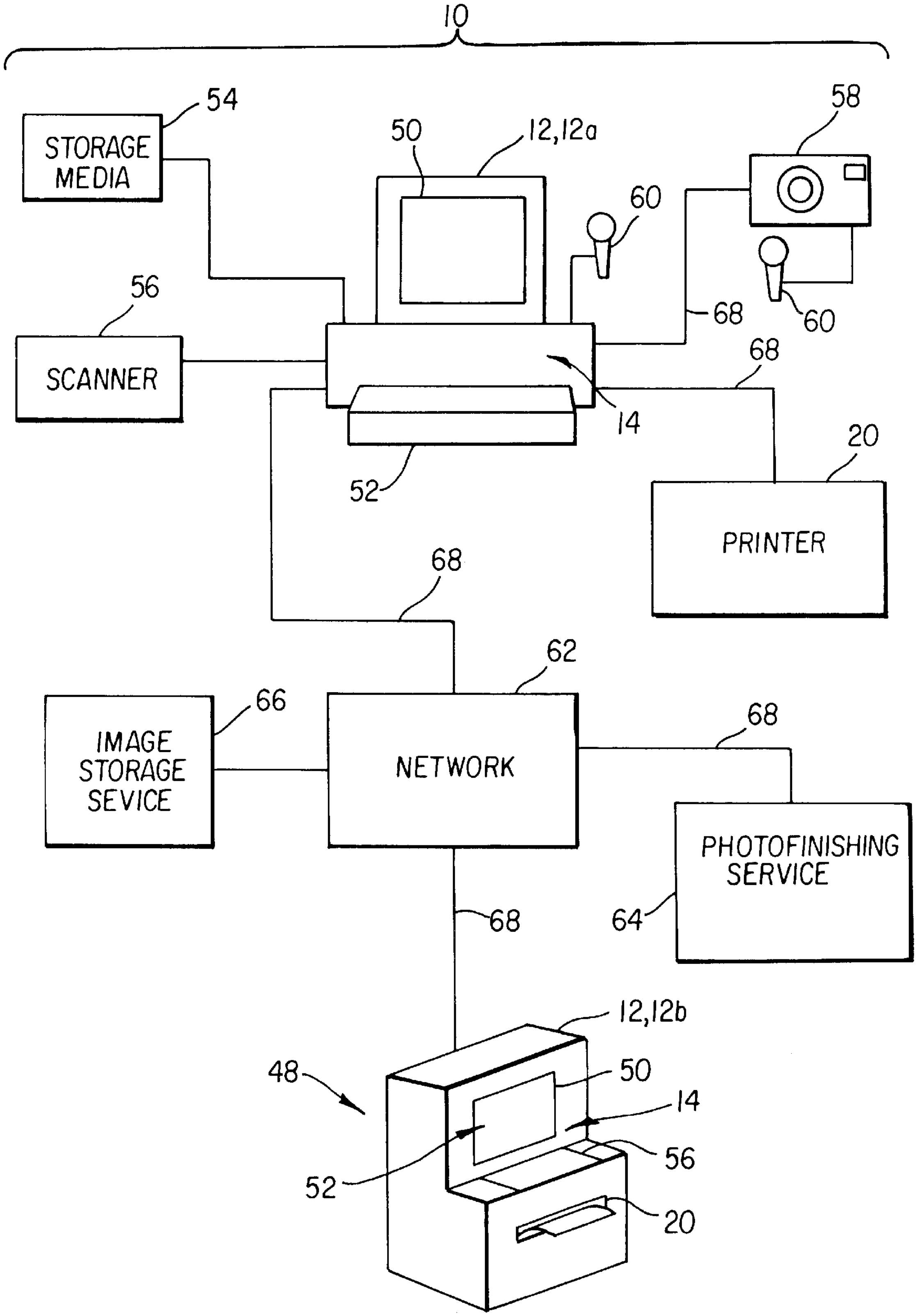
FIG. 1 is a diagrammatical view of an embodiment of the system of the invention.
Figure 2:
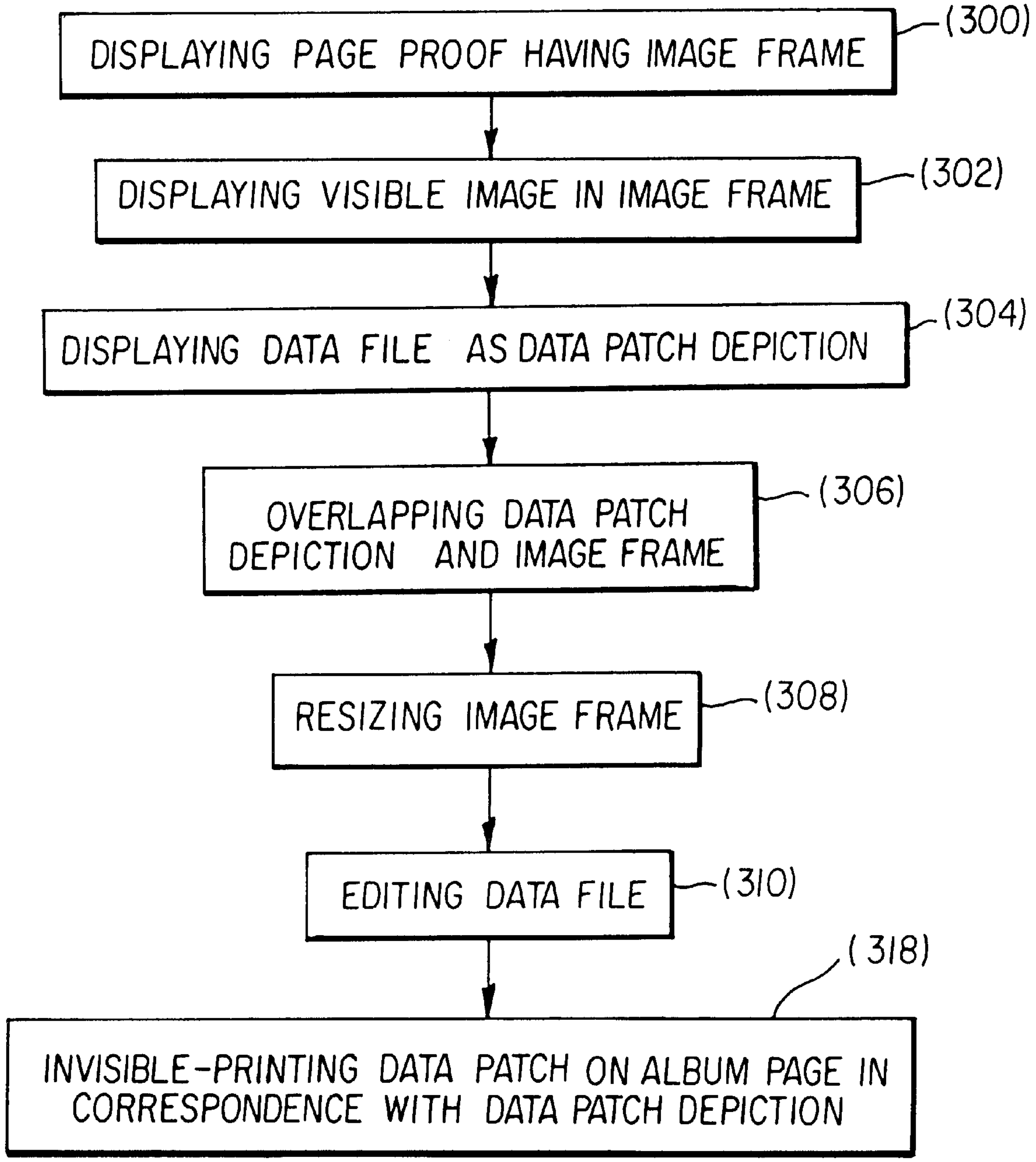
FIG. 2 is a flow chart of major features of an embodiment of the method.
Figure 3:
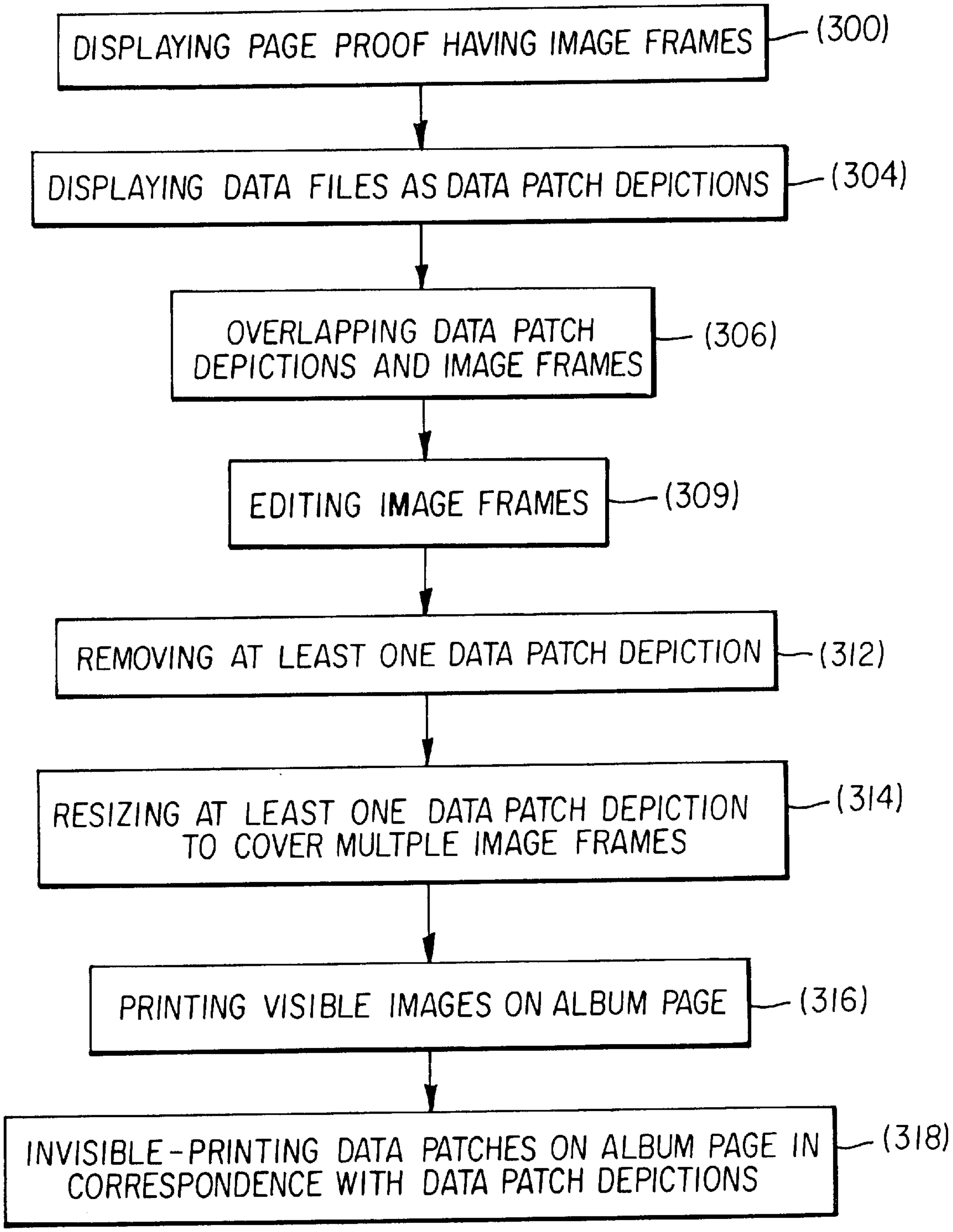
FIG. 3 is a flow chart of major features of another embodiment of the method.
Figure 4:
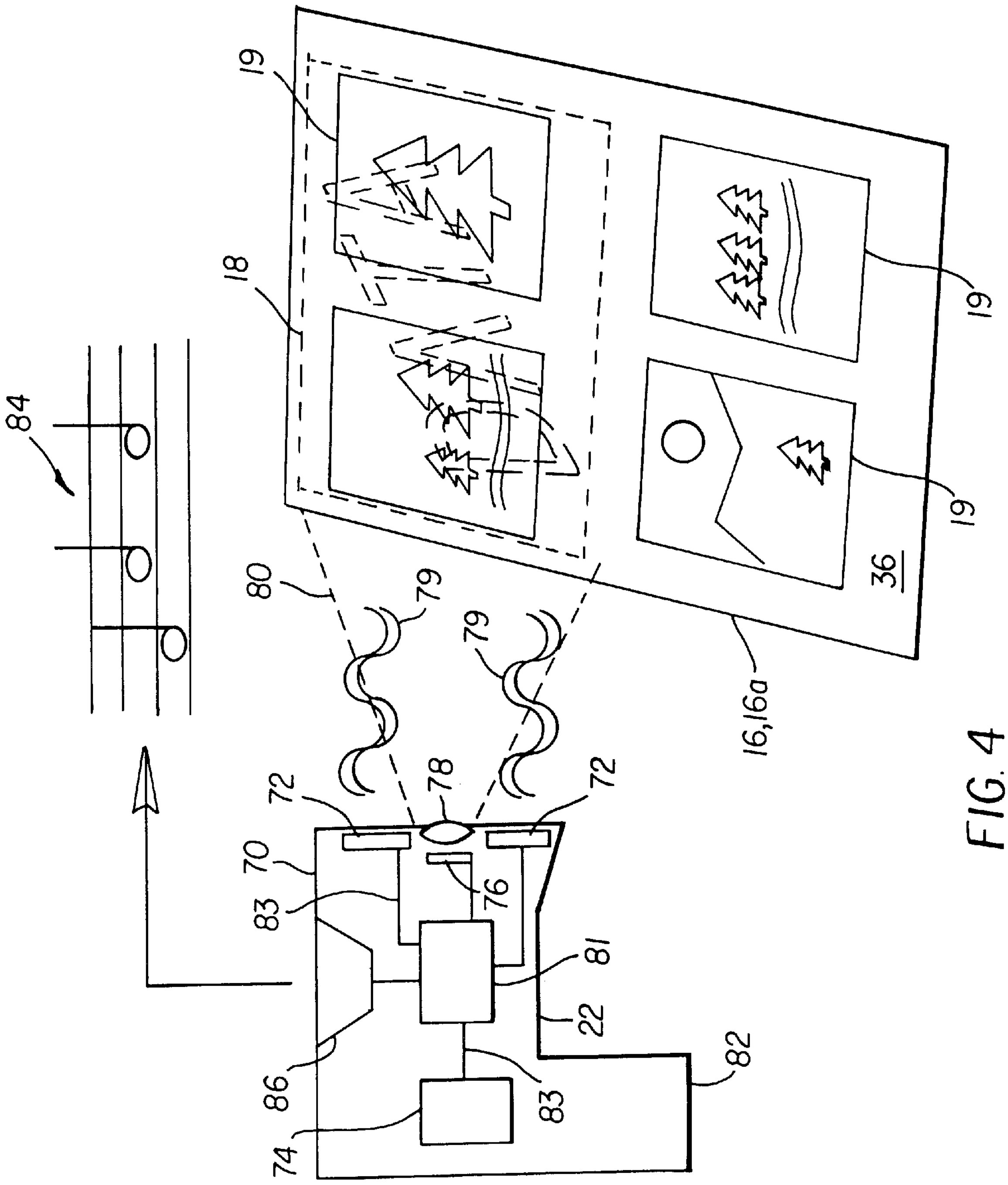
FIG. 4 is a semi-diagrammatical view of a reader playing back a sound file of a data-overlapped album page.
Figure 12:
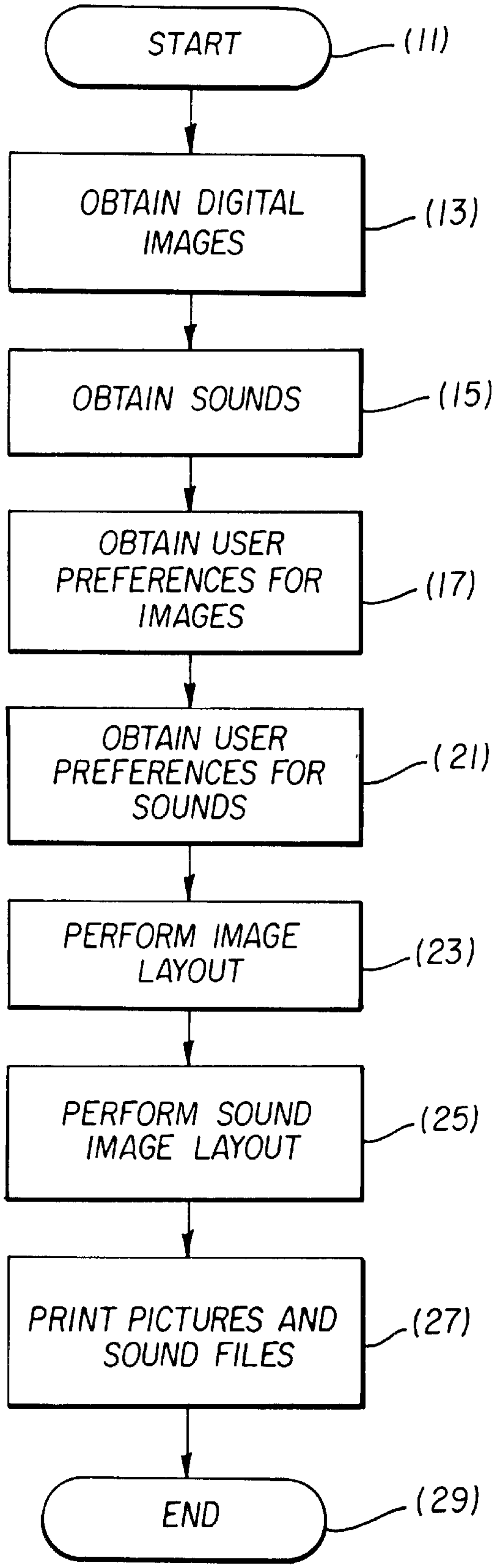
FIG. 12 is a summary flowchart of an embodiment of the computer program.

The invention provides for the editing and printing of data patches 18 on album pages 16. Referring to FIGS. 1, a system 10 has an editor 12 which has a user interface 14 and a stored computer program (outlined in FIG. 12) that is interactively accessible through the user interface 14. Referring to FIGS. 12 and 2–3, the program applies the method. Summarizing material later discussed in detail, the program is started (11) and digital images and sounds are obtained, (13),(15). User preferences relating to images and sounds can also be obtained (17),(21). Image layout and sound layout are performed (23),(25). Page proofs having one or more image frames are displayed (300). Visible images can be displayed (302) in one or more of the image frames. Data files are displayed (304) as depictions of data patches 18. The data patch depictions are overlapped (306) onto the image frames. The image frames can be resized (308) and otherwise edited (309). The data files can be edited (310). One or more data patch depictions can be removed (312). One or more data patch depictions can be can be resized (314) for a selectively variable overlap of one or more image frames. The editing procedure can include other addition, rearrangement, modification, and replacement of data patches 18 and representations of images. After editing, printing instructions are output from the editor 12 to a printer 20 and data patches 18, and optionally images, are printed (27) onto the album pages 16. Visible images are printed (316) using visible colorants to provide visible images 19. Data patches 18 are invisible-printed (318) on the album pages, that is, printed using invisible colorants. The data patches are printed in correspondence with the data patch depictions shown on the page proofs. The program is terminated (29). Referring to FIG. 4, after printing, a user can "playback" the album pages 16 to derive the information content using a reader 22.

Although usable with data patches 18 that are visible under ordinary viewing conditions, the methods, systems, and computer program products are most advantageous with invisible data patches 18, that is, transparent to visible radiation; since this makes it practical to print the data patches 18 over the visible images 19. (Data patches are illustrated in some of the figures by the block lettered words: "INVISIBLE DATA".) The invention can be used for printing data files in visible form on the reverse side of album pages 16 in alignment with associated images. This is not preferred, since the visible encodements are not esthetically pleasing and it is cumbersome for the user to read such data patches and at the same time associate them with particular images.

Figure 5:
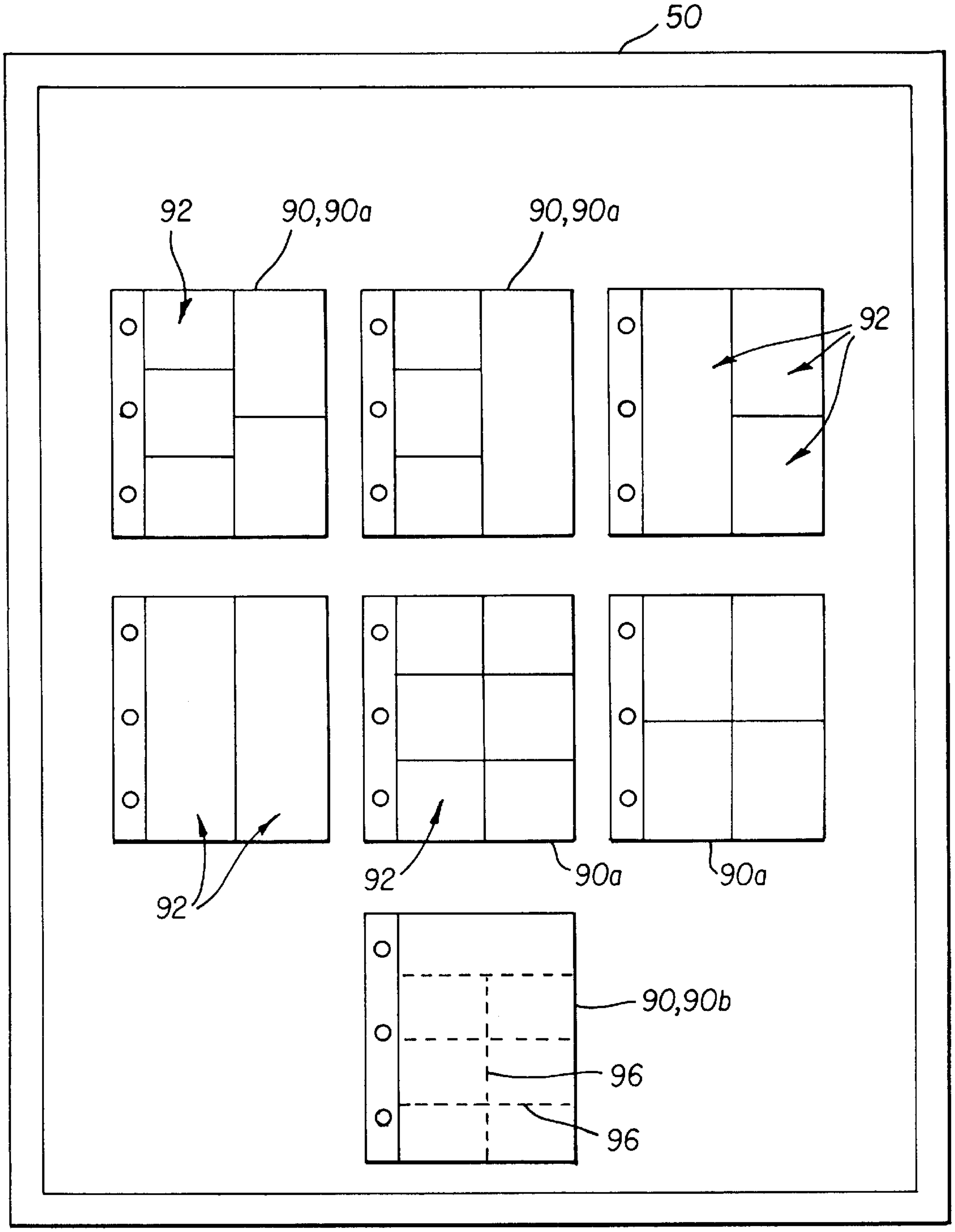
FIG. 5 is a semi-diagrammatical view of the display of the system of FIG. 1 showing an album page selection screen of the program. The display is shown in diagranmnatical form in this and other figures.
Figure 18:
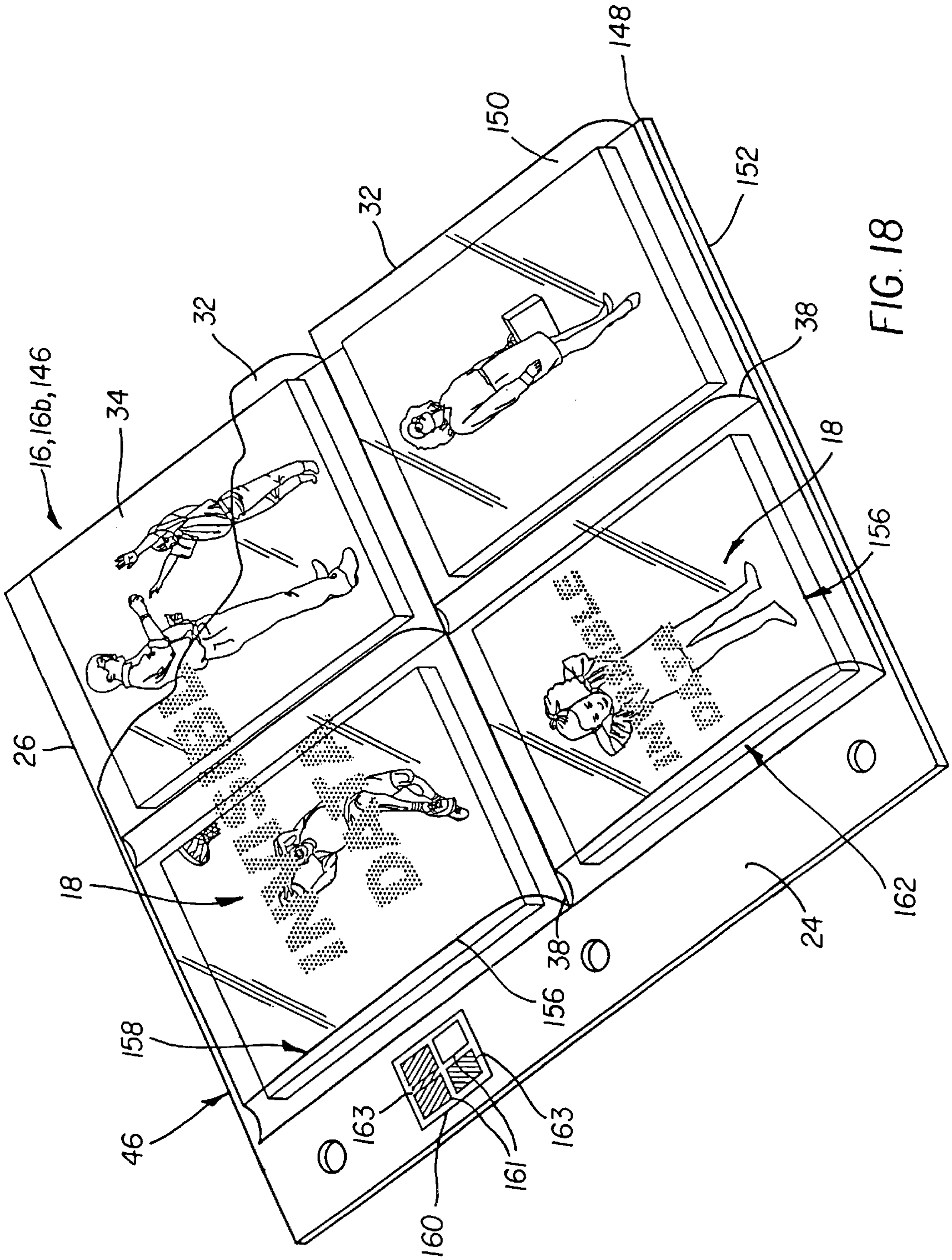
FIG. 18 is a partially cut-away perspective view of a keyed album page.

Referring to FIGS. 4, 5, and 18, the overall configuration of the album page 16 is not critical. The album pages 16 can be the above-described holder-type or image-type album pages 16, but are not limited to these types. An image-type album page 16*a* is shown in FIG. 4. Holder-type album pages 16*b* are shown in FIGS. 5 and 18. In addition to paper and polymer pages, the term "album page" used herein, is also inclusive of a backing 44 sheet bearing a set of adjoining or spaced apart stickers or separable prints and a sheet of glass bearing a collage of images. It is preferred that the album pages 16 are capable of being bound or grouped together as leaves of a book. Currently preferred are image-type album pages 16*a* in the form of blank sheets of paper and holder-type album pages 16*b* of polymeric material.

The outward configuration of the album page 16 is not critical. In the embodiments shown in FIGS. 5 and 18, the album page 16 has a binding edge 24 and a main portion or holder 26, which are joined together as a continuous piece, or by a fastener, or adhesive or the like (not separately illustrated). The binding edge 24 is adapted to receive a binding 28. A plurality of album pages 16 are connected together using the binding 28 to provide an album or book 30. A wide variety of different binding edges 24 can be used as appropriate for particular bindings 28. For example, the binding edge 24 can have a series of spaced holes and the binding 28 can be a multiple ring binder or similar retainer. The binding edge 24 can have a flat portion and the binding 28 can be a compression binder or stitched book binding 28.

Figure 19:
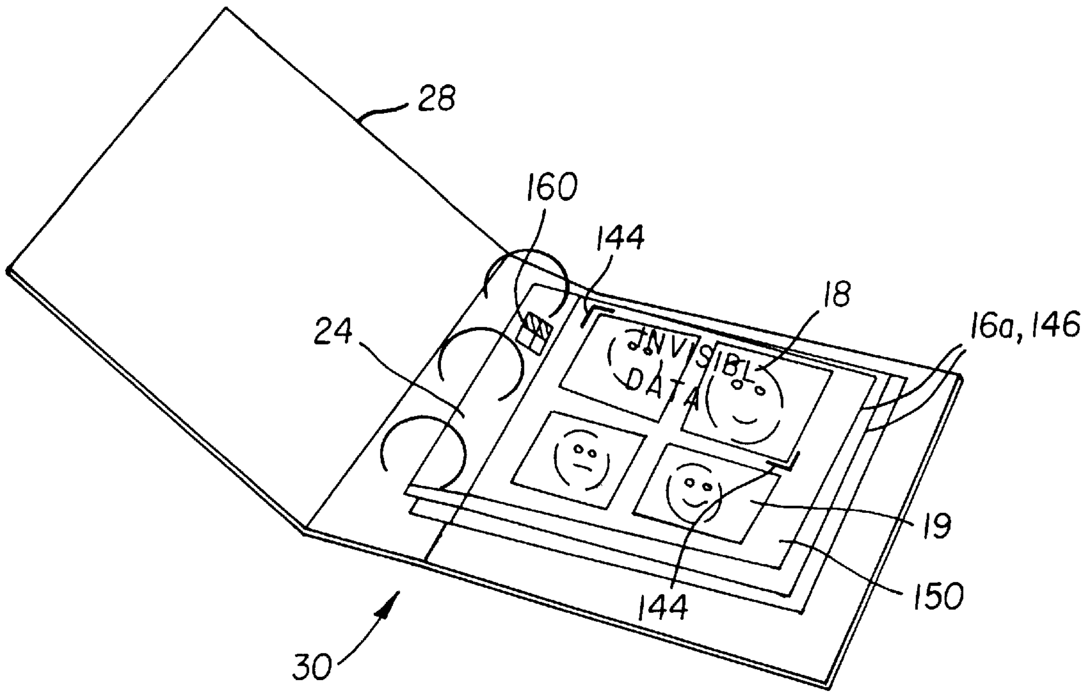
FIG. 19 is is a perspective view of an album including a set of keyed album pages.
Figure 20:
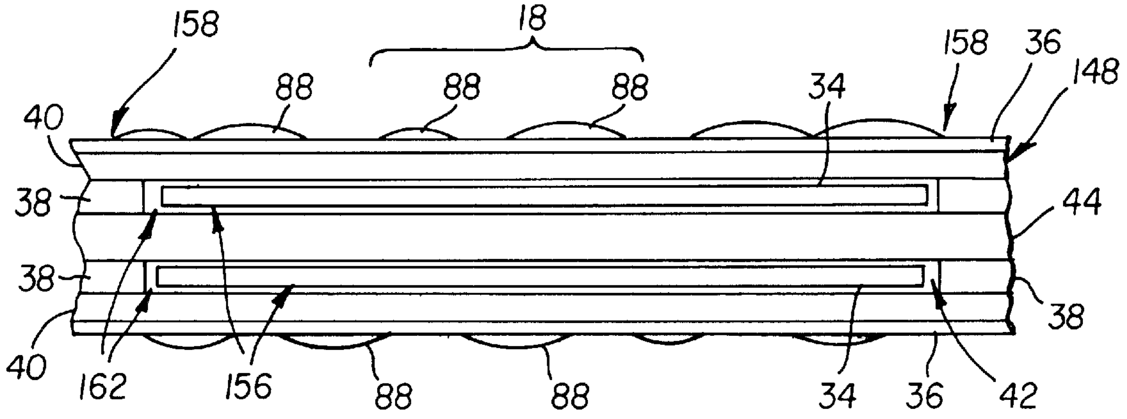
FIG. 20 is a partial diagrammatical cross-sectional view of a holder-type album page.

Examples of holder-type album pages 16 are shown in FIGS. 5 and 18–20, as they appear on the display. The album page 16 has a holder 26 having one or more pockets 32 for printed sheets 34, such as photographs or other viewable printed matter in sheet form. The printed sheets 34 can be viewed within the pockets 32. The holder 26 has an ink receptive layer 36 exterior to the pockets 32. The number and arrangement of pockets 32 can be adjusted to meet different usages. Pockets 32 can be separated by dividers 38. Each pocket 32 has a face sheet 40 and defines an empty space 42 behind the face sheet 40. Behind the space 42 is a backing 44 or a rear face sheet 40 or both. The backing 44 can be opaque or transparent. As shown in FIG. 20, an album page 16 can be two sided. In this case, pairs of pockets 32 are separated by a backing 44. The backing 44 can be omitted. The pockets 32 each receive and support one or more printed sheets 34. It is generally desirable that printed sheets 34 be closely sized to respective pockets 32 so that only minimal motion of the printed sheets 34 within the pockets 32 is possible.

The holder-type album pages 16 are flexible and each pocket 32 has an opening 46 on one side. The face sheet 40 and adjoining backing 44 or adjoining face sheets 40 are connected together at dividers 38. Exterior to each face sheet 40 is the ink receptive layer 36. Referring particularly to FIG. 20, the album page 16 can be made such that the face sheet 40 is flexible and is adhered to a flexible or rigid backing 44 by a layer of adhesive. In this case, the face sheet 40 is reversibly removable from the backing 44 for placement and removal of printed sheets 34.

The ink receptive layer 36 can be a region of the face sheet 40 having the same composition as the rest of the face sheet 40 or can consist of a single coating or multiple coatings overlying the face sheet 40. The ink receptive layer 36 can be continuous across the entire album page 16 or can be discontinuous. For example, the ink receptive layer 36 can be interrupted at dividers 38.

The face sheet 40 supports and retains the ink receptive layer 36 and also holds the printed sheet 34 within the space 42. Suitable materials vary with intended use. For example, if the album page 16 is a picture frame, then it is desirable that the face sheet 40 be sufficiently rigid to be self supporting. Suitable materials for the face sheet 40 in this use, include glass and acrylic plastic. If the album page 16 is an album leaf, then it is preferred that the face sheet 40 is flexible. The ink receptive layer 36 and face sheet 40 are both transparent to allow viewing of the printed sheets 34 within the pockets 32. This transparency is not perfect, but is preferably sufficient to not detract from the viewing experience. The album leaf can have one or more opaque or translucent regions (not shown), but it is highly preferred that the non-opaque regions be positioned to not overlie the printed sheets 34 in the pockets 32.

The ink receptive layer 36 is adapted to adhere to the face sheet 40 and to receive ink deposited by a specific type of printer 20, such as an ink jet printer 20. Suitable combinations of materials for the face sheet 40 and ink receptive layer 36 are well known to those of skill in the art. (It will be understood that the terms "face sheet 40" and "ink receptive layer 36" can each be inclusive of multiple layers.)

The data patch 18 is formed on the album page 16 by the printer 20. The manner of formation is a function of the printer 20 used. For low output applications, an inkjet printer 20 is currently preferred. An invisible ink cartridge (not separately illustrated) can be provided as an addendum to one or more visible ink cartridges or an invisible ink cartridge can be provided on an interchangeable basis. In a commercial printing system, greater cost effectiveness can be achieved with solvent based inks and album pages making use of less expensive materials. Other printing methods are also suitable including, but not limited to, thermal printing, electrophotographic printing, offset printing, laser printing, and screen printing.

In particular embodiments, the album page 16 is used with an ink jet printer 20 and the face sheet 40 and ink receptive layer 36 can have the chemical and physical characteristics of ink jet transparencies and other receivers disclosed in U.S. Pat. Nos. 4,460,637; 4,555,437; 4,642,247; 4,741,969; 4,956,230; 5,198,306; 5,662,997; 5,714,245. Image-type album pages 16 can likewise have the same characteristics as such face sheets 40 and ink receptive layers 36. It is preferred that the drying time for ink jet ink deposited on such ink receptive layers 36 be less than three minutes, with one to two minutes drying time more preferred. These drying times are based on a determination of ink transfer or no transfer to bond paper. The inks and ink receptive layers can also be adjusted to have other characteristics known in the art for black and colored ink jet inks and ink receivers. For example, it is preferred that the album page not be subject to curling with changes in environmental humidity. It is desirable that the ink deposits, after drying, be resistant to fingerprints and have little or no stickiness. For most uses, it is desirable that the ink deposits be water resistant. It is desirable that a deposited dot of ink spread on the ink receptive layer only to a limited extent and in a predictable manner. An acceptable increase in diameter of a deposited dot of ink is from 10 micrometers to 200–250 micrometers. Spreading to 180–200 micrometers is preferred and spreading to less than 180 micrometers is more preferred. It is preferred that the front cover and ink receptive layer or layers in combination have a haze value, as measured by American Society for Testing and Materials standard: ASTM D 1003-97, of less than 10 percent (hereafter referred to as "haze value"). A haze value of less than 7 percent is more preferred and a haze value of less than 5 percent is still more preferred. It is preferred that the front cover and ink receptive layer or layers in combination have a transmittance of more than 70 percent, as measured by American Society for Testing and Materials standard: ASTM D 1746-97. A transmittance of greater than 80 percent is preferred and greater than 90 percent is more preferred. The following patents disclose materials and methods relating to the above features: U.S. Pat. Nos. 4,460.637; 4,555,437; 4,642,247; 4,741,969; 4,956,230; 5,198,306; 5,662,997; 5,714,245. Some ink receptive layer 36*s* having suitable drying times for use with these invisible ink jet inks are disclosed in U.S. Pat. Nos. 4,741,969; 4,555,437; 5,198,306; and 4,642,247. Inkjet transparencies having suitable ink receptive layers are marketed by Eastman Kodak Company of Rochester, N.Y., as Kodak Inkjet Photo Transparency Film.

It is highly preferred that the printed data patch 18 is completely invisible under ordinary viewing conditions, that is, the printed data patch 18 absorbs or emits little, if any, light in the visible region of the electromagnetic spectrum (i.e. in the range of about 400 nm to about 700 nm). The printed data patch 18 does produce a detectable image in a radiation band outside the visible spectrum, as a result of reflection, transmission, or luminance. The frequency range or ranges of the invisible radiation modulated by the printed data patch 18 is dependent upon the characteristics of the material used to produce the printed data patch 18. Depending upon the material, infrared radiation or ultraviolet radiation or both can be modulated. It is currently preferred that the material used absorbs or emits in the infrared (IR) region of the spectrum, in particular between 800 nm and 1200 nm. Preferably, the material absorbs infrared radiation above about 850 nm. In the event the material absorbs some light in the visible region, the material should be used at relatively low concentration so that the material can be detected by the reader 22 yet will not interfere with viewing.

A particularly suitable colorant that absorbs strongly at 880 nm is heptamethine benzindolenine cyanine dye prepared according to the procedure described in U.S. Pat. No. 5,695,918, which is hereby incorporated herein by reference. This dye can be easily dispersed or dissolved in solvents used in the preparation of printing ink and is stable in printing ink. Other colorants are also suitable as indicated by the following.

In certain embodiments of the invention, the invisible material is a luminescent material. A luminescent material is defined as any material which absorbs light and then emits light at another region of the electromagnetic spectrum which may be detected by some sensor device. The invisible, luminescent materials can be either dyes, pigment, or any other material possessing the desired absorption properties, including up-converters described in *Indian J. Of Pure and Appl. Phys*., 33, 169–178, (1995).

Table 1 lists examples of suitable UV or visible absorbing materials which upon illumination with an appropriate light source, fluoresce in the visible or near IR region of the electromagnetic spectrum.

TABLE 1

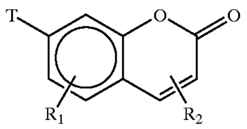

A

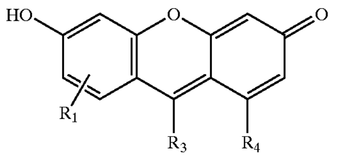

B

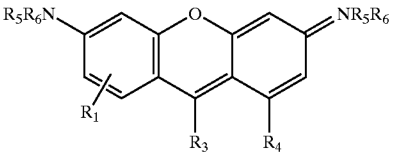

C

Compounds A, B, C are general representations of coumarins, fluoresceins and rhodamines respectively. Dyes of these classes are reviewed in *Appl. Phys*. B56, 385–390 (1993). These molecules are highly luminescent and may be useful for the present invention. $R_1$. represents any group including a hydrogen, substituted alkyl (per-halogenated, branched, saturated or unsaturated), halogen atoms (Cl, Br, I), any aryl group (phenyl, naphthyl, pyrrlyl, thienyl, furyl, etc.) or acyl (amido, ester, or carboxy), any sulfonic acid groups or derivatives of sulfonic acids (sulfonamides, sulfuryl halides, nitro, or substituted ether group. In general $R_1$. could be any group that allows these compounds to remain luminescent. T represents any of the following groups, OH, substituted or unsubstituted amino, a substituted amino group where the amino is a member of any ring, fused or otherwise. $R_2$ can be any substituted alkyl, aryl or acyl groups (perfluoronated alkyl groups are particularly useful in this position). $R_3$ can be hydrogen, or substituted alkyl. When $R_3$ is aryl or CN these dyes are particularly useful for the present invention, these dyes absorb in the IR region of the electromagnetic spectrum. $R_4$ can be any substituted alkyl, aryl or acyl groups (perfluoronated alkyl groups are particularly useful in this position). $R_5$ and $R_6$ can be hydrogen atoms or any combination of alkyl groups. $R_1$, and $R_1$, can represent groups necessary to form any ring (e.g. pyrrole, pyrimidine, morpholine or thiomorpholine). $R_5$ and $R_6$ may be part of a bicyclic ring system, fused onto the phenyl ring as shown in the general structure below.

D

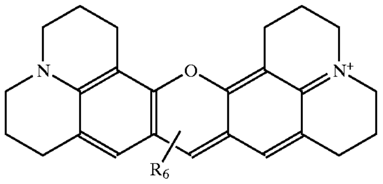

Fused molecules of this type are reviewed in *Tetrahedron*, Vol. 34, No. 38, 6013–6016, (1993). The impact of annulation on absorption and fluorescence characteristics of related materials is described in *J. Chem. Soc., Perkin Trans.* 2, 853–856, (1996).

TABLE 2

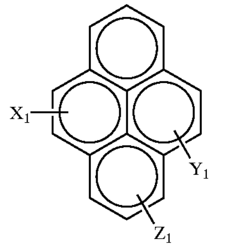

E

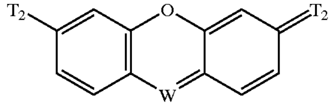

F

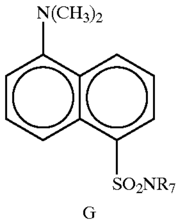

G

Aromatics (polycyclic aromatics especially) such as shown in Table 2 are useful for this invention. $X_1$, $Y_1$, $Z_1$. can be any groups which allow these compounds to be luminescent. In F, $T_2$ represents any substituted or unsubstituted amino or substituted or unsubstituted oxygen and W can be carbon, or nitrogen. These compounds are particularly useful when $X_1$, $Y_1$, or $Z_1$. are donor and acceptor groups on the same molecule as depicted on the so called "dansyl" molecule depicted as compound G. Anthracenes, pyrenes and their benzo derivatives are examples of fused aromatics. These materials are can be used individually or in combination with multiple components to form complexes which are luminescent. Sulfonated polyaromatics are particularly useful in water-based ink formulations. Lucifer yellow (H) dyes are often soluble in water and are comparatively stable and are described in *Nature*, 292, 17–21, (1981).

H

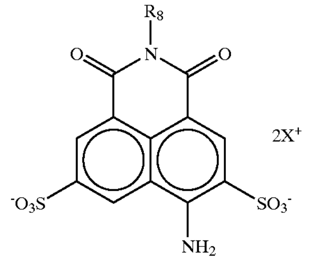

The commercial Lucifer yellow dyes were material H where $R_8$ is any alkyl and $X^+$represents a cation, necessary to balance the negative charge is useful for this invention The merits of this type of molecule and its luminescent properties have been disclosed in U.S. Pat. No. 4,891,351 for use in thermal transfer applications.

TABLE 3

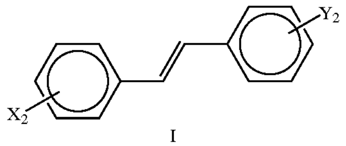

I

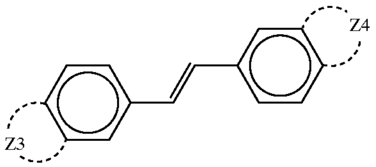

J

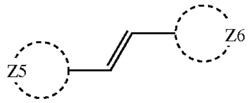

K

The stilbene class of dyes Table 3 are useful for the present invention. These dyes are very commonly used commercially as optical brightners for paper stock. *Colourage* 47–52, (1995) reviews fluorescent stilbene type lumiphores. For this invention $X_2$ and/or $Y_2$ can be any substituent or group that promotes absorption of this chromophore in the UV or short wavelength visible and subsequently emits light in the visible. Examples include but are not limited to halogens (Cl, I, etc.), alkyl (methyl, ethyl, butyl, iso-amyl, etc.) which may be used to increase organic solubility, sulfonic acid and its derivatives which may be useful for increasing water solubility, carboxylic acid groups which may be used for solubility but also as a position of oligomerization or polymerization. Also useful are amine derive substituents, which can be used to append groups for solubility purposes and polymerization but additionally may be used to manipulate the absorption characteristics. Stilbenes where $X_2$, and $Y_2$ are comprised of groups which allow for a donor and acceptor molecule in the same molecule are particularly useful for this purpose. In structures J and K, $Z_3$, $Z_4$, $Z_5$, and $Z_6$ represent any atoms that can be used to form a ring of any size or substitution with the proviso that the material is still luminescent. For structure K, it is noteworthy that $Z_5$, and $Z_6$ represent heteroaromatic nuclei, such as benzoxazolium, benzothiazolium, benzimdazolium, or their naphthalene derivatives, which make these compounds highly fluorescent.

TABLE 4

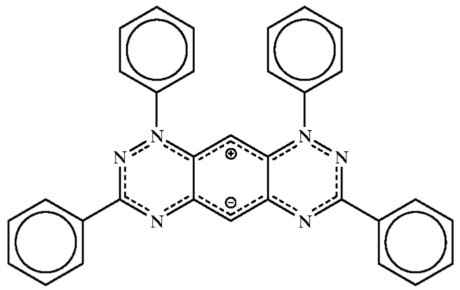

L

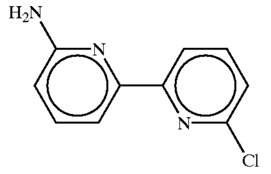

M

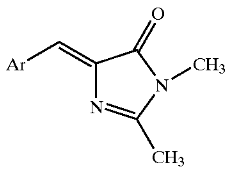

N

Table 4 shows some highly fluorescent amine heterocycles that would be particularly useful for this invention. The highly fluorescent tetraphenylhexaazaanthracene (TPHA, L) is atmosphere stable and thermally stable up to 400° C. (see *J. Am. Chem. Soc.* 120, 2989–2990, (1998) and included references). Such properties would be extremely useful for encodement of data where archival stability is expected to be an important issue. The diaminobipyridine compound M, described in *J. Chem. Soc., Perkin Trans.* 2, 613–617, (1996) was found to be highly fluorescent. The benzimidazalones N, such as disclosed in *Tetahedron Letters*, 39, 5239–5242, (1998), are also highly fluorescent when incorporated into certain environments. The aromatic group (Ar)can be a simple phenyl or more intricate heteroaromatic groups (imidazolo, benzoxazolo, indole, etc.).

Table 5 contains another general class of useful dyes for the application described in the present invention.

TABLE 5

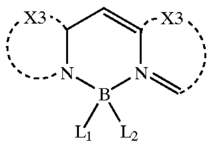

O

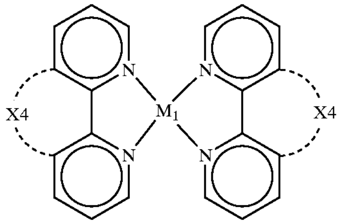

P

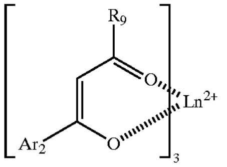

Q

Compounds O, P, and Q represent several classes of metallized dyes which are included in the scope of the present invention. Boron complexes such as compound (O) are very fluorescent, stable and easily synthesized from commercially available materials. Such materials are disclosed in *J. Am. Chem. Soc.* 116, 7801–7803, (1994). X3 represents atoms necessary to form an aromatic or heteroaromatic ring, $L_1$, and/or $L_2$ could be halogens, ether or any other ligand which commonly has an affinity for boron metal. Bipyridyl metal complexes such as (P) are luminescent, as disclosed in *Chem. Rev.*, 97, 1515–1566, (1997)). Due to the described optical properties is highly conceivable that such complexes would be useful for the present invention. X3 could be an atom which form either an aromatic fused ring forming a phenanthroline complexor saturated ring which could restrict from rotation the bipyridyl functions. $M_1$ represents any metal that would provide a luminescent complex (e.g. Ru or Re)or a metal which when complexed with the bipyridyl ligand quenches luminescence in a photographic manner. Compound (Q) represents the lanthanide complexes which are useful for thermal transfer imaging as disclosed in U.S. Pat. No. 5,006,503. Lanthanide metal complex dyes have UV absorbance and typically large Stokes' shifts.

TABLE 6

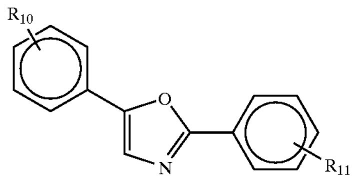

R

TABLE 6-continued

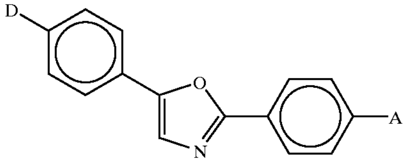

S

Dyes such as the phenyloxozolium compounds, generally depicted as in Table 6, are very fluorescent and have the added feature that the fluorescent signal is long lived, as disclosed in *Photochemistry and Photobiology*, 66 (4), 424–431, (1997). When the R-groups represent donor (D) and acceptor (A)groups on the same molecule as depicted in structure S, then these materials possess superior luminescent properties.

The materials discussed in the previous examples absorbed light in either the UV or visible region of the electromagnetic spectrum. These materials have several advantages for use in the application described in the present invention. Often the materials are atmospherically stable, they are commercially available since they have been used extensively in non-photographic applications and finally good optical properties can been had (e.g. large Stokes' shifts, high fluorescence quantum yield, long excited state lifetimes, etc. The materials in the next series of examples absorb light in the IR and for the most part emit further into the IR. Since these materials emit beyond the absorption of the other possible colorants on articles, IR luminescent materials can be detected easier from background colorants. The next several materials are typical IR materials useful for this invention.

TABLE 8

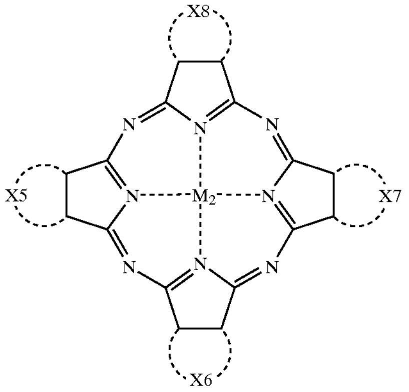

T

Table 8 contains a general structure depicting a phthalocyanine or naphthalocyanine compound. Phthalocyanines are well known in the photographic industry and are reviewed in *Molecular Luminescence: An International Conference.*, N.Y., W. A. Benjamin, 295–307, (1969) and Infared Absorbing dyes: Topics in Applied Chemistry, Edited by Masaru Matsuoka, N.Y., Plenum Press, 1990. These materials have been used in electroconductive applications, as absorber dyes for photothermographic printing and as colorants in inks. Several well known properties of the phthalocyanines and their extended analogs, naphthalocyanines, are high fluorescence efficiencies and superior thermal and light stability. Such materials are disclosed in *Dyes and Pigments*, 11, 77–80, (1989); *Aust. J. Chem.*, 27, 7–19, (1974); and *Dyes and Pigments*, 35, 261–267, (1997). These properties make these materials ideal for storage of large data amounts for extended periods as described in this invention. Compound T depicts a general structure of a phthalocyanine or naphthalocyanine. X5, X6, X7 and X8 represent atoms necessary to form a ring. The ring is often aromatic or heteroaromatic such as phenyl, 1,2-fused naphthyl, 1,8-fused naphthyl or larger fused polyaromatics such as fluoroanthrocyanine. The rings may be substituted in any way in the spirit of this invention provided that the materials is still luminescent. In fact differential substitution can be used to attenuate the physical properties (e.g. light stability and solubility) or enhance the optical properties of a material (e.g. Fluorescence efficiency or Stokes' shift). The rings may contain functional groups through which oligomerization can be accomplished. The (X5–8)-groups may be the same or different leading to symmetrical or unsymmetrical materials respectively. The metal atom ($M_2$) can be any metal with the proviso that it allows for luminescent materials. The substituent $M_2$ can also represent two hydrogen atoms, these materials are usually referred to as "non-metallized" (na)phthalocyanines. Some metals can possess additional "axial" ligands (e.g. Al and Si) which are useful for appending additional functional groups to alter the properties of the dyes. Additionally these groups prevent chromophore aggregation which may perturb the luminescent properties of the chromophores. These ligands also useful points of attachment to oligerimerize or form dendrimers of these materials as disclosed in *Thin Solid Films*, 299,63–66, (1997) and *Angew. Chem. Int. Ed.* 37 (8), (1092–1094), (1998). A related class of materials is depicted in Table 9. Compound U is classified as a "sub"-phthalocyanine and is disclosed in *J. Am. Chem. Soc.* 118, 2746–2747, (1996)). These materials are very fluorescent. The sub-naphthalocyanines with the proper substitution can absorb in the near IR and have Stokes' shift comparable if not larger than the analogous naphthalocyanines.

TABLE 9

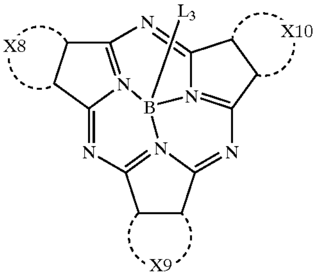

U

The group $L_3$ is like similar "axial substituents on phthalocyanines". These groups may be useful for modifying the properties of the materials. Also like phthalocyanines, these groups are expected to prevent chromophore aggregation which may perturb the luminescent properties of the chromophores.

TABLE 10

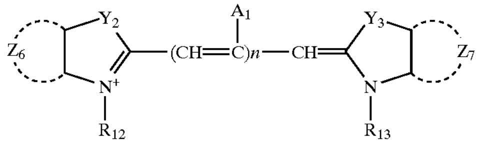

V

Cyanines such as depicted in structure V are luminescent and useful for this invention. In the above structure n could be 0 or any integer (e.g. 1–4) and A is a group that is appended to the central chain carbon or atom. The group A, can be any alkyl, aromatic or heteroaromatic group. A can be any group with the proviso that the dye is still luminescent. Y2 and Y3 could be independently one of the following groups: N, O, S, Se, or Te, additional $C(alkyl)_2$ which forms the indole nucleus, well recognized by anyone skilled in the art as an indole ring. Additionally when $Y_2$ or $Y_3$ is nitrogen then it is substituted with an ap proprate group, forming what is recognizable as an imidazolium ring by any skilled in the art. $Z_6$ and $Z_7$ represent atoms necessary for forming a saturated aromatic or unsaturated non-aromatic ring. The ring so formed could be phenyl, naphthyl or any other ftised aromatic. Likewise the rin g could be any aromatic or non-aromatic heteroatom containing ring (e.g. pyridyl, quinoyl, etc.) $R_{12}$, or $R_{13}$ represent any of the possible nitrogen substituents w ell known by any skilled in the art. For example, $R_{12}$ or $R_{13}$ may be independently saturated substituted or unsubstituted alkyl (e.g. methyl, ethyl, heptafluorobutyl, etc.)or non-saturated alkyl (vinyl, allelic, acetylinic). $R_{12}$ and $R_{13}$ may also be charged groups (cationic, anionic or both). In cases where the $R_{12}$and or $R_{13}$ are charged and a net charge exists on the dye, there exist a combination of counterions to balance the charge. For example, if $R_{12}$ and $R_{13}$ are both sulfoalkyl the net charge on the chromophore may be −1 and hence would be charge balanced with an appropriate cation (e.g. Na+, K+, triethylammonium, etc.) Likewise if $R_{12}$ and $R_{13}$ are simple uncharged alkyl groups such methyl, then the dye may have a net +1 charge and hence have to be charge balanced with a negative anion (e.g. perfluorobutyrate, I-, BF4-, etc.). $R_{12}$ and $R_{13}$ could be groups necessary to incorporate the material in an oligomer or polymer. The dye may be incorporated into the polymer backbone or pendant. Additionally the polymer may incorporate this material by non-covalent forces (charge-charge interactions, encapsulation, etc.). Long chain cyanines are often bridged. It is known that such bridging has a stabilizing effect on cyanine dyes and stability is a preferred embodiment here such dyes are preferred. The bridge could be any saturated structure of any size, preferably 5, 6, 7 membered. Such ring may be functionalized with the usual groups alkyl (e.g. methyl, t-butyl) carboxlic acid (and its derivatives), sulfonic acids (and its derivatives) halogen, aromatic and heteroaromatic. Group B could be the usual chain substituents, halogen (preferable Cl), phenyl, heteroaryl (e. g. furyl, thienyl, etc.), ethereal (e. g. ethoxy, phenoxy, benzyloxy), or barbiturate, mercapto (e. g. thiophenoxy, thiobenzyloxy, etc.), amino (e. g. anilino, etc.). B1 could represent a point of attachment for oligomerization or polymerization. It is noted that m represents an integer from 1–3 as dyes containing such bridging are well known in the art. Z groups represent atoms necessary to for fused rings. Each Z group represents any ring which allows these dyes to be luminescent. $Y_4$ and $Y_5$ represent atoms necessary to form the typical dye nuclei and could anything which allows the material to be luminescent. The material shown in Table 12 illustrates another useful feature. X11 and X12 represent the atoms necessary to for a ring from the nitrogen atom of the hetero-nucleus to the chromophore chain. Typically forming a 5-member or six member ring. Ridigization of chromophores as depicted in the materials of Tables 11 and 12 is known to enhance the luminescence.

TABLE 11

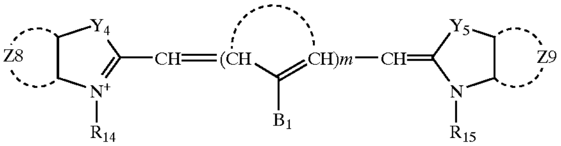

W

TABLE 12

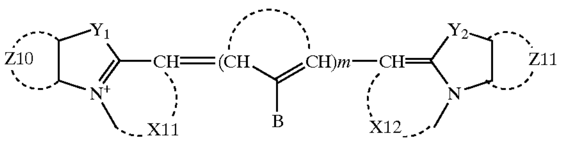

X

Another well known class of luminescent materials is depicted in Table 13. This class of materials are known as squaraine dyes or squarylium dyes. The use of organic solubilized squaraines for antihalation protection in IR sensitive AgX applications has been described in published PCT patent application WO 96/35142). These dyes have been also been disclosed for use as IR absorbing elements in laser addressable imaging elements in published European Patent Application EP 0764877A1.

TABLE 13

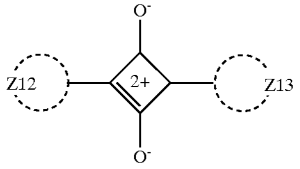

W

Squaraine dyes are well known to have good thermal stability, another preferred feature for any material of this invention. Z123 and Z13 independently represent any substituted aromatic or heteroaromatic nucleus. Typical aromatic nuclei include phenyl, naphthyl, pyrrylium, thiopyrrylium, or any other group which provides that the material is luminescent or absorbs a wavelength in the IR or UV region of the spectrum. Heteroaromatic rings could be but not limited to benzoxazolium, benthiazolium, quinoline or any other group which provided that the material is luminescent. It is also noteworthy to mention that the center ring does not have to feature the negative charge oxygen (O—). In fact squaraines where the central chain atom is either carbon or nitrogen have been disclosed in U.S. Pat. No. 5,227,499 and U.S. Pat. No. 5,227,498.

Another class of IR materials are illustrated in Table 14. These squaraine and croconium dyes are disclosed in *Sensors and Actuators B*, 38–39, 202–206 (1997) and *Sensors and Actuators B*, 38–39, 252–255 (1997). The croconium dyes like squaraines are well known to have good thermal stability, another preferred feature for any material of this invention. Z12 and Z13 independently represent any substituted aromatic or heteroaromatic nucleus. Typical aromatic nuclei include phenyl, naphthyl, any other group which provided that the material is luminescent. pyrrylium, thiopyrrylium. Heteoaromatic includes but not limited to benzoxazolium, benthiazolium, quinoline or any other group which provided that the material is luminescent.

TABLE 14

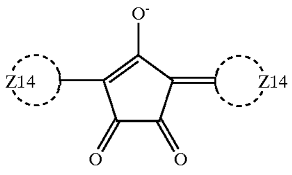

X wherein Z14 represents any substituted aromatic or heteroaromatic nucleus.

Materials that are not intrinsically luminescent, but become so after an activation step, can be used in the practice of this invention. The art is plentiful of examples of materials which fit this description. Tables 15, 16, and 17 represent three of the more common materials. Other materials exist and respective methods for generating them are known. Generally these materials are considered useful for this invention if a luminescent material is the result of an activation step. Some of the most common activating steps include the use of light (the materials are referred to as "photochromic"), a chemical (usually some oxidant to oxidize a "leuco" dye), heat (e. g. thermographic), a reaction with another agent (e. g. a coupler with a photographic developer) or by non-covalent interaction between two or more agents often referred to as "host-guest " or molecular recognition (e.g. metal complexation, chromophore-chromophore interactions, coupler-developer reaction. etc.).

TABLE 15

Equation 1

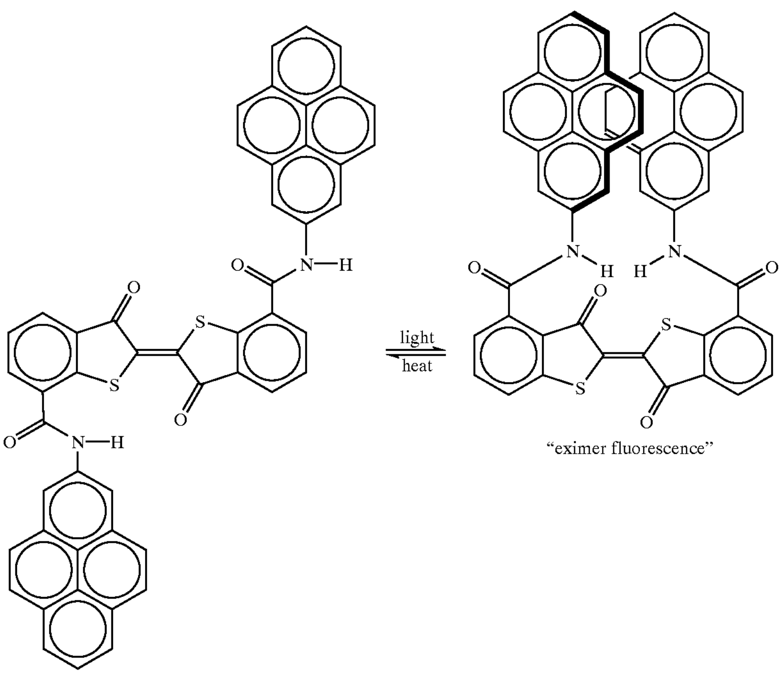

Equation 1 depicts the photo-conversion of a material into a material with additional "eximer fluorescence" (*J. Chem. Soc. Chem. Commun.*, 591 (1992)). The process uses light to generate a new material which could be easily a luminescent material. In the above example a second point relevant to this patent is illustrated, that is, that a second stimulus (heat in the above example) may be used to reverse a material from a colored (or luminescent) state to a colorless (or non-luminescent) state. It is in the spirit of the invention that the encodement may not necessarily be due to the luminescent material directly but may be due to its removal from a luminescent background.

Equation 2

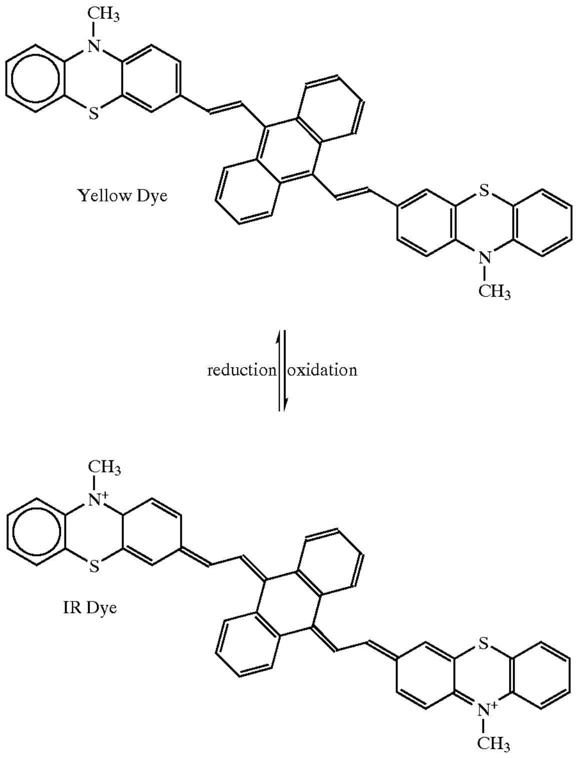

Yellow Dye

IR Dye

Equation 2 shows another type of activation of a material (*Angew. Chem. Int. Ed. Engl.*, (24), 2817–2819, (1997)). A material (or its luminescence) may be “turned on” or “off” with redox chemistry. The oxidation may come about by simple post-coating reaction with a molecular oxidant or a more complicated photographic process (generation of an oxidized color developer).

Equation 2 also illustrates the possibility of a reversible system 10.

Equation 3 illustrates yet another possible way of generating a luminescent compound. This process involves the selective complexation (“molecular recognition” or “host-guest”) of one non-luminescent component (dye-ligand) by another ($Cu^{2+}$ion) to in this case convert the material to a luminescent material (*Angew. Chem. Int. Ed.* 37, 772–773, (1998)). This example shows the formation of a new material without the possibility for reversal. However it is well known that molecular recognition can be used to form a transient luminescent species that can be reverted back to the non-luminescent material (*J. Mater. Chem.*, 8 (6), 1379–1384, (1998)). A luminescent material could be converted to a non-luminescent material for the encodement. The mechanisms by which these materials luminesce or do not luminesce and their physical attributes have been thoroughly reviewed (*Chem. Rev.*, 97, 1515–1564, (1997)). The materials and methods for generating luminescence described within this reference are useful in the practice of this invention.

Equation 3

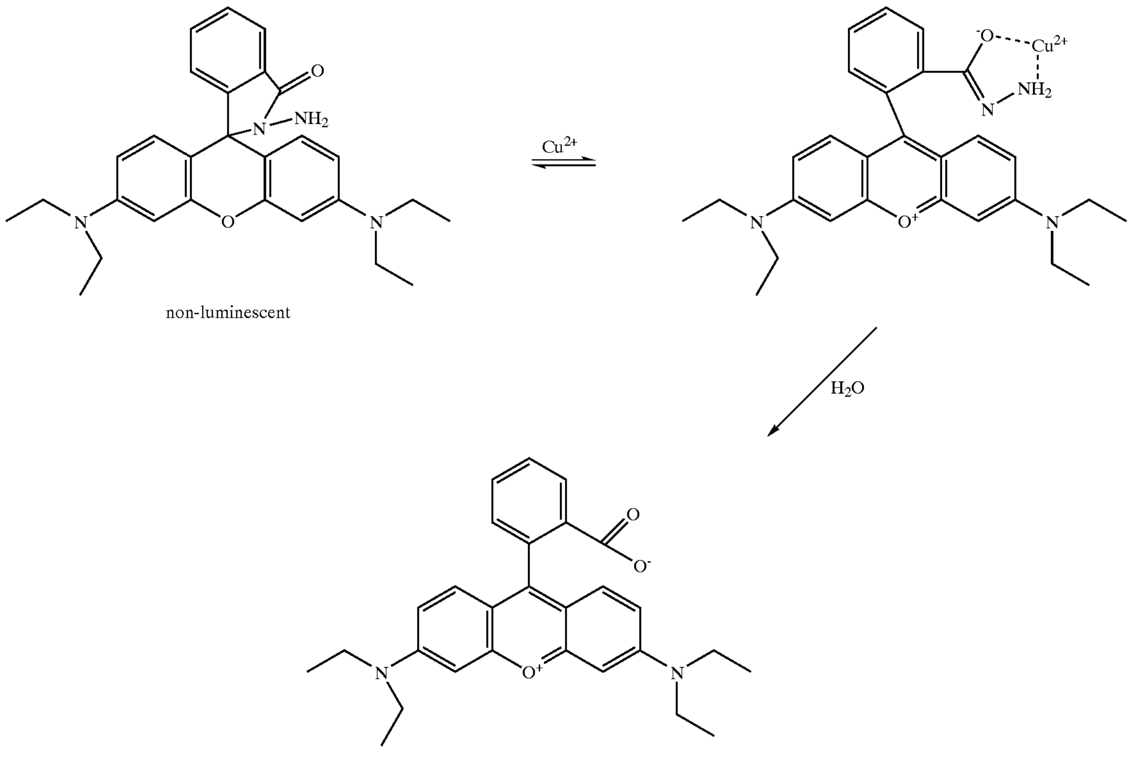

non-luminescent luminescent

Specific materials that can be used in this invention include:

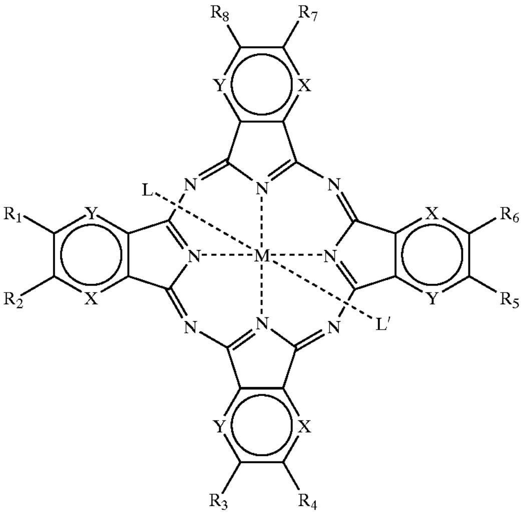

| Compound | R1 | R2 | R3 | R4 | R5 | R6 | R7 | R8 | X | Y | M | L | L' |
|---|---|---|---|---|---|---|---|---|---|---|---|---|---|
| I-1 | H | H | H | H | H | H | H | H | CH | CH | Al | Cl | — |
| I-2 | H | H | H | H | H | H | H | H | CH | CH | Al | $OR^a$ | — |
| I-3 | H | H | H | H | H | H | H | H | CH | CH | H2 | — | — |
| I-4 | H | H | H | H | H | H | H | H | CH | CH | Si | Cl | Cl |
| I-5 | H | H | H | H | H | H | H | H | CH | CH | Si | OH | OH |
| I-6 | H | H | H | H | H | H | H | H | CH | CH | Si | $OR^a$ | $OR^a$ |
| I-7 | H | H | H | H | H | H | H | H | CH | CH | Mg | — | — |
| I-8 | H | H | H | H | H | H | H | H | CH | CH | Zn | — | — |
| I-9 | H | H | H | H | H | H | H | H | CH | CH | Mn | — | — |
| I-10 | H | H | H | H | H | H | H | H | CH | CH | Eu | — | — |
| I-11 | H | H | H | H | H | H | H | H | CH | CH | Yb | — | — |
| I-12 | H | H | H | H | H | H | H | H | CH | CH | Sn | — | — |
| I-13 | H | H | H | H | H | H | H | H | NH | CH | Al | Cl | — |
| I-14 | H | H | H | H | H | H | H | H | NH | CH | Al | $OR^a$ | — |
| I-15 | H | H | H | H | H | H | H | H | NH | CH | H2 | — | — |
| I-16 | H | H | H | H | H | H | H | H | NH | CH | Si | Cl | Cl |
| I-17 | H | H | H | H | H | H | H | H | NH | CH | Si | OH | OH |
| I-18 | H | H | H | H | H | H | H | H | NH | CH | Si | $OR^a$ | $OR^a$ |
| I-19 | H | H | H | H | H | H | H | H | NH | CH | Mg | — | — |
| I-20 | H | H | H | H | H | H | H | H | NH | CH | Zn | — | — |
| I-21 | H | H | H | H | H | H | H | H | NH | CH | Mn | — | — |
| I-22 | H | H | H | H | H | H | H | H | NH | CH | Sn | — | — |
| I-23 | H | H | H | H | H | H | H | H | NH | CH | Eu | — | — |
| I-24 | H | H | H | H | H | H | H | H | CH | CH | Yb | — | — |
| I-25 | $SO_3^-$ | H | $SO_3^-$ | H | $SO_3^-$ | H | $SO_3^-$ | H | CH | CH | Al | Cl | — |
| I-26 | $SO_3^-$ | H | $SO_3^-$ | H | $SO_3^-$ | H | $SO_3^-$ | H | CH | CH | Al | $OR^a$ | — |
| I-27 | $SO_3^-$ | H | $SO_3^-$ | H | $SO_3^-$ | H | $SO_3^-$ | H | CH | CH | H2 | — | — |
| I-28 | $SO_3^-$ | H | $SO_3^-$ | H | $SO_3^-$ | H | $SO_3^-$ | H | CH | CH | Si | Cl | Cl |
| I-29 | $SO_3^-$ | H | $SO_3^-$ | H | $SO_3^-$ | H | $SO_3^-$ | H | CH | CH | Si | OH | OH |
| I-30 | $SO_3^-$ | H | $SO_3^-$ | H | $SO_3^-$ | H | $SO_3^-$ | H | CH | CH | Si | $OR^a$ | $OR^a$ |
| I-31 | $SO_3^-$ | H | $SO_3^-$ | H | $SO_3^-$ | H | $SO_3^-$ | H | CH | CH | Mg | — | — |
| I-32 | $SO_3^-$ | H | $SO_3^-$ | H | $SO_3^-$ | H | $SO_3^-$ | H | CH | CH | Zn | — | — |
| I-33 | $SO_3^-$ | H | $SO_3^-$ | H | $SO_3^-$ | H | $SO_3^-$ | H | CH | CH | Mn | — | — |
| I-34 | $SO_3^-$ | H | $SO_3^-$ | H | $SO_3^-$ | H | $SO_3^-$ | H | CH | CH | Eu | — | — |
| I-35 | $SO_3^-$ | H | $SO_3^-$ | H | $SO_3^-$ | H | $SO_3^-$ | H | CH | CH | Sn | — | — |
| I-36 | $SO_3^-$ | H | $SO_3^-$ | H | $SO_3^-$ | H | $SO_3^-$ | H | CH | CH | Yb | — | — |
| I-37 | t-butyl | H | t-butyl | H | t-butyl | H | t-butyl | H | CH | CH | Al | Cl | — |
| I-38 | t-butyl | H | t-butyl | H | t-butyl | H | t-butyl | H | CH | CH | H2 | — | — |
| I-39 | t-butyl | H | t-butyl | H | t-butyl | H | t-butyl | H | CH | CH | Al | $OR^a$ | — |
| I-40 | t-butyl | H | t-butyl | H | t-butyl | H | t-butyl | H | CH | CH | Si | Cl | Cl |
| I-41 | t-butyl | H | t-butyl | H | t-butyl | H | t-butyl | H | CH | CH | Si | OH | OH |
| I-42 | t-butyl | H | t-butyl | H | t-butyl | H | t-butyl | H | CH | CH | Si | $OR^a$ | $OR^a$ |
| I-43 | t-butyl | H | t-butyl | H | t-butyl | H | t-butyl | H | CH | CH | Mg | — | — |
| I-44 | t-butyl | H | t-butyl | H | t-butyl | H | t-butyl | H | CH | CH | Zn | — | — |
| I-45 | t-butyl | H | t-butyl | H | t-butyl | H | t-butyl | H | CH | CH | Mn | — | — |
| I-46 | t-butyl | H | t-butyl | H | t-butyl | H | t-butyl | H | CH | CH | Yb | — | — |
| I-47 | t-butyl | H | t-butyl | H | t-butyl | H | t-butyl | H | CH | CH | Sn | — | — |
| I-48 | t-butyl | H | t-butyl | H | t-butyl | H | t-butyl | H | CH | CH | Eu | — | — |

-continued

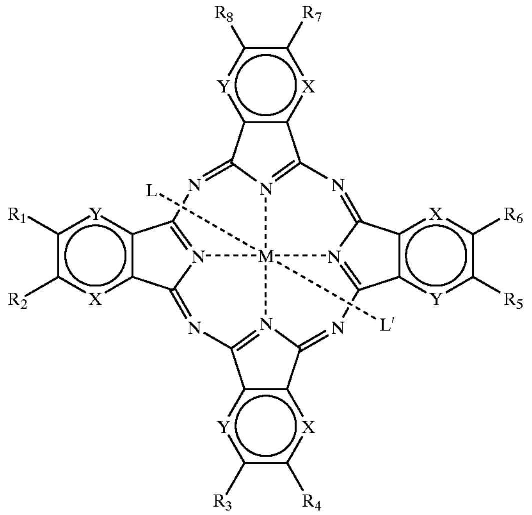

| Compound | R1 | R2 | R3 | R4 | R5 | R6 | R7 | R8 | X | Y | M | L | L' |
|---|---|---|---|---|---|---|---|---|---|---|---|---|---|
| I-49 | t-butyl | H | t-butyl | H | t-butyl | H | t-butyl | H | N(Me)2 | CH | Al | Cl | Cl |
| I-50 | t-butyl | H | t-butyl | H | t-butyl | H | t-butyl | H | N(Me)2 | CH | Al | OH | OH |
| I-51 | t-butyl | H | t-butyl | H | t-butyl | H | t-butyl | H | N(Me)2 | CH | Al | OR[a] | OR[a] |
| I-52 | t-butyl | H | t-butyl | H | t-butyl | H | t-butyl | H | N(Me)2 | CH | Si | Cl | Cl |
| I-53 | t-butyl | H | t-butyl | H | t-butyl | H | t-butyl | H | N(Me)2 | CH | Si | OH | OH |
| I-54 | t-butyl | H | t-butyl | H | t-butyl | H | t-butyl | H | N(Me)2 | CH | Si | OR[a] | OR[a] |
| I-55 | t-butyl | H | t-butyl | H | t-butyl | H | t-butyl | H | N(Me)2 | CH | Mg | — | — |
| I-56 | t-butyl | H | t-butyl | H | t-butyl | H | t-butyl | H | N(Me)2 | CH | Zn | — | — |
| I-57 | t-butyl | H | t-butyl | H | t-butyl | H | t-butyl | H | N(Me)2 | CH | Mn | — | — |
| I-58 | t-butyl | H | t-butyl | H | t-butyl | H | t-butyl | H | N(Me)2 | CH | Eu | | — |
| I-59 | t-butyl | H | t-butyl | H | t-butyl | H | t-butyl | H | N(Me)2 | CH | Sn | — | — |
| I-60 | t-butyl | H | t-butyl | H | t-butyl | H | t-butyl | H | N(Me)2 | CH | Yb | — | — |

[a]R could be any substituted alkyl (methyl, ethyl, n-butyl, t-butyl, isoamyl etc . . . ), any substituted silyl group (e.g. trimethylsilane, tributylsilane, trichlorosilane, triethoxysilane, etc . . . ) or any group that could be used to make the above compounds oligomeric or prevent dye aggregation)

I-61

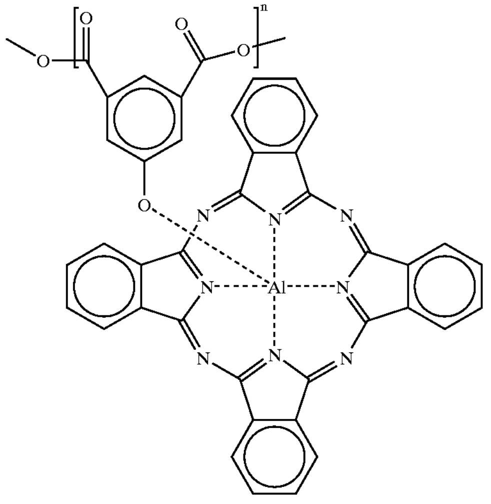

wherein n = any interger and the linkage depicts formation of any polyester

I-62

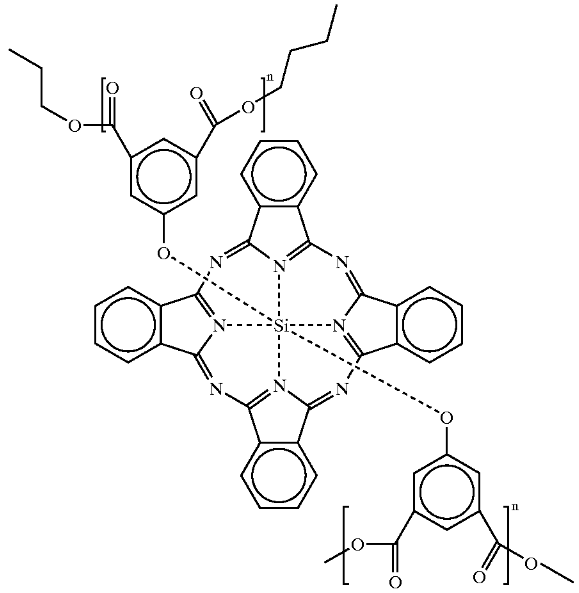

wherein n = any interger and the linkage depicts formation of any polyester

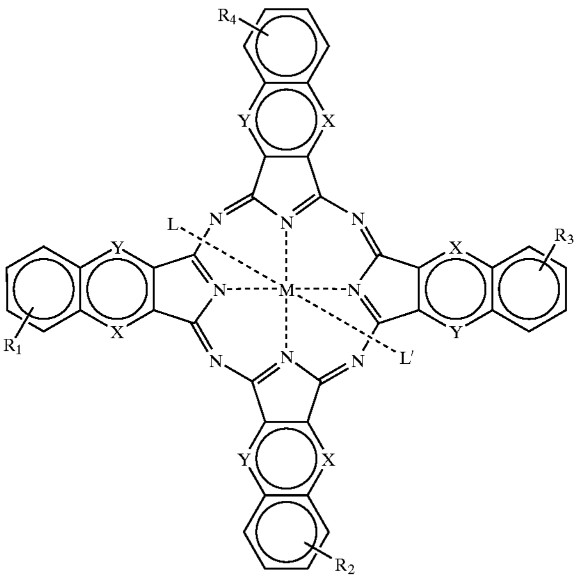

| Compound | R1 | R2 | R3 | R4 | X | Y | M | L | L' |
|---|---|---|---|---|---|---|---|---|---|
| II-1 | H | H | H | H | CH | CH | Al | Cl | — |
| II-2 | H | H | H | H | CH | CH | H2 | — | — |
| II-3 | H | H | H | H | CH | CH | Al | OR[a] | OR[a] |
| II-4 | H | H | H | H | CH | CH | Si | Cl | Cl |
| II-5 | H | H | H | H | CH | CH | Si | OH | OH |
| II-6 | H | H | H | H | CH | CH | Si | OR[a] | OR[a] |
| II-7 | H | H | H | H | CH | CH | Mg | — | — |
| II-8 | H | H | H | H | CH | CH | Zn | — | — |
| II-9 | H | H | H | H | CH | CH | Mn | — | — |
| II-10 | H | H | H | H | CH | CH | Eu | — | — |
| II-11 | H | H | H | H | CH | CH | Sn | — | — |
| II-12 | H | H | H | H | CH | CH | Yb | — | — |

-continued

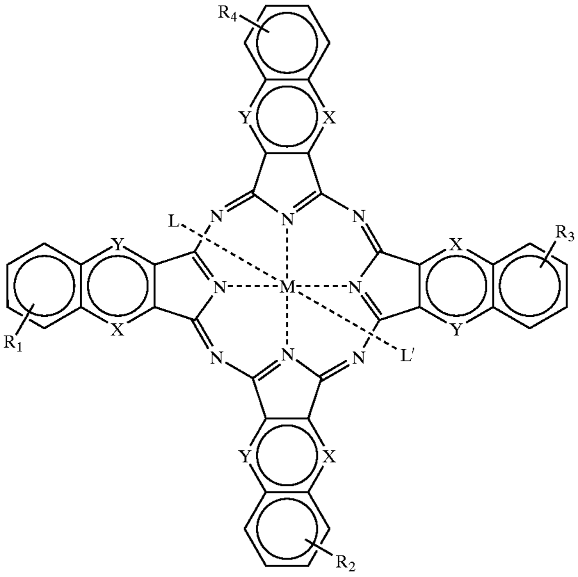

| Compound | R1 | R2 | R3 | R4 | X[a] | Y[a] | M | L | L' |
|---|---|---|---|---|---|---|---|---|---|
| II-1 | H | H | H | H | COR | COR | Al | Cl | — |
| II-2 | H | H | H | H | COR | COR | H2 | — | — |
| II-3 | H | H | H | H | COR | COR | Al | OR[a] | OR[a] |
| II-4 | H | H | H | H | COR | COR | Si | Cl | Cl |
| II-5 | H | H | H | H | COR | COR | Si | OH | OH |
| II-6 | H | H | H | H | COR | COR | Si | OR[a] | OR[a] |
| II-7 | H | H | H | H | COR | COR | Mg | — | — |
| II-8 | H | H | H | H | COR | COR | Zn | — | — |
| II-9 | H | H | H | H | COR | COR | Mn | — | — |
| II-10 | H | H | H | H | COR | COR | Eu | — | — |
| II-11 | H | H | H | H | COR | COR | Sn | — | — |
| II-12 | H | H | H | H | COR | COR | Yb | — | — |

[a]R could be any substituted alkyl (methyl, ethyl, n-butyl, t-butyl, isoamyl etc. any substituted silyl group (e.g. trimethylsilane, tributylsilane, trichlororosilane triethoxysilane, etc . . . ) or any group that could be used to make the above compounds oligomeric or prevent dye aggregation).

III-1

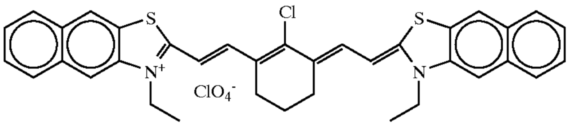

III-2

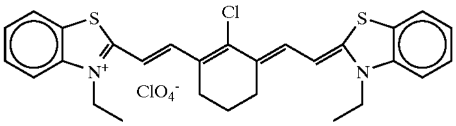

III-3

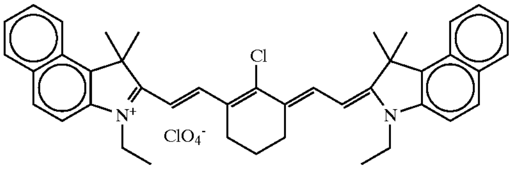

III-4

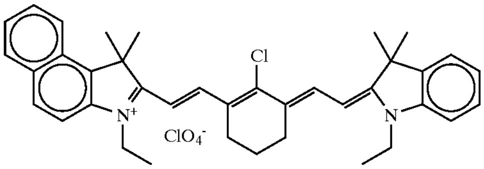

III-5

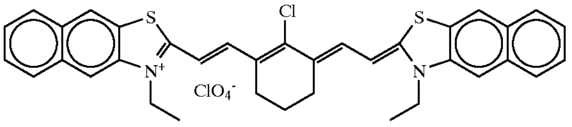

III-6

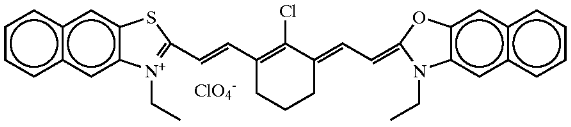

-continued
III-7
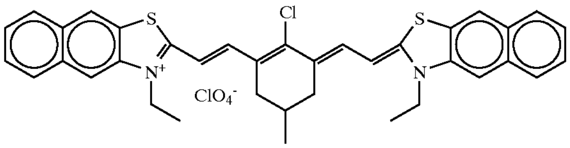
III-8
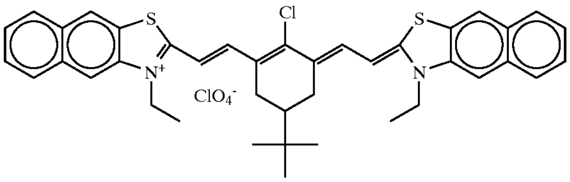
III-9
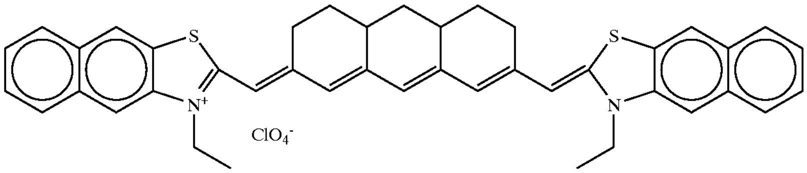
III-10
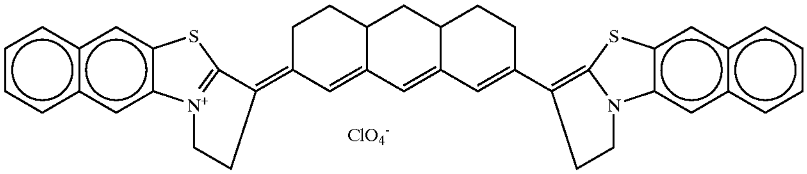
III-11
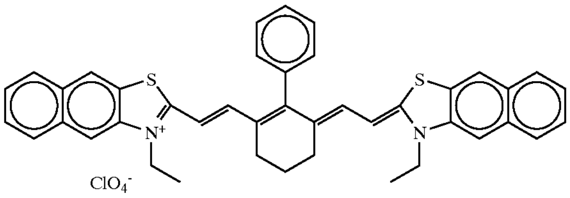
III-12
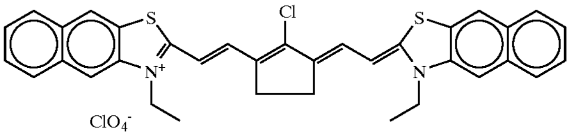
III-13
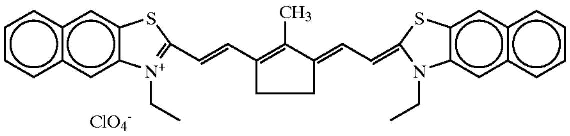
III-14
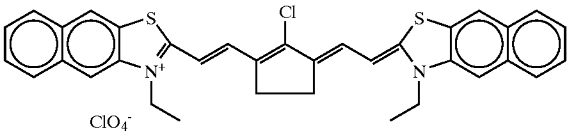
III-15
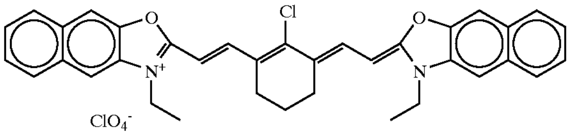
III-16
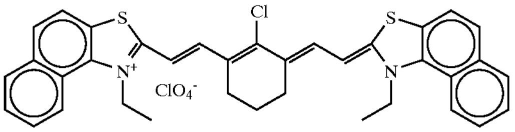
III-17
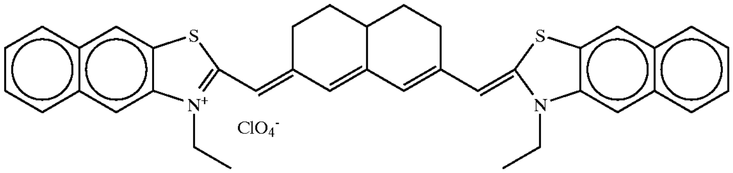
III-18
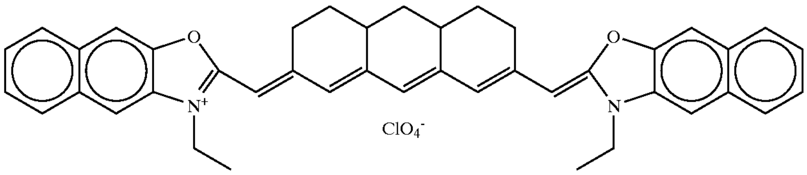

-continued
III-19
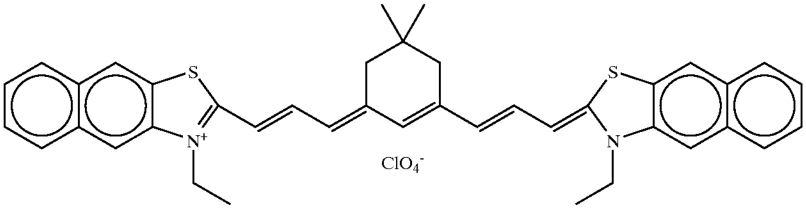
III-20
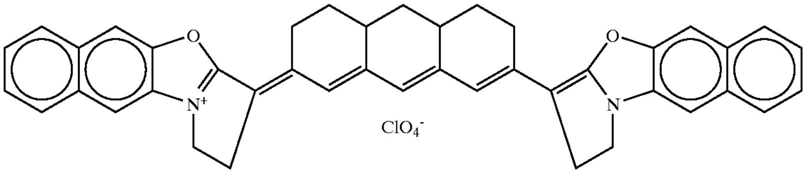
III-21
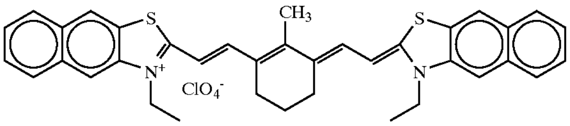
III-22
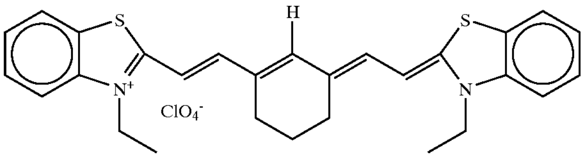
III-23
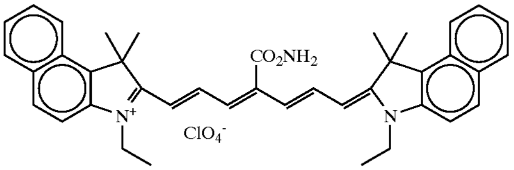
III-24
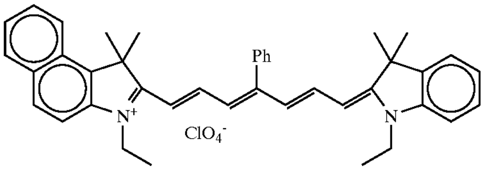
III-25
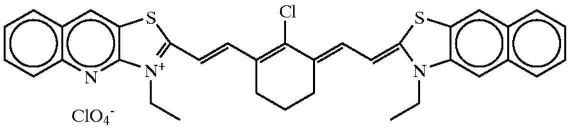
III-26
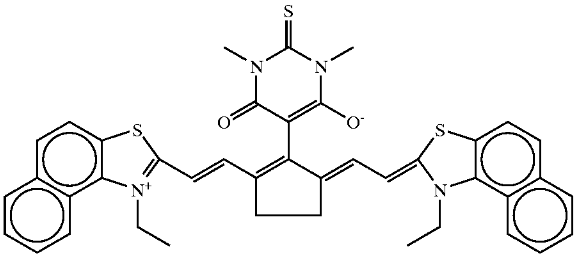
III-27
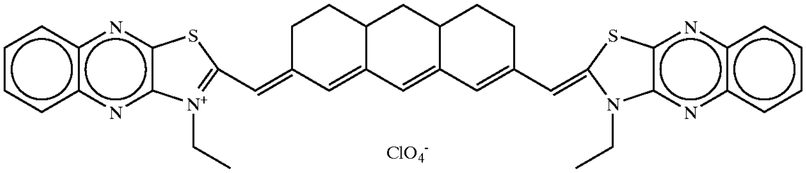
III-28
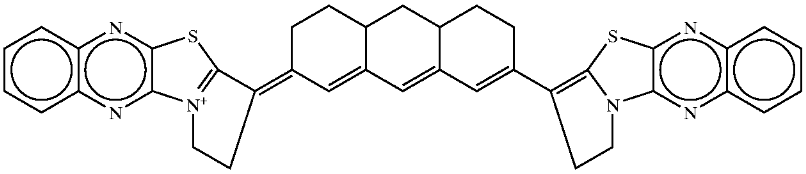
III-29
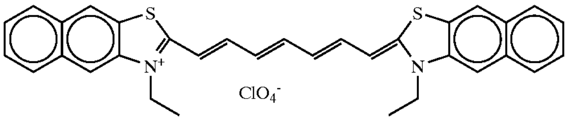
III-30
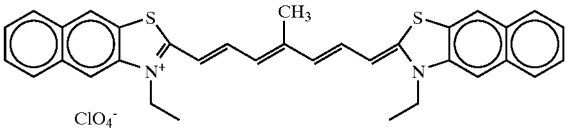

-continued
III-31
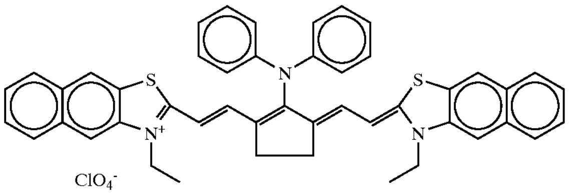
III-32
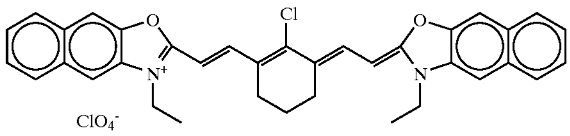
III-33
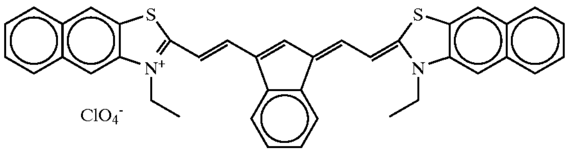
III-34
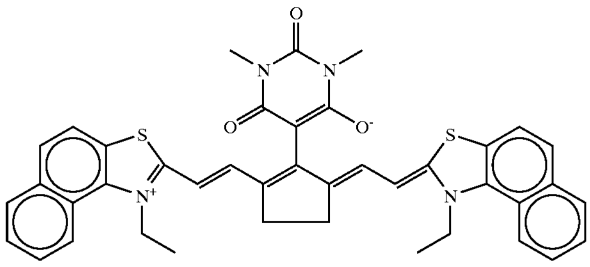
III-35
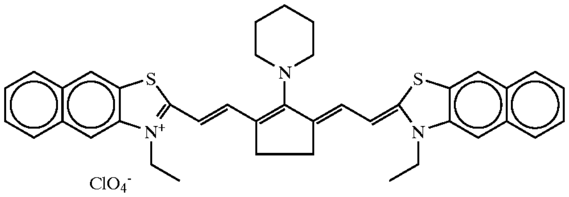
III-36
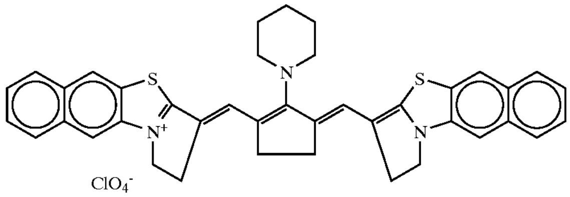
IV-1
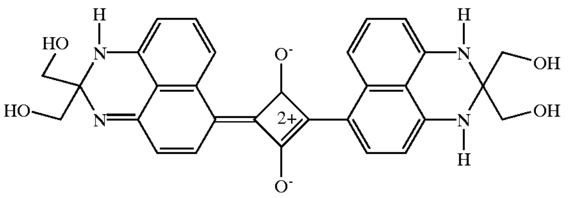
IV-2
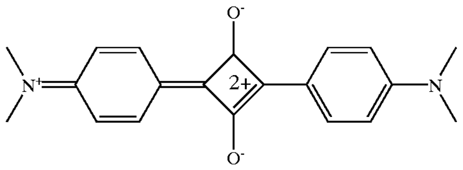
IV-3
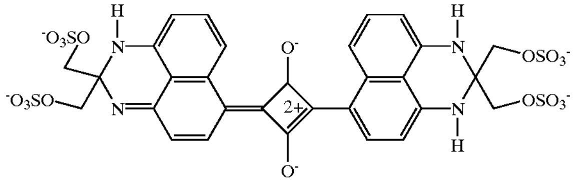
IV-4
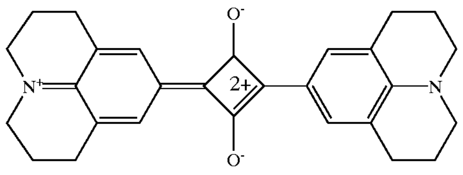
IV-5
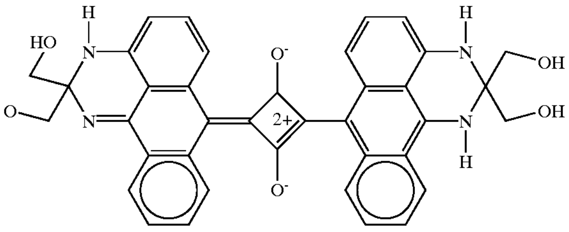
IV-6
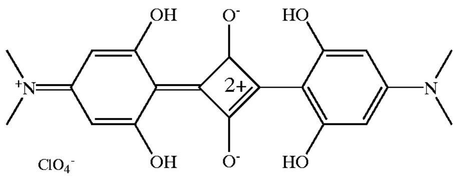
IV-7
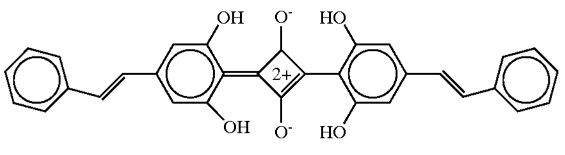
IV-8
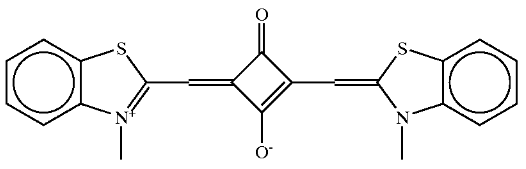

-continued
IV-9
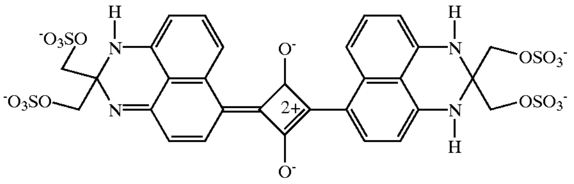
IV-10
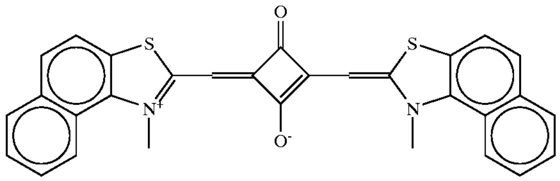
IV-11
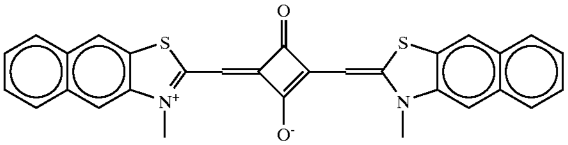
IV-12
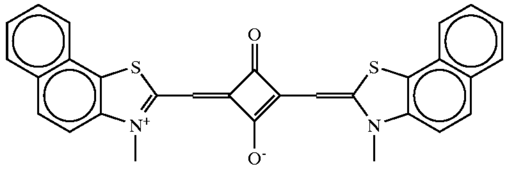
IV-13
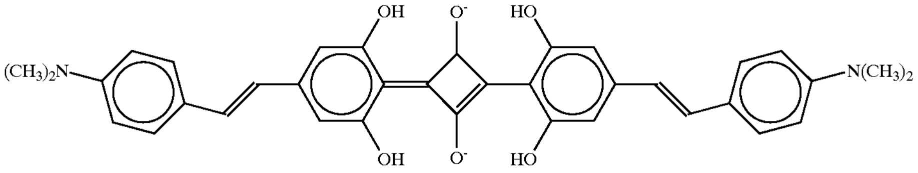
V-1
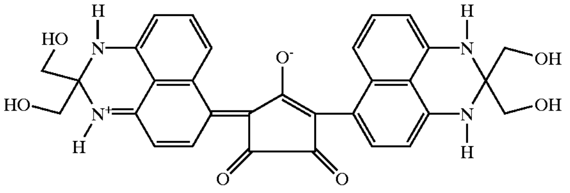
V-2
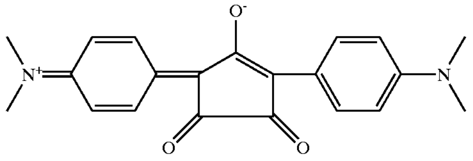
V-3
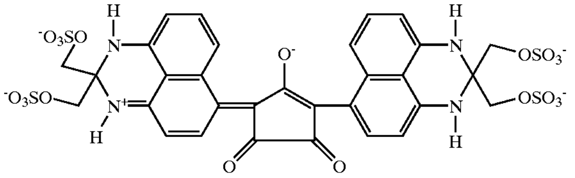
V-4
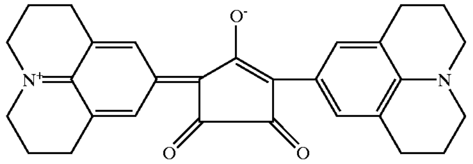
V-5
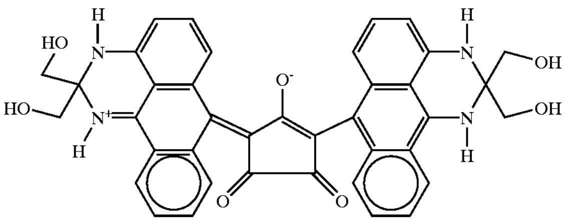
V-6
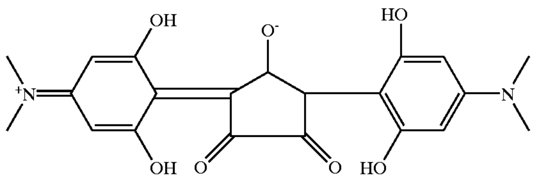
IV-7
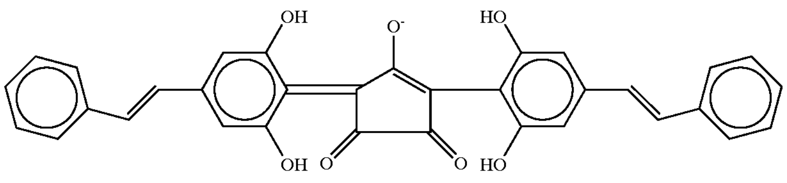

-continued
IV-8
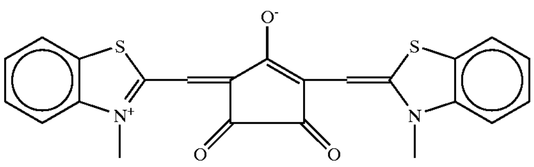
VI-1
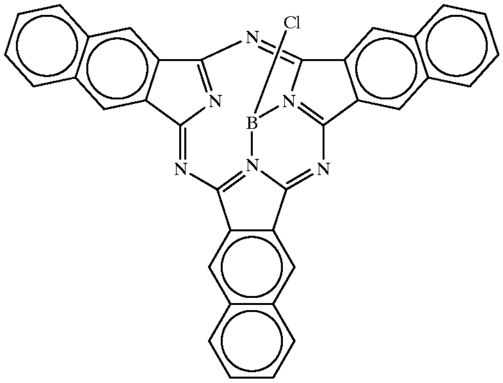
VI-2
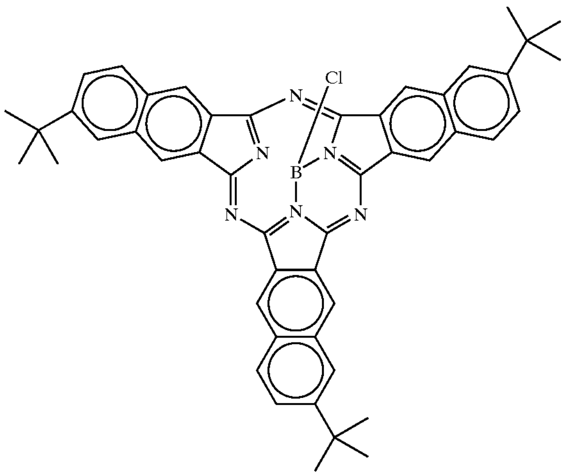
VI-3
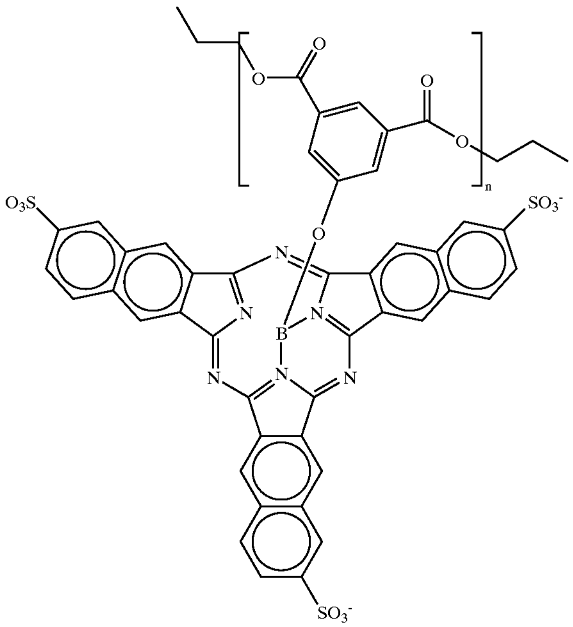
VI-4
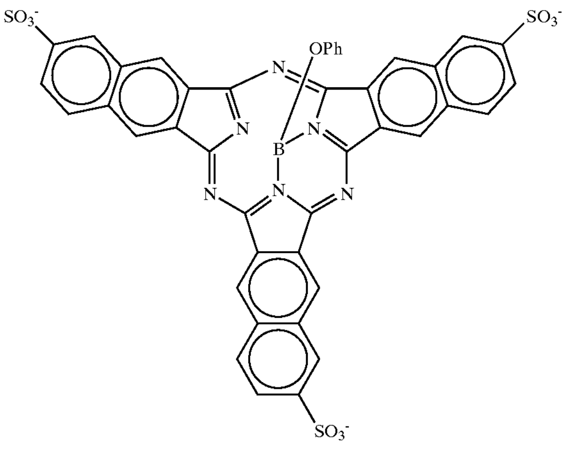
VII-1
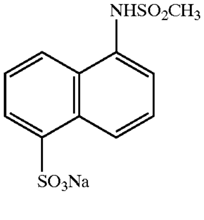

-continued
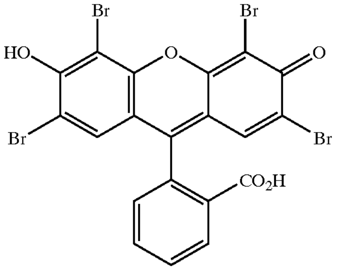
VIII-1
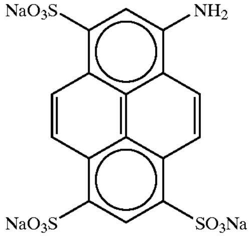
VIV-1
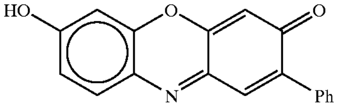
X-1
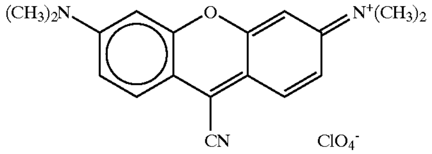
XI-1
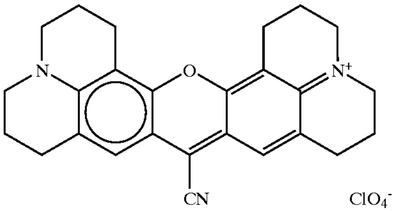
XI-2
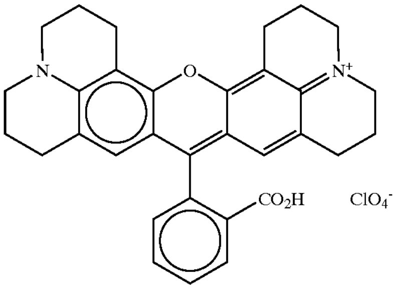
XI-3
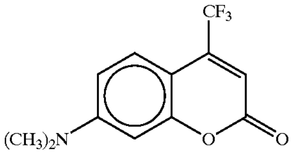
XII-1
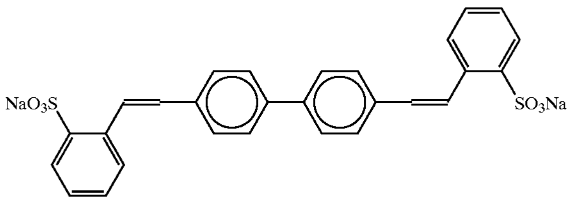
XIII-1
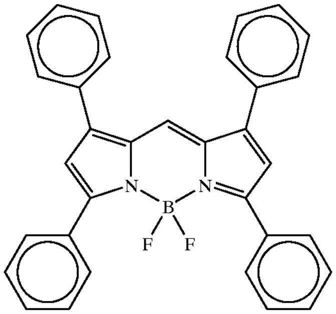
XIV-1
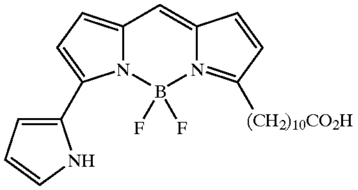
XIV-2
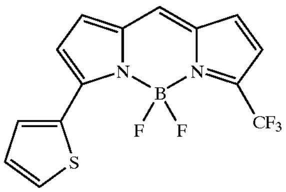
XIV-3
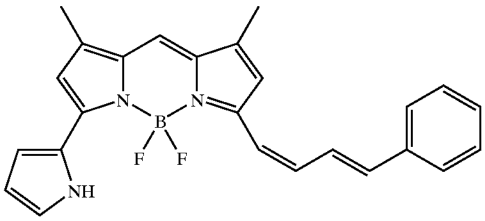
XIV-4

-continued
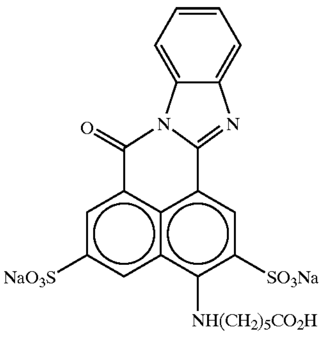
XV-1
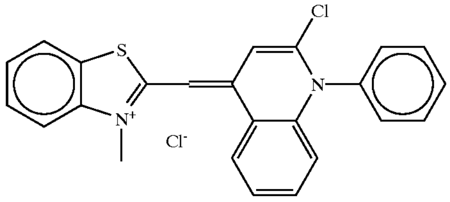
XVI-1
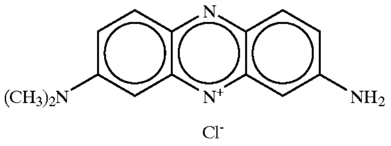
XVII-1
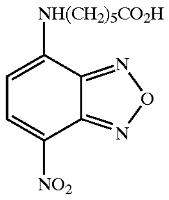
XVIII-1
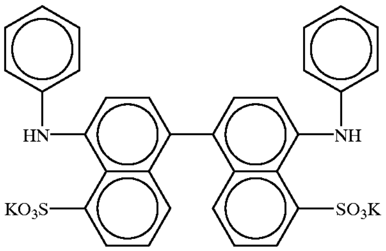
XIX-1
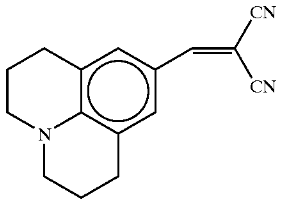
XX
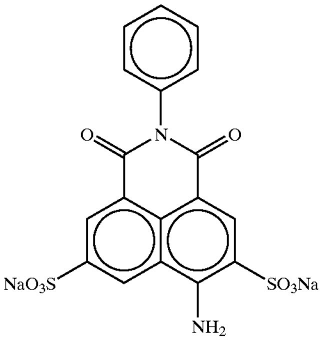
XXI
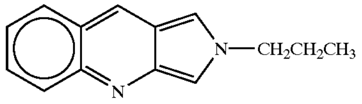
XXII
The following are some specific examples of useful dyes.
Dye 1 polymeric aluminum phthalocyanine dye (commercially available from Eastman Chemical as NIRF ink solution).
Dye 2
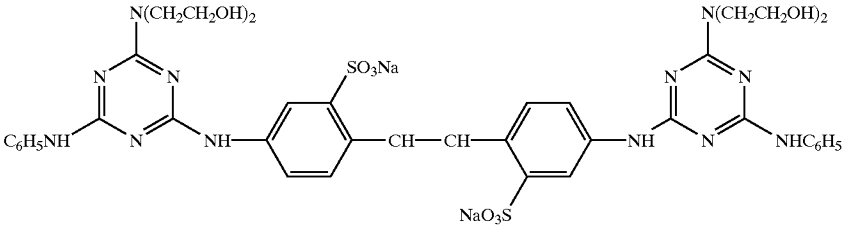

-continued
Dye 3
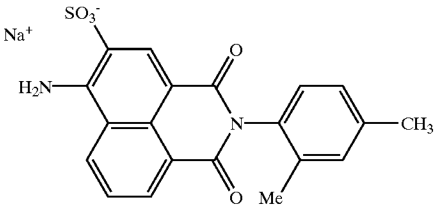
Dye 4
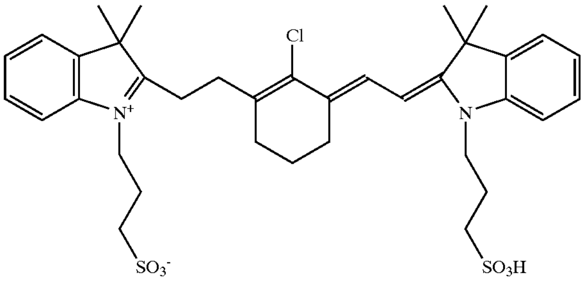
Dye 5
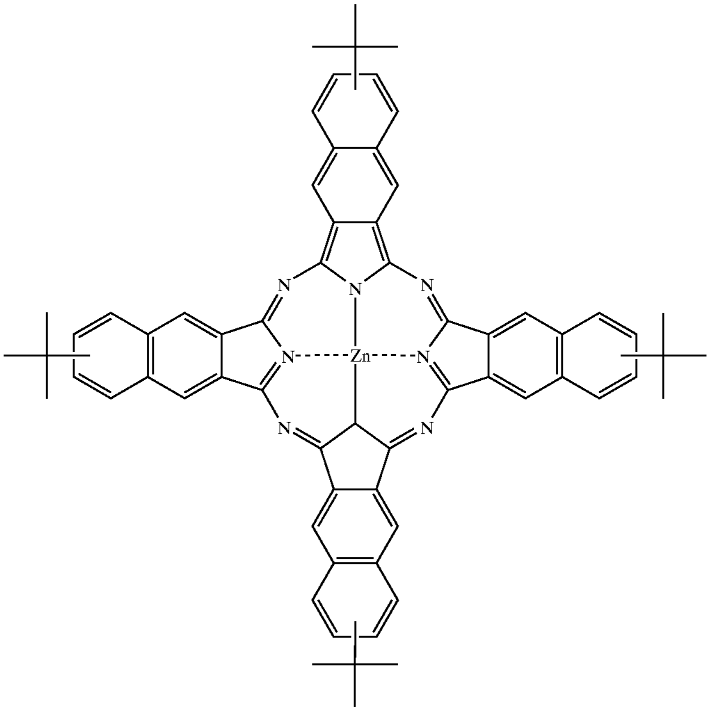
Dye 6
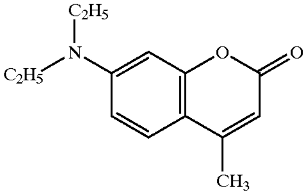
Dye 7
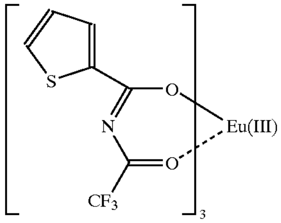
Dye 8
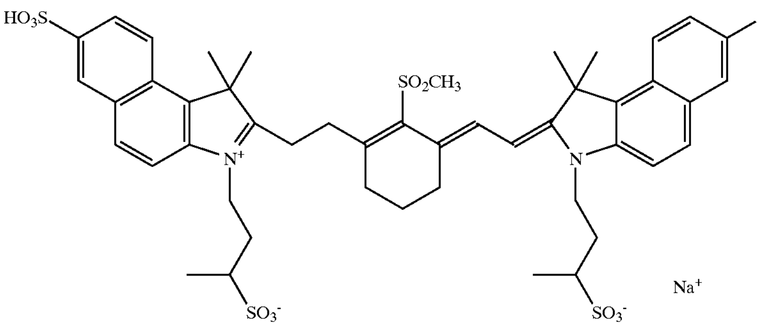

The methods of applying the invisible material on the album page 16 can be any digital imaging mechanism, including inkjet, direct thermal or thermal transfer printing, electrophotography, molecular recognition, thermal, and light induced chemical reaction, such as oxidant, reductant or metal complexation, of leuco dyes. Other methods include the use of commercial color imaging system 10s, such as Cycolorm™ system 10 available from Cycolor Inc., 8821 Washington Church Road, Miamisburgh, Ohio 45342 and microcapsules (cyliths) containing colored dyes are selectively imagewise exposured with sequential red, green and blue light. The light initiates the hardening of the shell of the exposed bead rendering them resistant to destruction during the processing step. During the processing step the beads are compressed and the non-hardened beads are crushed releasing their colored dye which is the complimentary to the exposure color (red/cyan, green/magenta, blue/yellow). A discussion on methods of applying a material to a surface can be found in "Imaging Processes and Materials", chapter 1, Neblette's, $8^{th}$., Van Nostrand Reinhold, 1989. The ink deposit is generally discussed herein in terms of ink jet printing, but it will be understood that like considerations apply to other printing methods.

The following are specific examples of inkjet and thermal dye transfer methods for applying infrared luminescence ink deposits on the album pages.

Inkjet Method

The concentration of the invisible material in the ink solution can be 0.005%~1% by weight, preferably 0.01%~0.1% by weight. A suitable surfactant such as surfynol® 465 surfactant (an ethoxylated dialcohol surfactant sold by Air Products and Chemicals, Inc.)can be added at 0.5%–2% by weight, with the presence of 2–10% glycerol, 2–10% diethyleneglycol, 2–10% propanol, and 0%–2% triethanolamine. Commercial inkjet printers such as HP690C or Epson Stylus Color 200 was used for the testing, with the printing resolution of 300 or 360 dpi. Either stepwedge files or 2-D bar-code encoding compressed sound file can be printed digitally onto various supports at the visual reflection density of 0.01–0.3, preferably 0.05–0.1.

Thermal Dye Transfer Method

An assemblage of thermal dye transfer comprises: (a) a dye-donor element that contains the invisible material, and (b) a dye-receiving element which is in a superposed relationship with the dye-donor element so that the dye-layer of the donor element is in contact with the dye-image receiving layer of the receiving element. The dye-receiving element is the ink receptive layer of the holder. The assemblage may be pre-assembled as an integral unit when a single luminescent dye material is transferred. This can be done by temporarily adhering the two elements together at their margins. After transfer, the dye-receiving element is then peeled apart to expose the dye transfer image. More than one dye donor sheet containing different luminescent materials can also be used and multiple luminescent 2D bar-code images can be transferred consecutively.

The luminescent material in the dye-donor element is dispersed in a polymer binder such as a cellulose derivatives, e. g., cellulose acetate hydrogen phthalate, cellulose acetate propionate, cellulose acetate butyrate, cellulose triacetate or any of the materials described in U.S. Pat. No. 4,700,207. The binder may be used at a coverage of from about 0.1 to about 5 $g/m^2$, and the luminescent material can be used at a coverage of from about 0.02 to about 0.2 $g/m^2$. The support for dye-donor element in this invention can be any material that is dimensionally stable and can withstand the heat of the thermal printing heads. Such materials include polyesters such as poly(ethylene terephthalate); polyamides; polycarbonates; cellulose esters such as cellulose acetate; fluorine polymers such as polyvinylidene fluoride or poly(tetrafluoroethylene-co-hexafluoropropylene); polyethers such as polyoxymethylene; polyacetals; polyolefins such as polystyrene, polyethylene, polypropylene or methylpentane polymers; and polymides such as polymide-amides and polyetherimides. The support may be coated with a subbing layer, if desired, such as those materials described in U.S. Pat. No. 4,695,288.

The following are examples of specific ink formulations.

Formulation 1

1.5 g of stock solution of ink containing a near-IR dye (dye 1, 0.06% by weight,) commercially available from Eastman Chemical Company as a NIRF™ ink (PM19599) diluted with 13.5 g of solution containing surfynol® 465 (from Air Product), glycerol, diethyleneglycol, propanol and distilled water so that the final concentration of dye 1 is 0.006% by weight and 1% surfynol 465, 5% glycerol, 4% diethyleneglycol and 5% propanol. The resulting ink solution can be filled into a refillable inkjet cartridge. Ink deposits are invisible to human eye under normal viewing conditions.

Formulation 2

The ink solution of Formulation 1 can be modified by substituting for the fluorescent dye is a UV-absorbing, visible fluorescing dye (dye 2) at a final concentration of dye 2 is 0.1% by weight in the ink solution.

Formulation 3

The ink solution of Formulation 1 can be modified by substituting for the fluorescent dye is a visible-absorbing, visible fluorescing dye (dye 3), and that the final concentration of dye 3 is 0.01% by weight in the ink solution.

Formulation 4

The ink solution of Formulation 1 can be modified by substituting for the fluorescent dye is an infrared-absorbing, infrared fluorescing dye (dye 4, a cyanine dye), and that the final concentration of dye 4 is 0.01% by weight in the ink solution.

Formulation 5

A luminescence dye-donor element can be prepared by coating the following layers in the order recited on a holder: (1) Subbing layer of dupont Tyzor TBT® titanium tetra-n-butoxide (0.16 $g/m^2$) coated from a n-butyl alcohol and n-propylacetate solvent mixture, and (2) Dye layer containing the luminescent dye (dye 5, a zinc naphthalocyanine derivative) shown in Table 1 (0.054 $g/m^2$), in a cellulose acetate propionate (2.5% acetyl, 48% propionyl) binder (0.14 $g/m^2$) coated from a 2-butanone and propyl acetate (80/20 ratio by weight) solvent mixture. (3) A slip layer was coated on the back side of the element similar to that disclosed in U.S. Patent (Henzel et a;, Jun. 16, 1987)

The dye receiving element can be similar to that disclosed in U.S. Pat. No. 4,839,336.

Formulation 6

The element of Formulation 5 can be modified by use as the luminescent dye a UV absorbing, visible fluorescing dye (dye 6, a coumarin dye).

Formulation 7

The element of Formulation 5 can be modified by use as the luminescent dye a UV absorbing, visible fluorescing dye (dye 7, an europium complex).

Formulation 8

The element of Formulation 5 can be modified by use as the luminescent dye an infrared-absorbing, nonfluorescing dye (dye 8) at a final concentration of dye 8 is of 200 ppm by weight in the ink solution.

The dye-donor element may used in sheet form or in a continuous roll or ribbon. The reverse side of the dye-donor element may be coated with a slipping layer to prevent the printing head from sticking to the dye-donor element. Such a slipping layer would comprise a lubricating material such as a surface active agent, a liquid lubricant, a solid lubricant or mixtures thereof, with or without a polymeric binder. Preferred lubricating materials include oils or semicrystalline organic solids that melt below 100° C. such as poly (vinyl stearate), beeswax, perfluorinated alkyl ester polyethers, poly(caprolactone), silicone oil, poly (tetrafluoroethylene), carbowax, poly(ethylene glycols). Suitable polymeric binders for the slipping layer include poly(vinyl alcohol-cobutyral), poly(vinyl alcohol-co-acetal), poly(styrene), poly(vinyl acetate), cellulose acetate butyrate, cellulose acetate propionate, cellulose acetate or ethyl cellulose. The amount of the lubricating is generally in the range of about 0.001 to about 2 $g/m^2$. In the presence of a polymeric binder, the lubricating material is present in the range of 0.01 to 50 weight %, preferably 0.5 to 40, of the polymer binder employed.

The support of the holder can be transparent film such as a poly(ether sulfone), a polymide, a cellulose ester such as cellulose acetate, a poly(vinyl alcohol-co-acetal) or a poly (ethylene terephthalate). The ink receptive layer 36 can comprise, for example a polycarbonate, a polyurethane, a polyester, polyvinyl chloride, poly(styrene-co-acrylonitrile), poly(carprolactone) or mixtures thereof. The ink receptive layer 36 can be present in the amount of about 1 to about 5 $g/m^2$.

Thermal printing heads which can be used to transfer dye from the dye-donor elements are available commercially. There can be employed, for example, a Fujitsu Thermal Head (FTP-040 MCSOO1), a TDK thermal head F415 HH7-1089 or a Rohm Thermal Head KE 2008-F3.

As a convenience, album pages 16 are generally referred to herein as if visible images 19 were present on or in the pages before the printing of the invisible data patches 18. This is the case with image-type album pages 16, since the visible images 19 are printed on the same support as the data patches 18 immediately before printing the data patches 18, or earlier. With holder-type album pages 16, printed sheets 34 are used, that is, the visible images 19 are printed on their own supports, independent of the printing of the data patches 18. In this case, it is not necessary for the visible images 19 to be present in the album page 16 when the data patches 18 are printed. It is highly preferred; however, that an arrangement of visible images 19 be allocated to an album page 16 prior to the formatting of data patches 18. The size, shape, and arrangement of visible images 19 can then be considered during formatting of related data patches 18. On the other hand, data patches 18 can be formatted and printed prior to an allocation of visible images 19 to the album page 16, by limiting user choices in data patch 18 formatting, or visible image 19 selection and arrangement, or both.

The system 10 provides for the making of album pages 16 with data patches 18, at home or at a kiosk, or remotely, through the internet or other network at a distant site or photofinishing service. The stored computer program in the editor 12 of the system 10 is interactively accessible through the user interface 14. The editor 12 has a general purpose computer, such as a personal computer, that uses the computer program to interactively format and print the invisible data patches 18 on album pages 16. The computer program has a graphical interface through which user choices are entered. The computer program is loaded from a computer readable storage medium and can be transferred on such media or as an electronic or optical signal. The computer readable storage medium may comprise, for example; magnetic storage media such as a magnetic disc (such as a floppy disc) or magnetic tape; optical storage media such as an optical disc, optical tape, or machine readable bar code; solid state electronic storage devices such as read only memory (ROM), or random access memory (RAM); or any other physical device or medium employed to store a computer program.

Detailed features of the system 10 can be varied to meet differing needs. In an embodiment shown in FIG. 1, the system 10 has a first editor 12*a* that is based on a personal computer and a second editor 12*b* that is part of a kiosk 48. The user interface 14 of each editor 12 is a display 50 and an input station 52. The type of display 50 and input station 52 used are not critical. For example, the display 50 can be a liquid crystal display or CRT and the input station 52 can be a personal computer keyboard or a touch screen. It is preferred that the display 50 be capable of show a semblance of an entire album page 16 in sufficient resolution for included images to be recognizable.

The system 10 has a digital storage unit 54 that is accessible by the editor 12. The digital storage unit 54 holds data files and, as appropriate, visible image files for one or more album pages 16. After editing, printing instructions are output from the editor 12 to a printer 20. Additional input and output devices and storage units can also be provided. Images and data files can be supplied from fixed or removable memory. Image and sound capture devices can also be included to input image and sound files. Multiple editors can be used and multiple systems can be interconnected. Different parts of the system 10 can be directly connected or can be connected through a local network or a large network such as the internet.

In FIG. 1, a local printer 20 and scanner 56 are connected to the first editor 12*a*. A tethered or removable camera 58 is connected or connectable. Sound capture devices 60 are associated with the editor 12 and camera 58. The kiosk 48 includes a local scanner 56 and printer 20 and can include the same features as the computer 12*a*. The computer 12*a* and kiosk 12*b* are both provided with local storage media 54 (shown only for the computer). The computer 12*a* and kiosk 12*b* also have additional storage units, at least in the form of random access memory. The type of memory used with the editor 12 is a matter of convenience. For example, hard discs, floppy discs, compact discs, and flash memory cards and other types of magnetic, optical, and electronic memory are all suitable. Non-volatile memory is preferred for storage of archival copies of data files and images used.

Both the computer 12*a* and the kiosk 12*b* are connected to a network 62 and then to a photofinishing service 64 and to the remote memory of an image storage service 66. Communication links 68 between the components of the system can be optical or wire cables or wireless communication channels or any combination. The image storage service 66 provides memory devices that can be remotely accessed over a network, such as the internet. The photofinishing service can input images or data files or both or output album pages 16 or provide file storage or perform a combination of these and other activities.

Ancillary to the parts of the system 10 previously discussed is a reader 22 that is used to playback the data patches 18 after printing. Referring to FIG. 4, a reader 22 captures invisible data patches illuminated by radiation of an appropriate frequency. The embodiment of the reader 22, shown in FIG. 4, has a body 70 that holds a an array of light emitting diodes 72 and a power unit 74 that drives the light emitting diodes 72. The body 70 also supports an image sensor 76 and an optical system 78 that images on the image sensor 76. In use, the light emitting diode or diodes 72 emit an illumination beam (illustrated as waves 79) onto a data patch and a luminescent emission or reflection (illustrated as dashed lines 80) is directed by the optical system 10 onto the image sensor 76 and is detected and decoded by a controller 81. Signal paths and power connections are indicated by lines 83. The reader 22 is preferably portable and has a handle 82 which can be gripped by the user during use. The reader 22 can be permanently or temporarily mounted to a support; or, in a computer-based system, the reader 22 can be incorporated in the printer 20 or into a flat bed or paper feed type scanner or other device.

The image sensor 76 in the reader 22 is sensitive to a band of radiation emitted or reflected by the data patch 18 and thus, detects a radiation image of the data patch. The image sensor 76 comprises one or more radiation-sensitive electrical devices which convert an impinging radiation beam into a digital image, that is, an electrical signal from which a one or two dimensional image can be reconstructed. The light-sensitive electrical device can be a charge coupled device, a charge injection device, a photodiode, a CMOS imager, or another type of photoelectric transducer. The digital image sensor can include one or more two-dimensional light-sensitive electrical devices, or one or more two dimensional arrays of such devices, or one or more one-dimensional arrays of such devices. With one-dimensional arrays, the image sensor includes means, well known to those of skill in the art, for scanning the incident beam to provide a two-dimensional digital image. Two-dimensional devices are preferred over one-dimensional devices and the use of single discrete devices is currently preferred over the use of arrays of smaller devices for reasons of image quality and ease of assembly. The use of the single two-dimensional capture device is preferred for reasons of economy. An example of a suitable digital image sensor comprises a single CCD, such as a charge coupled device marketed by Eastman Kodak Company of Rochester, N.Y. as Model No. KAF-6300. Lower resolution digital image detectors can also be used, depending upon the resolution required, such as a VGA (video graphics array) sensor having a resolution of 640 by 480 pixels.

The reader 22 can include a light source for illuminating the data patch 18. The reader 22 can use a variety of light sources. For infrared radiation, light emitting diodes can be used. An example of a typical light emitting diode is a Rohm SIR-320ST3F infra-red LED, manufactured by Rohm Company Limited, Tokyo, Japan. An example of a suitable colorant for an encodement using the Model KAF-6300 sensor and this light emitting diode is Tennessee Eastman ink pm19599/10, marketed by Tennessee Eastman Company of Kingsport, Tenn.

During use, it is necessary to align the planar image sensor 76 with the data patch 18 so as to minimize skew and cut-off of the image of the data patch 18 on the imager 76. Once this is done, reading is actuated and the image is captured. The reader 22 includes a processing system that decodes the captured data patch image into a replica of the data file originally encoded. The data file can then be handled in a manner appropriate for the information content. For example, a sound file can be immediately decompressed, converted into an analog audio signal and played back as sound (indicated in FIG. 4 by musical notes 84) through an amplifier and speaker 86 built into the reader 22. For this purpose, it is convenient if the reader 22 is hand held and includes all necessary components for playback or the reader 22 has the capability to transfer signals to a separate unit including a sound system, that then plays back the sounds.

A data file is provided to the editor 12 in a format that defines a two-dimensional printable encodement, that is, a digital map of a data patch 18, or is converted into a digital map of data patch 18 within the editor 12. A variety of suitable encodement schemes are available. Two-dimension bar codes and the like have greater capacity than simple encodements such as one-dimensional bar codes and are therefore preferred for sound files and other large files. For example, the data patch can be in accordance with Standard PDF 417 and the LS49042D Scanner System 10 marketed by Symbol Technologies, Inc., of Holtsville, N.Y.; or the encodement scheme marketed as Paper Disk by Cobblestone Software, Inc., of Lexington, Mass.

A two-dimensional bar code can store a large data block. The amount of encoded data stored depends on the size of the surface bearing the invisible colorant 88 (shown in FIG. 20 by ink deposits 88). For example, if the surface is 4" by 6" the bar code can store at least 14.4 kilobytes of data. In general the data stored is at least 600 bytes per square inch, preferably at least about 1000 bytes per square inch and most preferably at least about 1500 bytes per square inch. In general the data stored is between about 500 and 5000 bytes per square inch, preferably between about 1000 and 5000 bytes per square inch and most preferably about 1500 and 5000 bytes per square inch.

Referring now to FIGS. 2–4 band 5–17, after the computer program is initiated, the user is asked to select a type of album page 16. The user can select an album page format from a menu of common album page formats and/or album page products available from various manufacturers. The album pages 16 can be the above-described holder-type or image-type album pages 16, but are not limited to these types. For example, the term "album page" used herein, is inclusive of a backing sheet bearing a set of adjoining or spaced apart stickers or separable prints and is also inclusive of a sheet of glass bearing a collage of images. It is preferred that the album pages 16 are capable of being bound or grouped together as leaves of a book. In a particular embodiment of the method and computer program, as shown in FIG. 5, the user is presented with a screen on the display 50 that shows page proofs or semblances 90 of a series of album page types and the user can click a mouse button when a mouse cursor (not shown) is positioned over the sea desired album page type. The page proofs 90 are each a graphical simulation of the particular type of album page 16. It is preferred that the page proofs show the appearance of the album page 16 after printing. The appearance can be anything from realistic to diagrammatical, but it is preferred, for ease of use, that the appearance be close to that of the album page 16 after printing.

The page proof 90 has one or, preferably, a plurality of image frames 92. Image frames 92 are visible and each image frame 92 denotes the location of a visible image 19 after printing of data patches 18 on an image-type album page 16*a*, or after printing of data patches 18 and loading of printed sheets 34 into respective pockets 32 of a holder-type album page 16*b*. (The term "completion" is used herein to refer generically to this printing or printing and loading.)

Image frames 92 are visible features that demarcate the locations of images in the completed album page. The image frames can be the margins 92*a* of representations of the images or, if representations of the images are not used, can be simply visible placeholders 92*b* in the form of lines or other marks or margins of areas of a different color or the like. In any case, image frames 92 are easily seen by the user and have the same geometric relation to each other and the rest of the page proof 90 as do the respective printed images 19 and main portion 26 after album page 16 completion. For ease of use, it is preferred that the image frames 92 are margins 92*a* of digital representations 94 of the images. For image-type album pages 16, the representations 94 shown can be the copies of the images to be printed on the album page 16 or can be electronic copies differing in resolution or size or both. For most uses, it is convenient to have representations 94 that are smaller than the respective printed images 19.

The image frames 92 on the page proof 90 can be provided in a predetermined arrangement or can be set up by the user by moving, placing, and otherwise editing image frames 92 or representations 94. Predetermined arrangements are particularly suitable for use with holder-type album pages 16*b* that are subdivided into pockets 32, since the arrangement of pockets 32 defines the image frames 92. In FIG. 5, a screen shows page proofs 90*a* for some available holder-type album pages 16*b* having pockets 32 and also shows a configurable page proof 90*b*. In this case, the program gives the user the option of moving markers 96 on the page proof 90*b* (indicated in FIG. 4 by dashed lines) to change the arrangement of image frames 92 to match a particular album page 16 available to the user, but not provided as a predetermined arrangement. This configurable page proof 90*b* can also be utilized by the user to indicate an arrangement of printed sheets 34 in a holder-type album page 16 which holds printed sheets 34 in place with a tacky backing 44 or the like, covered by a transparent sheet. If desired, the configurable page proof 90*b* can also be used with an image-type album page 16 to arrange frames before placement of representations 94 of digital images on the page proof 90.

The representations 94 and printable digital images (hereafter also referred to collectively as "digital images") can be obtained in any of the manners known in the art. For example, the digital images can be obtained by capturing and digitizing images using a digital camera, scanning prints, downloading from an online image storage service, downloading from a camera, or downloading from a storage device, such as a floppy disk, memory card, or compact disc. After the digital images are input into the general purpose computer, the digital images are converted, as necessary, into a format suitable for processing, such as a red, green and blue (RGB) digital image format. The digital images can be processed, prior to farther use, with correction and enhancement algorithms, as desired. For example, a color and density balance algorithm can be used to correct for color cast due to illumination and for exposure variation due to errors in the camera exposure control.

After the page proof 90 for a particular album page 16 is selected or prepared, the user allocates images to the page proof 90. In allocating an image, the user determines image content on the album page 16 and links that content to a particular image frame 92, either as defined by the borders of the representation 94 or by the markers 96 of the image frame 92. The allocation of the image also defines a region of the album page 16 that would need to be partially or fully overlapped by a data patch 18 related to that specific image if a user is to be able to point a reader 22 at an individual printed image 19 and play back a sound file for that image. This region is in registration with at least one edge 98 of the respective image frame 92 and, preferably is in registration with a corner 99 formed by two intersecting edges 98. Registration can be exact or the region for the data patch 18 can extend slightly beyond the edge 98 or corner 99. It is preferred that the data patch region extend beyond the corner 99 or edge 98 to a distance that is no more than about 25 percent of the shorter dimension of the image frame.

The allocating of images can be provided within the computer program by allowing the user to select from image files available to the program. The allocation of images can also be accomplished separately from the computer program. For example, the user can physically arrange photographic prints or other printed sheets 34 in a pattern matching an album page 16 represented on the display of the editor 12 by a page proof 90. It is preferred that representations 94 of the images be arranged on the page proof 90, since there is a greater risk of error, if the user must look back and forth between the display 50 and the physical arrangement to perform the method. With preprinted images in the form of printed sheets 34, extra steps may be required to provide digital representations 94 of the images in the program. For example, preprinted photographs can be quickly scanned in low resolution to provide representations 94 usable in the program.

Figure 6:
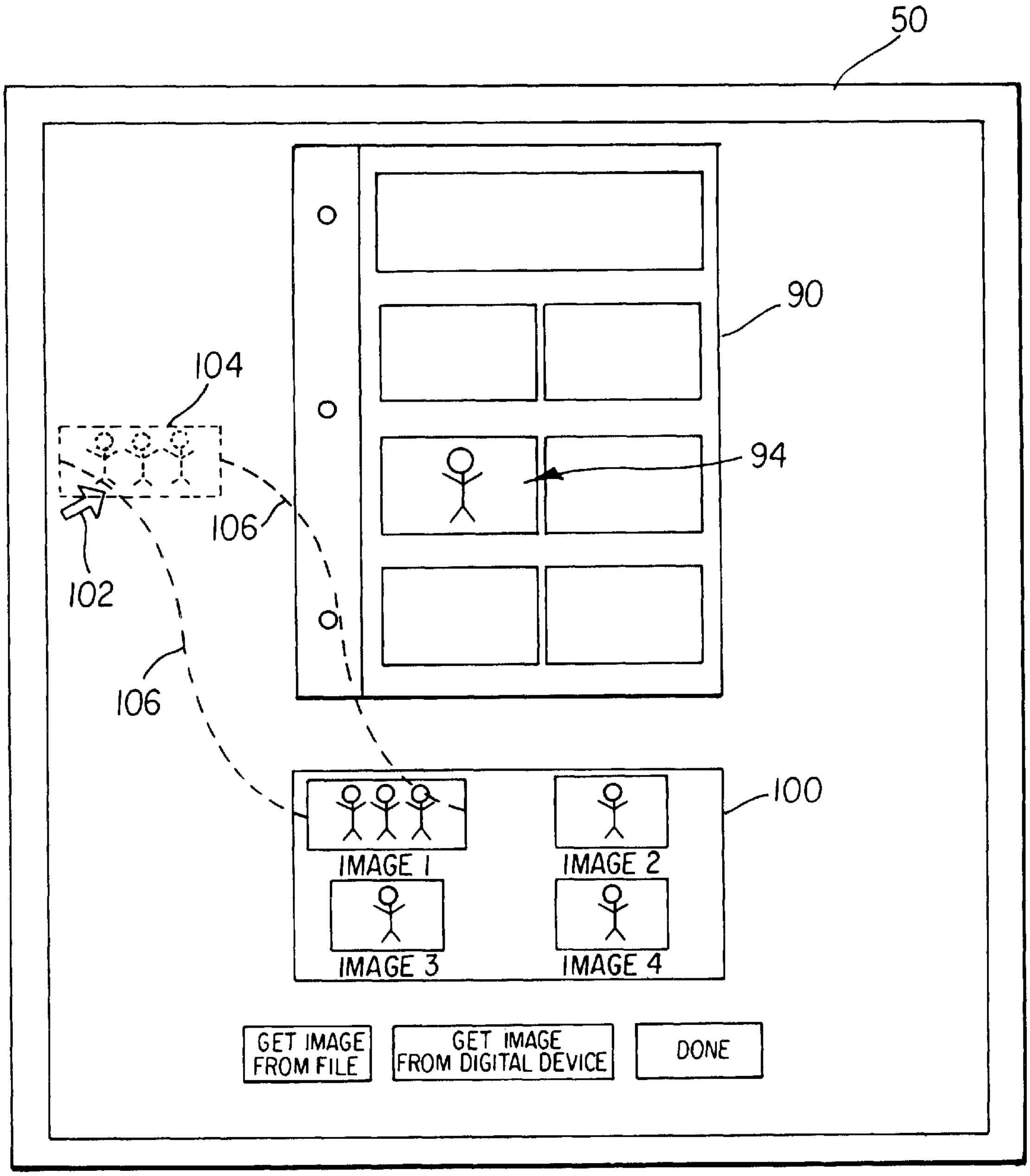
FIG. 6 is the same view as FIG. 5, but shows an image selection screen of the program.

Referring to FIG. 6, if representations 94 of digital images are to be used, the computer program shows the page proof 90 and gives the user an opportunity to select from available digital images. This selection opens files in a manner provided by the operating system of the computer, as in the opening of a document or other file in a word processing program or other program. It is preferred that selected image files are not immediately imposed on the page proof 90, but are instead initially placed in a tally 100 separate from the page proof 90.

The tally 100 can be limited to filenames or icons or both, but it is preferred that the tally 100 include thumbnails, that is, reduced size representations 94 of the digital images. The tally 100 can be populated by the user selecting individual images or can be automatically populated with the contents of a directory or the memory of a capture device, or can be populated by a combination of procedures.

After the tally 100 is populated to the user's satisfaction, the user can move representations 94 of images onto the page proof 90. The manner in which the program shows this process is not critical, but in a preferred embodiment, the user drags images from the image list and drops them onto the page proof 90. (This is illustrated, in FIG. 6, by a cursor 102, dotted line copy 104 of the image, and a pair of dotted lines showing the path 106 of the cursor 102 and dotted line copy 104 of the image.) If desired, representations 94 can automatically resize, as necessary during this process, to fill the respective image frame 92 or reach a default size. If image frames 92 are initially present, then those image frames 92 can remain visible on or around representations 94 after image placement or can be eliminated when respective representations 94 are positioned.

The program can provide automatic reshaping of representations 94 of images to match specific image frames 92. This can be a change in aspect ratio in the manner of pseudo-panoramic photographic prints or can be a chopping to a non-rectangular shape. Reshaping is generally limited to image-type album pages 16, since the reshaping of printed images for other types of album pages 16 is likely to be inconvenient for the user. The program can give the user the option to change or eliminate the reshaping of one or more images. Defaults for this and other features can be preset by the user, or defined by the particular type of album page 16.

After one or more representations 94 have been placed on the page proof 90, the user can alter the arrangement of representations 94 or representations 94 and image frames 92, within the limits of the particular album page 16. The user can also move representations 94 from the markers for one image frame 92 to another. If image frames are defined by representations, then the user can simply move representations 94 to different sites on the page proof. The user is also offered the opportunity to alter the size and shape of individual digital images and to edit digital images in other manners. For example, editing can include cropping, resizing, formatting, redeye removal, and filtering. The software can also provide option decorative borders, backgrounds, overlays, photomontage elements, and the like, if desired. The user can also be given the opportunity to adjust resolution that will be used in printing the images. The resolution of the representations 94 on the page proof 90 can be adjusted in the same manner or some other indication can be provided of the selected resolution. Methods for doing this and more complex editing are commonly known and available in commercial software packages. With some types of album page 16, editing is limited by the shape of pockets 32 and other physical features of the album page 16 and can also be limited by the use of images in the form of previously printed sheets 34. In this case, editing is limited to selecting and arranging images for placement in the pockets 32 and selecting, editing, and arranging visible photomontage elements, such as annotations, that can be printed on the album pages 16.

After image frames 92 are designated, data files are selected. Since the data files are not limited to any particular type of digital file, any manner of obtaining and transferring digital files is suitable, with the limitation that the data file must be capable of being encoded as a data patch 18 that can then be read and decoded. For example, sound files, such as wave and midi files, can be obtained by downloading from a camera memory, or a compact disc or tape, or from memory of the editor 12. The sound files can then be converted into data patches 18 within the editor 12 or prior to receipt by the editor 12. The method is particularly suitable for sound files and, for convenience, the invention is generally described in terms of sound files. It will be understood that procedures like those described here for sound files are useable with other types of data files.

Sound files can be more difficult to work with than some other types of data files, because sound files can be large and can be edited in different ways. It is expected that editing of sound files will be necessary during use of the method in many cases, because sound files can be of any size and the size of data patches 18 is, in part, a function of data file size. Large sound files and corresponding data patches 18 can be reduced in size, by excising portions or compressing the files. Portions can be excised from files in a great many ways, such as, by cutting off the beginning, or the end, or part of both, or one stereo channel, or a midi instrument. Excising portions of files is acceptable to a user in some cases, but not in others, depending upon the manner of excising. The acceptability of particular compression procedures can vary with the content of the sound file and from user to user. Very lossy compression procedures or a major excision may be acceptable in one case, while only slightly lossy compression procedures or minor excision may be unacceptable in another.

Figure 11:
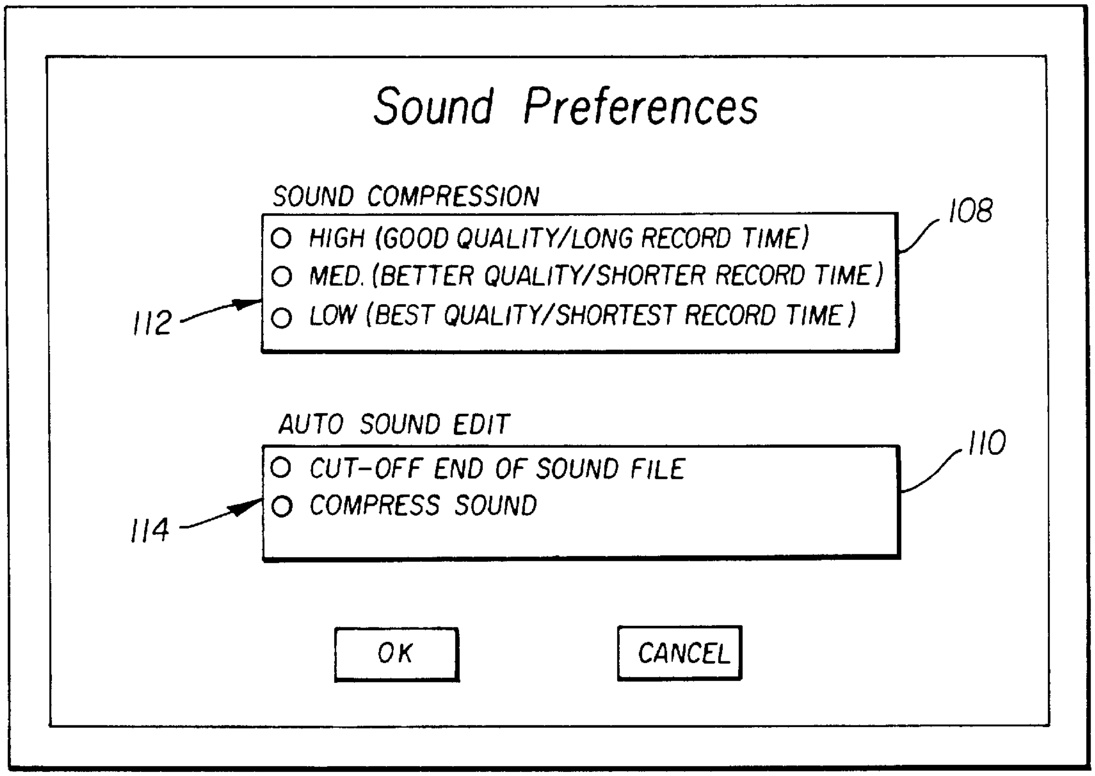
FIG. 11 is the same view as FIG. 5, but shows a sound preferences screen of the program.

In view of these differences, it is preferred that the program initially request an input of user options as to sound file resizing and then allow the user to change individual files as desired. To aid the user in editing sound files and to prevent bewildering the user with an array of choices, it is preferred that the computer program present the user with a limited number of sound file preferences. For example, as shown in FIG. 11, sound file preferences are conveniently limited to a choice of compression or excision as an initial sound editing approach and to the selection of an acceptable level of sound compression. In FIG. 11*a* screen labelled "Sound preferences" has a box 108 labelled "sound compression" and a second box 110 labelled "Auto sound edit". The "Sound preferences" box has radio buttons 112 (alternatively settable indicators) for high, medium, and low levels of compression and has accompanying explanations of the effects of selecting each button on sound quality and record time. The "Auto sound edit" box has radio buttons 114 providing the alternatives of cutting off the end of the sound file or compressing the sound file. The screen also has buttons for "OK" and "Cancel". To aid in the selection of a level of sound compression, a series of sounds can be played with degrading levels of quality and the user can be asked to designate an acceptable level of compression. It is currently preferred that the user be given a choice among sound compression levels that will all be adequate for all forms of sound including ambient, voice, and music. The user can also be given a choice of greater levels of compression, particularly if the user expects sound recording to be limited to less demanding uses, such as voice annotations.

Figure 10:
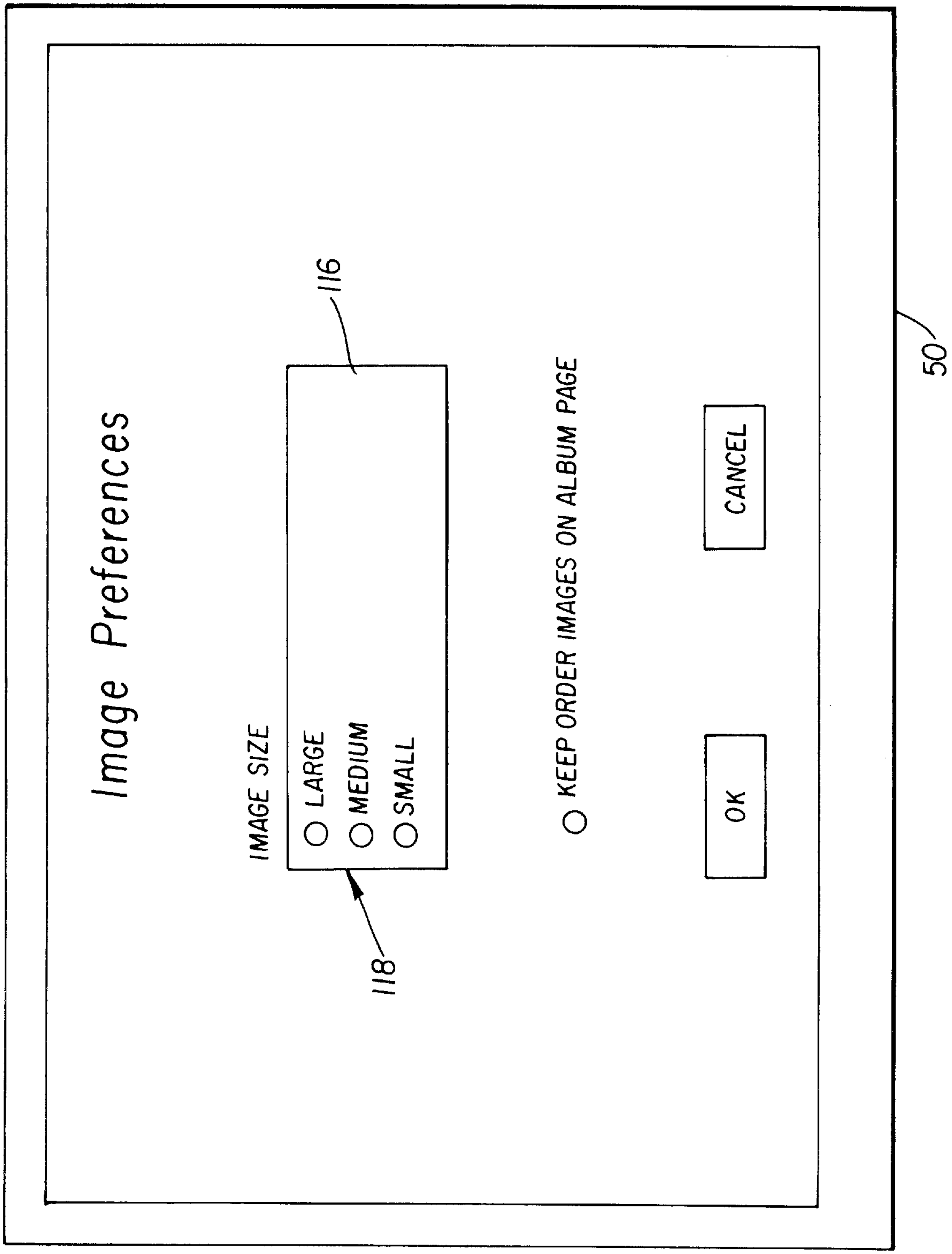
FIG. 10 is the same view as FIG. 5, but shows an image preferences screen of the program.

Sound files cannot be automatically edited to fit image frames, unless image frames have been defined. The program can provide a preference setting for image-type album pages 12*a*, as shown in FIG. 10. In this case, the program can automatically position images from a particular source, such as a camera memory, based upon a user preference for image size. This may result in image file compression. The screen shown has the title "Image preferences" and a box 116 labelled "Image size". The box has radio buttons 118 to designate an initial automatic image size as large, medium, or small. The screen also has a selector which can be set to automatically retain the order of images provided in the memory or in the tally 100, or for the program to rearrange the representations 94 for best fit. The user can also be asked at this time to select a printer resolution (not shown) for images to be printed. This will not be present if the printer 20 used cannot provide this function. The user accepts the selected options by pressing the OK button, or accepts the default settings by pressing the cancel button.

User preferences can be limited to a single session or can be retained from session to session. The preferences provide a starting condition, which the user can keep or change for individual sound files later, as desired. The user can also be provided with a wide variety of editing options, in addition to those discussed here. Image and sound editing options can be provided on an advanced user menu (not shown) or the like. Editing of both image files and sound files can be provided by ancillary software that is linked to the program or usable separately. A wide variety of software is available that provides these functions.

It is preferred that the editing of sound files for album pages not modify or corrupt original sound files. For example, the program can copy sound files, when selected by the user, to a separate directory. Album page related operations are then performed on the copies. Copies can be automatically deleted or saved, as desired. The use of copies of sound files allows the user to always "undo" changes made and to easily maintain an archive of original sound files.

In addition to sound file size, the size of data patches 18 is also a function of bit size, that is, resolution, in the data patch 18, and redundancy of the information presented in the data patch 18. The bit size is selected or preset to be within the capability of the intended reader 22 and printer 20 used in the system 10. For example, the reader 22 could be a desktop scanner with infrared sensitivity or a general purpose handheld bar code reader 22 or a invisible file reading device adapted for use with a particular type of encodement. Redundancy is a fínction of the encodement scheme used and can also be a function of the reader 22. It is unlikely that the printer 20 will be a factor which would limit the resolution achievable in an invisible printing system 10, however, if necessary, the data patch 18 resolution could be adjusted to within the capabilities of an intended printer 20. The program can require inputs characterizing the encodement scheme used and expected reader 22 and printer 20 and can additionally provide default values that set standard resolutions. A user can be given the option to raise or lower resolution as needed, before initial program use, or at each session, or as desired.

Figure 7:
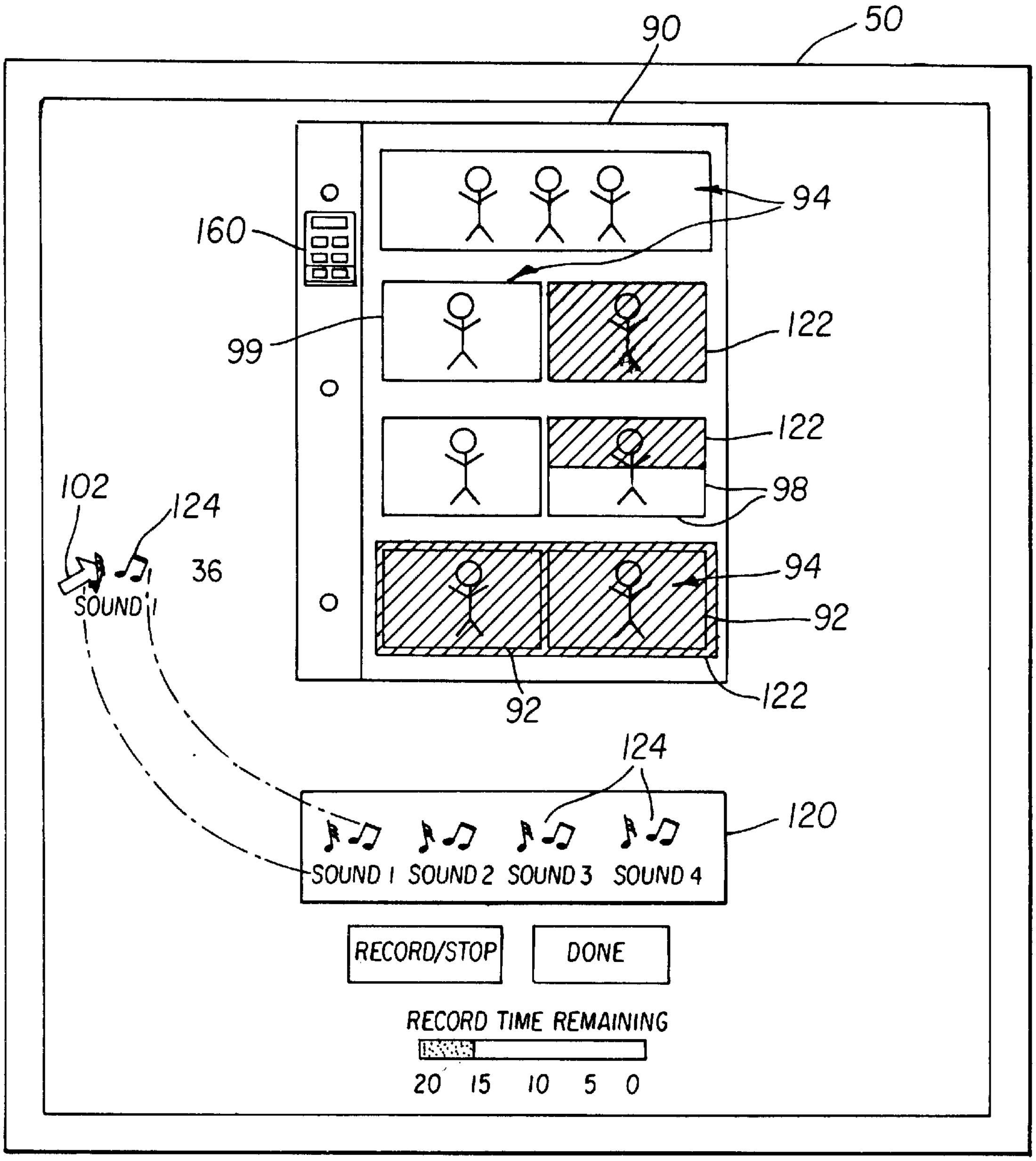
FIG. 7 is the same view as FIG. 5, but shows a sound selection screen of the program.

Referring to FIG. 7, when image frames 92 have been designated, and data files selected, data patches 18 can then be placed on the page proof 90 overlapping respective image frames 92. The screen shows the page proof and an indication of the sound files in the tally 120. The sound files can be represented by a list of file names or small icons or in some other manner. The sound files can be initially in native form, that is, not yet converted into optical encodement files for data patches 18 and can be converted when positioned. This makes it convenient for the user to play sound files prior to placement. The sound files can also be in the form of optical encodement files. These files could be played back after converting. The native and optical encodement sound files can be differently presented on the screen so that the user is aware what is happening during editing. The different sound files can be distinguished by a difference in filenames, but it is preferred that different icons be used to indicate the different file types. To save time at this stage, it may be preferred that the computer program convert all sound files to optical encodement files when added to the tally and keep both native sound files and corresponding optical encodement files available during the course of editing.

For placement over image frames 92 (shown in FIG. 7 as representations 94), sound files as shown in the screen as visible representations of data patches 18, also referred to herein as "data patch depictions 122". (Unless specifically indicated otherwise, data patches 18 described herein are invisible after printing.) Data patch depictions 122 are scaled to the page proof 90 and the image frames 92, at least when the data patch depictions 122 overlap one or more image frames 92 in the page proof 90 shown on the interface 14. The data patch depictions 122 show the geometric size and shape of the data patches 18 relative to the image frames 92 of the page proof 90 and are colored or patterned or otherwise configured so as to be distinguishable from other features on the page proof 90 in some manner. For example, the page proof 90 could include a decorative feature such as border (not shown) surrounding each representation 94 of an image. The data patch depictions 122 (indicated by cross-hatching in FIG. 7) differ from such a border, for example, by use of a different color or texture, so as to be visible when overlapping. The data patch depictions 122 can include words or other indicia to indicate an editing status, such as the words "good", "better", or "best", (not shown) to indicate compression level. Data patch depictions 122 can also additional or alternatively include other words or indicia, such as filenames, if desired.

Depending on status before loading and on how sound files and image files were loaded into the program, there may be an association maintained which links specific sound files with associated image files. This association can be indicated on the interface 14 in some manner, such as grouping a sound file and its associated image file. For example, in FIG. 7, the designator (icon and filename) 124 shown in the tally 120 can instead be shown overlapping an associated representation 94 (this is not illustrated). In this case, when the representation 94 of the image is placed on the page proof 90 during selection of images, the associated sound file designator is shown with the image representation 94. Conversion of the designator to a data patch on the page proof can be manual or can be done automatically or a data patch can be initially used rather than the designator.

When sound files are selected for inclusion on the album page 16, the data patch depiction 122 of the sound file is shown in the interface 14 and is overlapped onto a selected image frame 92 of the page proof. With the associated image files and sound files, previously discussed, the data patch depiction 122 can be overlapped onto the image frame 92 automatically at the same time the image representation 94 is automatically or manually positioned on the page proof 90. Data patch depictions 122 for sound files not associated with image files can be overlapped manually by the user after images have been allocated to the page proof 90. Automatic placement of data patch depictions 122 can be provided, but is not preferred for ordinary use; since it can make the editing process more confusing to the user and little time is required for manual placement of data patch depictions 122. A data patch 18 can be overlapped onto a particular image frame 92 in any well known manner, such as using a mouse to click-and-drag an icon or filename of the sound file. The data patch depiction 122 can be created when the icon or filename reaches the image frame 92 or can grow during dragging or can appear in some other manner. The program can provide that the data patch depictions 122 snap to predetermined locations on the image frames 92 to provide uniform alignment. For example, in the embodiment shown in FIG. 7, the data patch depictions 122 snap to upper left corners of image frames 92.

If the data patch depiction 122 fits within the space encompassed by the image frame 92, then the overlapping step is completed. The user can follow the same procedure for other sound files until the process is complete. If the user attempts to drag a data patch depiction 122 onto a frame which already contains another data patch depiction 122, the original data patch depiction 122 can be replaced or the user can be sent to an edit menu, discussed in detail below. When all of the desired sound files have been overlapped onto image representations 94, the formatting is complete and the sound prints can be made.

Once a data patch depiction 122 has been overlapped onto an image frame 92, the program checks for fit of the data patch depiction 122 within the space encompassed by a respective image frame 92. This calculation uses as inputs: the original size of the sound file, the selected compression algorithm, the preferred maximal compression, the amount of image area available, and the nature if the intended playback device, including code redundancy and the smallest size dot that can be used to encode the data). If the data patch depiction 122 does not fit and the images can have more than one aspect ratio, the program modifies the data patch depiction 122, again overlaps the image frame 92, and again checks for fit of the data patch depiction 122 within the image frame 92. (This procedure is only used if the encodement scheme used allows encodements to have different aspect ratios.) If the data patch depiction 122 still does not fit, then the program attempts to change the size of the data patch 18 based on user preferences. This process can be iterated to step through compression levels and extents of file cut-off, if desired. If the data patch depiction 122 will still not fit, then a message is shown indicating this state. An audio signal can also be given, if desired.

Figure 8:
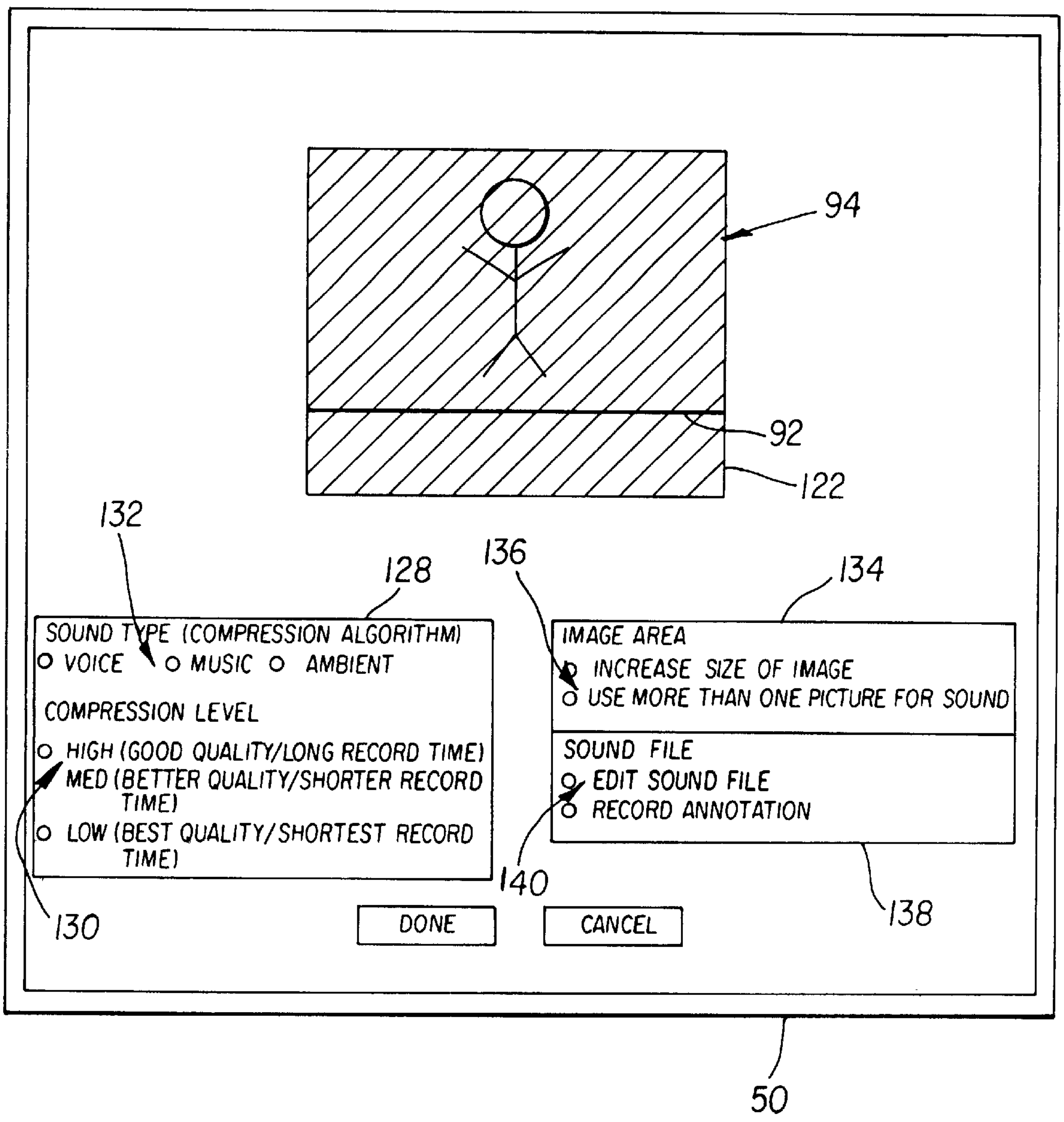
FIG. 8 is the same view as FIG. 5, but shows a sound editing screen of the program.

If a data patch 18 cannot be overlapped within the bounds of an image frame 92, due to the size of the image frame 92 relative to the data patch 18 for a given set of user defined preferences and system parameters, then the user is presented with an editing menu providing an number of options (see FIG. 8). Those options include changing the sound compression algorithm. If the sound preferences were initially limited to higher quality compression levels (lower degrees of compression), the user can be given an option at this time to compress to a smaller file. For example, the user might choose this approach if the recorded sound is either voice or ambient. Different kinds of compression algorithms can also optionally be provided to match different types of sound recording. The user might also decide to sacrifice sound quality so as to allow for a longer recording. When the new compression level is set, the user can direct the program to attempt to fit the modified data patch 18 within the respective image frame 92.

Procedures are often described here in terms of repetitive operations and trial and error matching. It will be understood that this is a matter of convenience. The described procedures can be implemented by the program by calculating, ahead of time, the requirements for fitting the data patches 18 under different conditions and notify the user of choices during the course of editing. The user can view the amount by which a data patch 18 is oversize, and in addition, hear the effects of selected changes on the sound, and try different effects until a satisfactory result is achieved. The final resulting sound quality will also be effected by the playback apparatus and audio system 10 used, but the sound preview can be made to be representative of the expected final output based on the initial user inputs.

The user can be given the option of resizing the image on the album page 16. This can be done using a menu or the like or by dragging the comer or edge of an image representation 94. Since the nature of the album page 16 under preparation is known to the program, the user is only permitted to modify image size with appropriate types of album pages 16.

The user can be given the option of editing the sound file itself. Easily usable editing would include cropping a front or back end or one or more intermediate portions or some combination of different parts of the file. An option can also be provided to allow the user to cut the sound file in parts for association with different images and to duplicate the sound file, with or without additional editing. The user can also resample the sound file at a different sampling frequency. The editing can be performed using an editing menu provided by the program. More complex editing can also be optionally made available.

Figure 9:
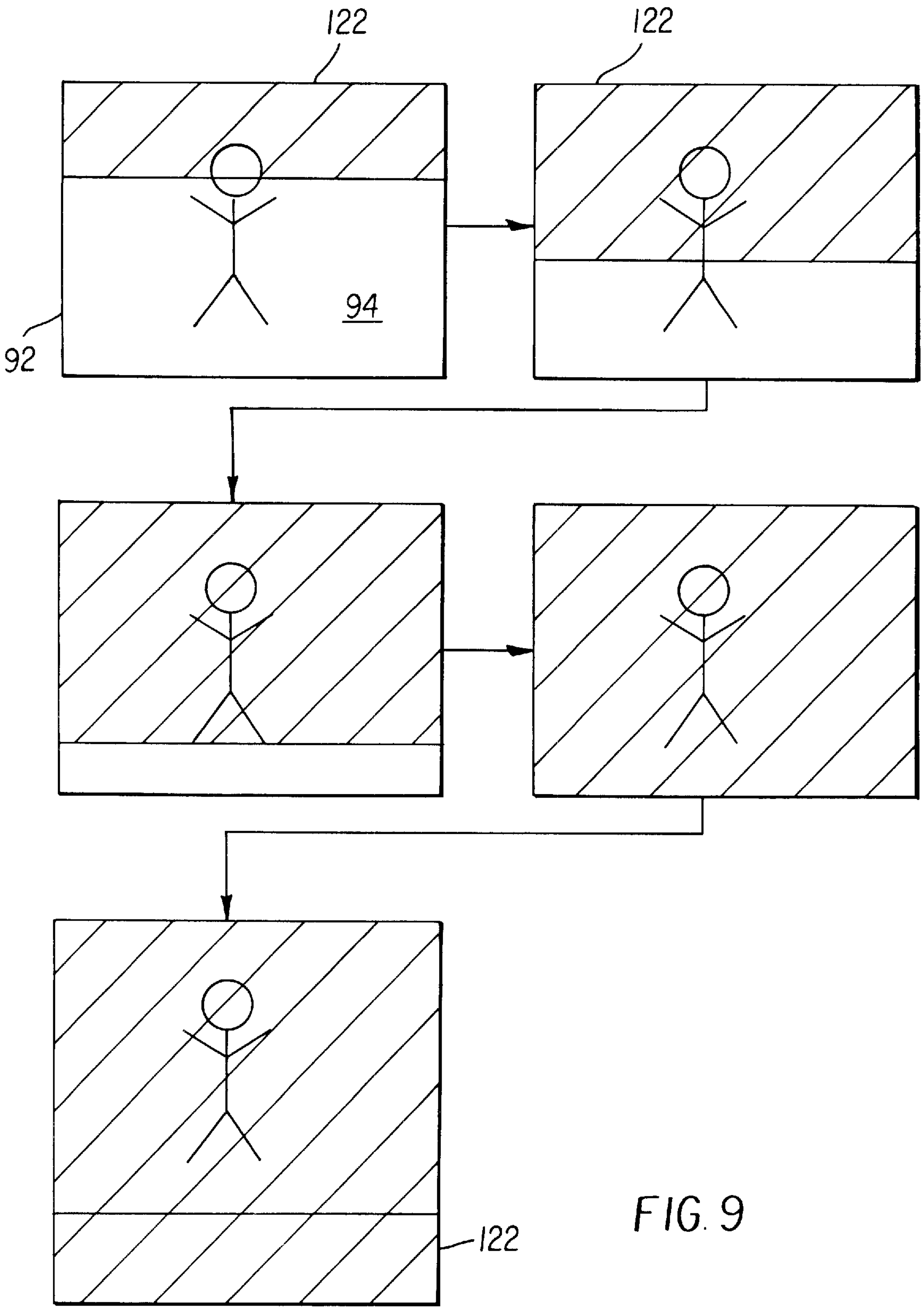
FIG. 9 is a iagram of changes in the recording indicator shown n the screen of FIG. 8, during recording.

The user can be given the option of recording a new sound file. This is also an option for the user, if no sound file has been earlier recorded for one or more images. The editor 12 can include a microphone 60 on which the user can record the sound file. This file can be recorded without concern for file length and sound file editing can then be performed on the file as previously described. If a sound file is to be recorded for overlapping a particular image frame 92, then it is preferred that the program provide an indication to the user of the available space for the data patch 18 of a sound file as the sound file is recorded. The program calculates the available time for recording and provides an indication to the user. This indication can take the form of a countdown or graphical meter; but preferably shows a data patch 18 that is superimposed on the respective image frame 92, as shown in FIGS. 8–9. The data patch 18 grows during the recording until the data patch 18 reaches or exceeds the size of the image frame. The screen of the embodiment shown in FIG. 8 includes a box 128 with radio buttons 130 for high, medium, and low compression levels. The box 128 also includes a second set of radio buttons 132 for different compression algorithms optimized for voice, music, and ambient sound. Another box 134, labelled "Image Area", has radio buttons 136 for increasing the size of the image to match the sound file recorded and, alternatively, for extending the sound file beyond the image frame. (This is labelled "Use More than One Picture for Sound".) Another box 138 has radio buttons 140 for alternatively recording an annotation and editing a sound file. The latter also allows use of these features for editing existing sound files. With or without an indication, the recording can optionally stop automatically when the data patch 18 reaches the size of the respective image frame 92. The user can also be given the option of rerecording or supplementing sound files that have data patches 18 that are smaller than the available space on the image frame 92.

Referring to FIG. 7, the user is given the option of resizing data patches 18 beyond the boundary of a respective image frame 92. The user can choose to overlap printable space on the album page 16 that is not occupied by an image. The user can also choose to overlap more than one image with a single data patch 18. This approach recognizes that, in many uses, the images to be placed on an album page 16 will not start with associated sound files. This approach also recognizes that even if every image has an associated sound file, users are unlikely to want to present every sound file on an album page 16 with associated images. For example, some sound files of ambient sounds may be unintelligible when played back. Users are also likely to want to keep some sound files that are of excess size, even if other sound files must be displaced from an album page 16 to accomplish this. In practical use, it likely that many images will start out with no associated sound file. Overlapping such images with the sound files from other images limits the users ability to add sounds, but is otherwise not a detriment.

Figure 21A:
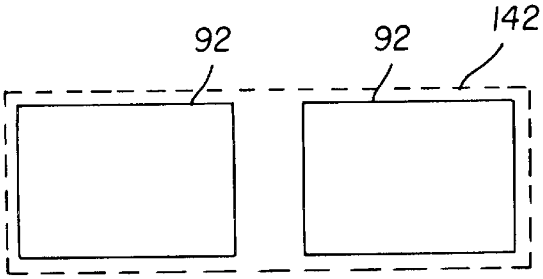
FIGS. 21*a*–21*c* are diagrams of revised frames of the sound selection screen of FIG. 7.
Figure 21B:
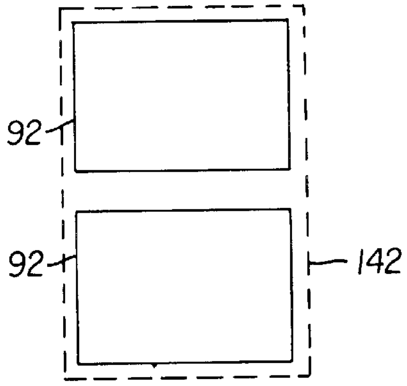
Figure 21C:
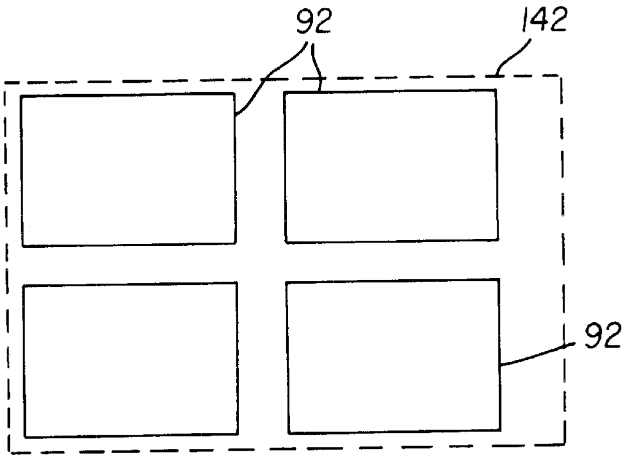

The program can provide for automatic overlap, where space is available or can leave the overlapping of multiple images solely to the user, or can combine automatic and manual procedures. In either case, the program determines a revised frame 142 based on user input or previously set program parameters and calculates the fit of the respective data patch 18 within the revised frame 142. Examples of some revised frames are shown in FIGS. 21 *a–c*. If the data patch 18 fits, then the program overlaps the data patches 18 onto the respective revised frame 142 and displays the results to the user. If the data patch 18 does not fit, then procedures can be followed in same manner as with non-fit in an image frame 92. The user can also be given options on how to proceed, if the user attempts to map one data patch 18 onto another. The options can include deleting the earlier positioned data patch 18 or rearranging images or both images and associated data patches 18 to best utilize available space. The options can include resizing some images. It may be desirable to automate these procedures. Algorithms and programming routines for achieving a best fit of two-dimensional objects on a plane are well known to those of skill in the art.

It is preferred that when data patches 18 are overlapped onto multiple images, each data patch 18 retain a standard anchor site (indicated by a "+" in FIGS. 21*a*–21*c*) with respective to the associated image. This makes manual resizing easier and also makes it somewhat easier to read images after printing. For example, the user can resize a data patch 18 by clicking and dragging a data patch depiction 122 that grows in directs outward from the anchor point.

An alternative approach is to include visible fiducials 144 on the album page 16 to mark the location of the invisible data patches 18. An example of a visible fiducial 144 is shown in FIG. 19. This latter approach also makes it easier to read multiple data patches 18 overlapped on a single image, but has the shortcoming that the fiducials are visible and can be distracting to the viewer of, the images and artistically unappealing.

A third alternative is the use of a keyed data-and-print album page 146 as shown in FIG. 18. The keyed album page 146 can be any of the types earlier discussed. The keyed album page 146 has a support or receiver 148, which has a front face 150 and an opposed rear face 152. The receiver 148 has a main portion 26 and, in currently preferred embodiments, a binding edge 24 that is offset from the main portion 26. The binding edge 24 provides an area that gripped by a binding 28 or cover, such that multiple album pages 16 can be held together within the binding 28 to form an album. The binding edge 24 can include features required by a particular binding 28, such as holes for binder rings.

One or both of the faces have a continuous or divided up main portion 26. The main portion 26 can consist of an array of pockets 32 separated by dividers 38. The main portion 26 can also be continuous, as in image-type album pages 16*a*. The keyed data-and-print album page 146 has images allocated to the main portion 26. With image-type album pages 16, an array or grouping of images are printed on the main portion 26. With holder-type album pages 16, the printed sheets 34 of the images may or may not yet be present in the album page 16. The dividers 38 or the printed images 19 define an array of image spaces 156 that correspond to the image frames 92 of the page proofs 90.

Invisible data patches 18 are imprinted on the main portion 26. Referring now particularly to FIG. 20, the data patches 18 each at least partially overlap at least one of the image spaces 156. The data patches 18 each have a margin 158. The margins 158 are each in registration with an image space 156, in the same manner as the earlier discussed registration of data patches and image frames. This registration can be an immediate overlap or can be a slight offset of a margin from a respective image space boundary 162. In any case, the margin 158 is perceptively closer to a respective boundary 162 than to any other image space 156. As was earlier discussed in relation to page proofs 90, the data patches 18 can be arranged such that one or more of the image spaces 156 is free of overlap by the data patches 18. The data patches 18 can also be arranged such that one or more of the data patches 18 overlaps two or more of the image spaces 156, in the same manner as earlier discussed in relation to page proofs 90.

In this alternative, a visible key 160 is imprinted on the receiver 148. The key 160 visibly indicates the relative geometry of the boundaries 162 of the image spaces 156 and the margins 158 of the data patches 18. For ease of use, it is highly preferred that the key 160 is on the same face 150 or 152 of the album page 146 as the respective data patches 18. So as to not detract from the appearance of the album pages 146, the key 160 can be reduced in size relative to the actual boundaries 162 and margins 158 and spaced from the main portion 26. In the embodiments shown in FIGS. 7 and 18, the key 160 is imprinted on the binding edge 24 and reproduces the geometry of the boundaries 162 and margins 158 at a reduced size. In other words, the key has a first set of boxes or other geometric FIGS. 161 that match the shapes and relative locations of the image frames and a second set of boxes or other geometric FIGS. 163 that match the shapes and relative locations of the data patches. The two sets 161,163 can be seen simultaneously along with the relative spatial relationships of respective members of the two sets.

After editing, the album page 16 is printed, either locally by the user, or remotely at a separate printing facility. The discussion herein is generally directed to ink jet printing, but the manner of printing the album pages 16 is not critical. Other printing methods as also suitable for local or remote printing. The process can be thermal printing, electrophotographic printing, offset printing, laser printing, screen printing, or any other printing method. It is expected that local printing would in most cases be performed by ink jet printing. In a commercial printing system 10, greater cost effectiveness may be possible with other methods. Album page 16 material may also differ. For example, solvent based inks are often used in commercial printing.

The user can order remote printing of album pages 16 in any manner, including supplying sound files and specifying album pages 16 when photographic film is submitted for processing or other photofinishing. The program can also send a printing request along with necessary digital files to a remote printing facility across the internet or another network.

Figure 13:
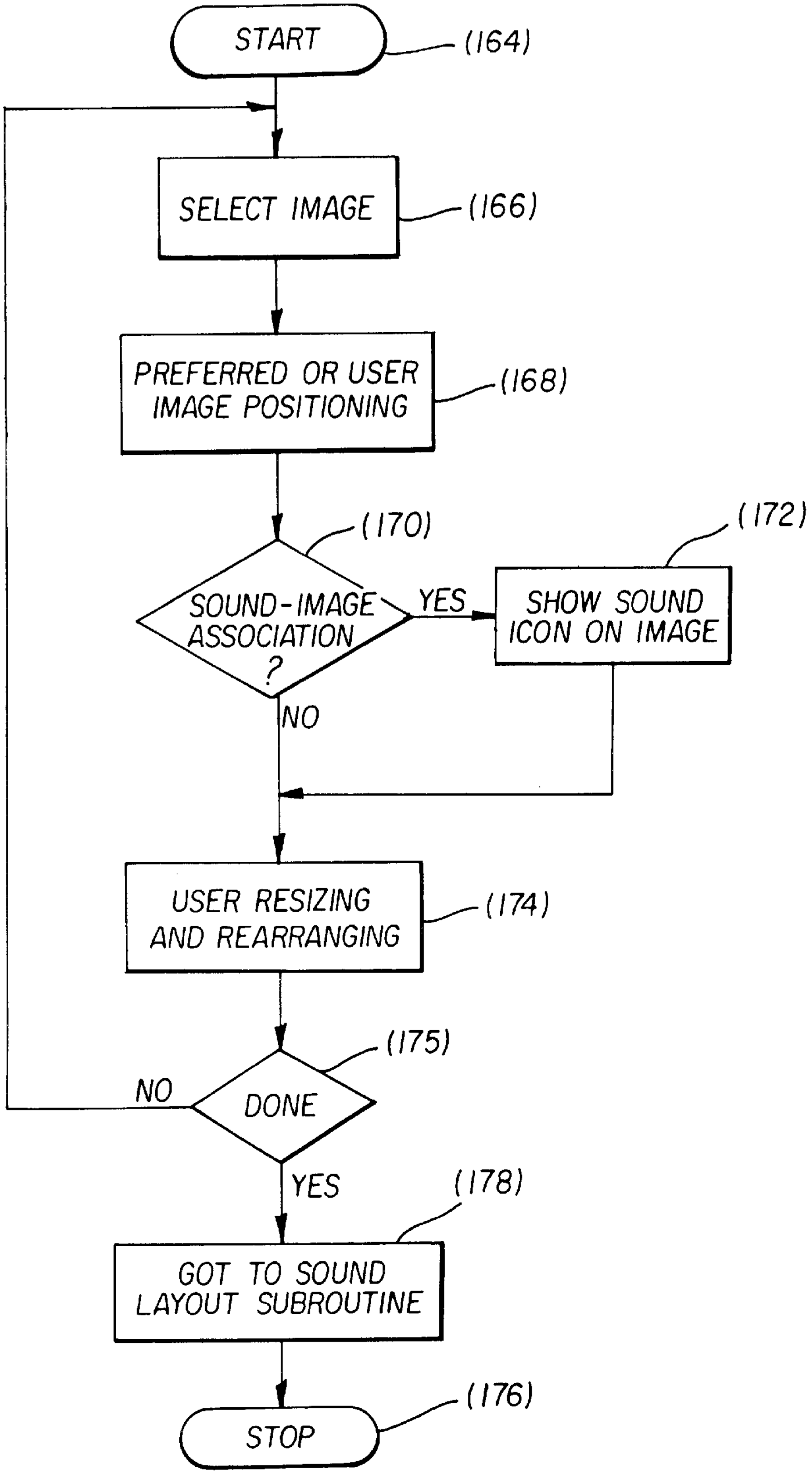
FIG. 13 is a flowchart of the image layout subroutine of the program of FIG. 12.

FIG. 13 illustrates the image layout subroutine of the computer program. After the subroutine starts (164), the images are selected (166) and are positioned (168) automatically based on preferences or by the user. The program checks (170) for sound-image association and, if so, shows (172) the sound icon or the like 124 on the representation 94 of the image. The user resizes and rearranges (174). Image selection continues until the user signals completion (175) or the program reaches a default, such as filling all the image frames. The program stops (176) the image layout subroutine and goes (178) to the sound layout subroutine.

Figure 14:
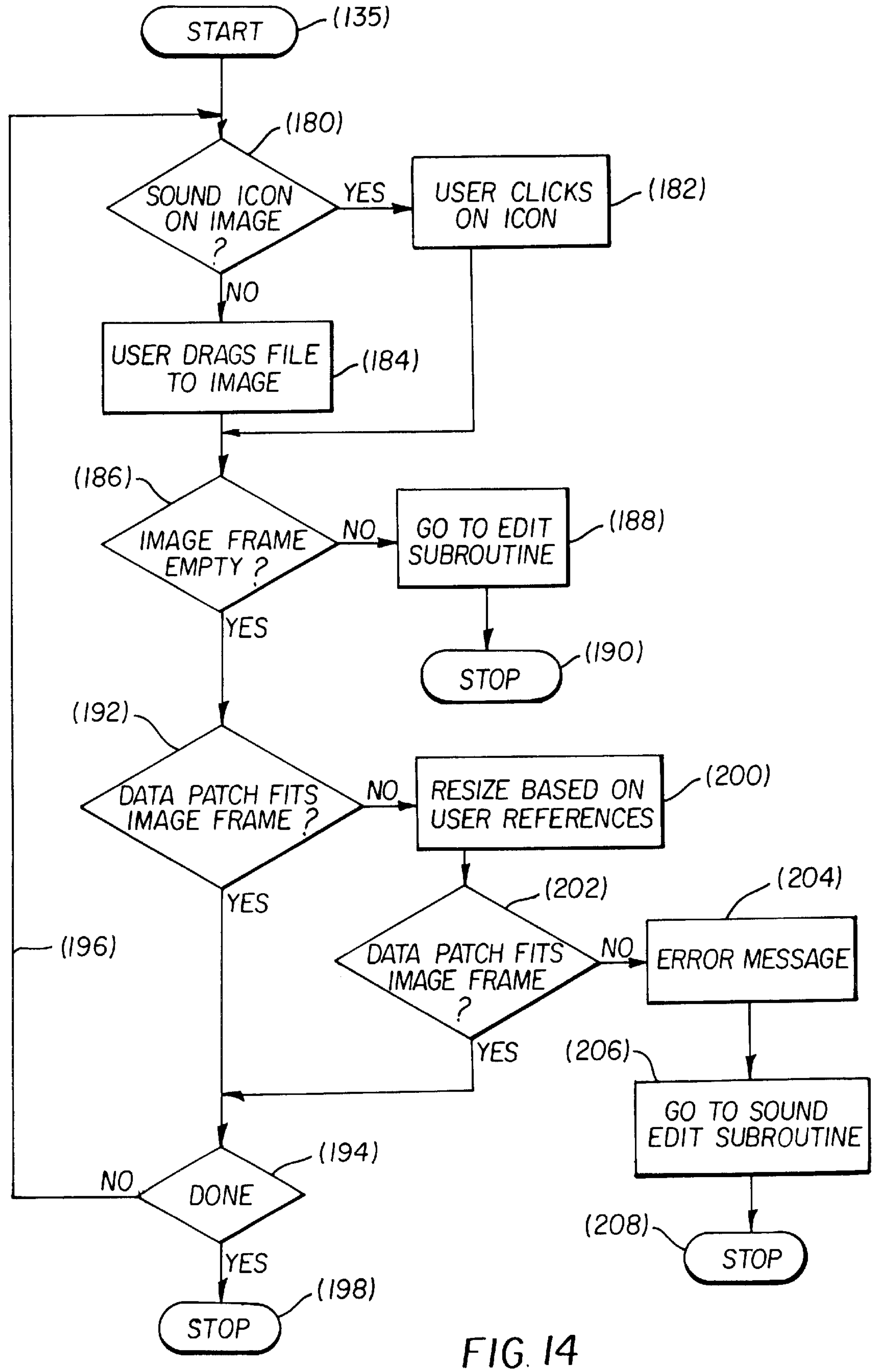
FIG. 14 is a flowchart of the sound layout subroutine of the program of FIG. 12.

FIG. 14 illustrates the sound layout subroutine of the program. The subroutine starts (135) and the user is given the choice (180) of clicking (182) on the icon or other designator of an associated file or of dragging (184) a sound file designator from the tally to one of the representations of the images. The program determines (186) if the selected image frame already has another data patch present. If the image frame already has a data patch present, then the program goes (188) to the sound edit subroutine and the sound layout subroutine stops (190). If the image frame does not have a data patch present, then the program calculates (192) whether the data patch fits in the image frame. If the data patch fits, the program determines (194) whether sound layout is done, in the same manner as discussed above in relation to image layout, and repeats (196) for another image or stops (198). If the data patch does not fit, then the program resizes (200) the sound file in accordance with user preferences. The program again calculates (202) whether the data patch fits in the image frame. If the data patch fits, the program determines (194) whether sound layout is done, in the same manner as discussed above. If the data patch does not fit, then the program provides (204) an error message and goes (206) to the sound edit subroutine, and the sound layout subroutine stops (208).

Figure 15:
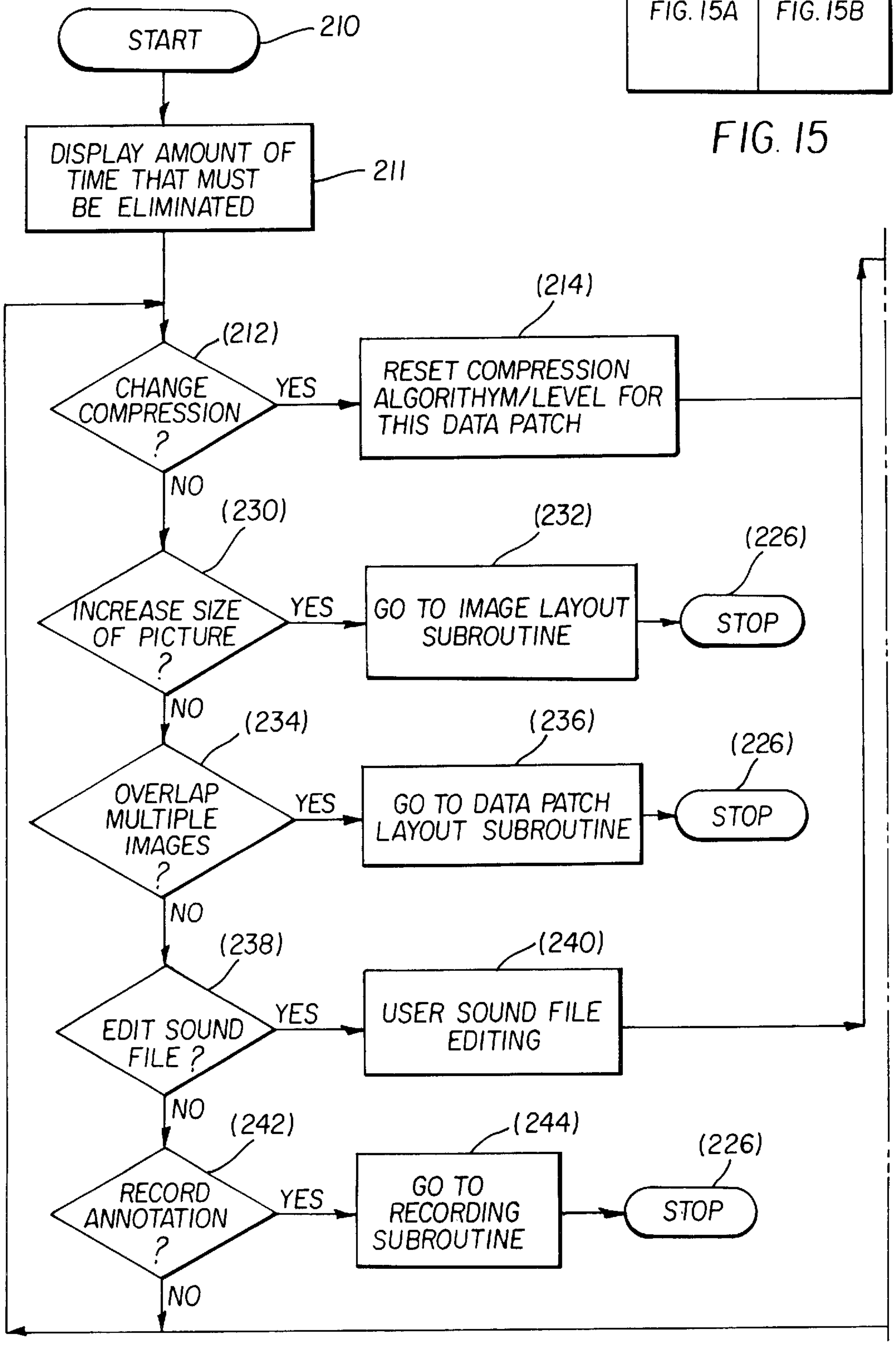
FIG. 15 is a flowchart of the sound editing subroutine of the program of FIG. 12.
Figure 15:
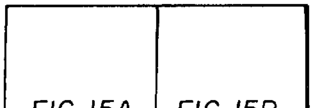
Figure 15B:
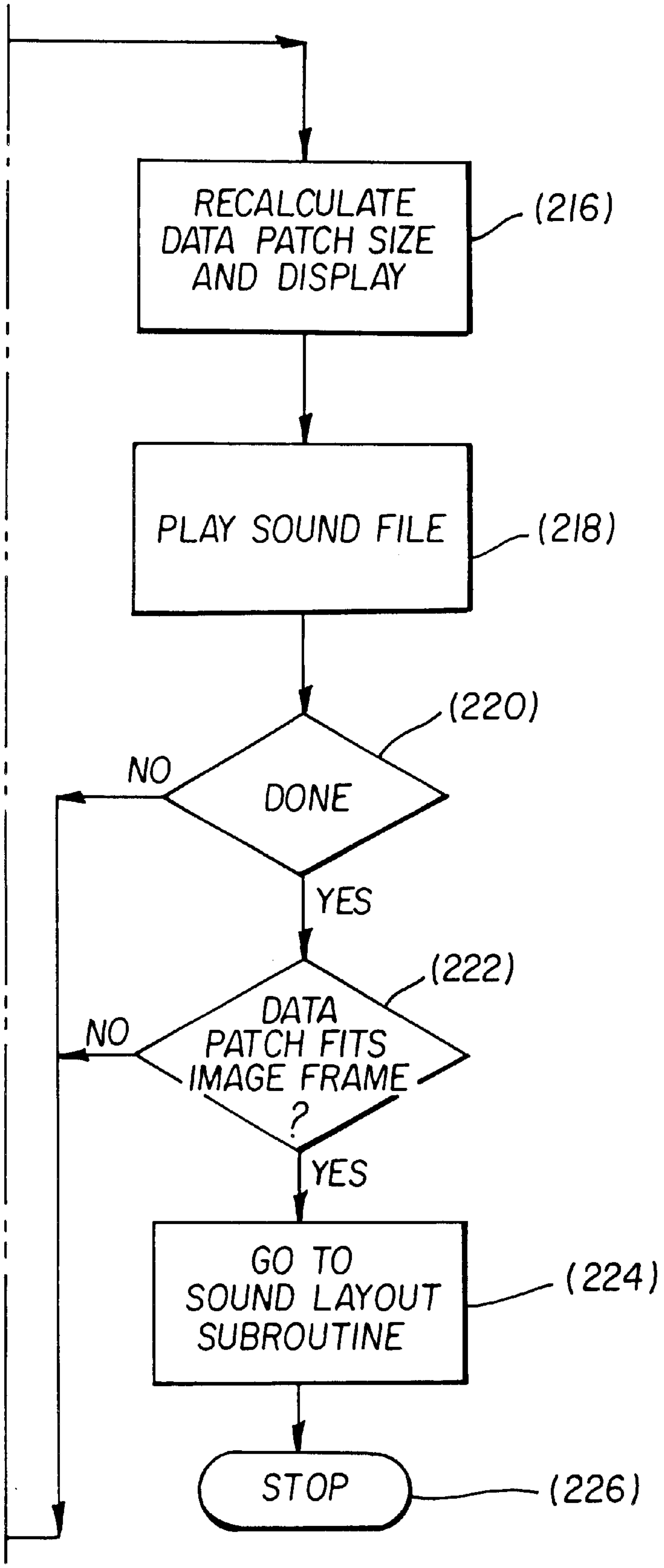

FIG. 15 illustrates the sound editing subroutine of the program. The subroutine starts (210) and the screen (211) shows an indication of the amount of time that must be eliminated. The type of indication used is not critical. For example, alphanumeric characters or symbols or a graphical representation like the one shown in FIG. 8 can be used. The user is then queried as to various procedures to accommodate the sound file. This list is not exhaustive. Additional procedures and other changes can be provided. For example, the order of queries could be changed and the manner of looping back could vary.

The user is first queried (212) as to whether the level of compression or the compression algorithm of the sound file should be changed. This is indicated as a single query in FIG. 15, but could be a set of different queries. If the user indicates yes, then the program resets (214) the compression level or algorithm. The program then recalculates (216) the data patch size and displays an indication of that size. The program then plays back (218) the altered sound file to determine if the change is acceptable to the user. The program queries (220) if the user is done. If the alteration is acceptable, then the user accedes to the change and the program compares (222) the data patch to the available space. If the data patch fits, then the program goes (224) to the sound layout subroutine and the sound editing subroutine stops (226). If the data patch does not fit, then the program loops (228) back and the user is again queried as to procedures to accommodate the sound file. The query (212) as to compression can be repeated for available levels and algorithms. Another query (230) is whether the size of the representation, under the data patch, should be changed. If the user indicates yes, then the program goes (232) to the image layout subroutine and the sound editing subroutine stops (226).

Another query (234) is whether the data patch should overlap multiple representations of images. If the user indicates yes, then the program goes (236) to the data patch layout subroutine and the sound editing subroutine stops (226).

Another query (238) is whether the sound file is to be edited. If the user indicates yes, then the program provides (240) for user editing of the sound file. After editing is completed, the user recalculates the data patch size (216) and continues on in the manner described above for the compression change query.

Another query (242) is whether an annotation or replacement sound file is to be recorded. If the user says yes, then the program goes (244) to the recording subroutine and the sound editing subroutine stops (226).

Figure 16:
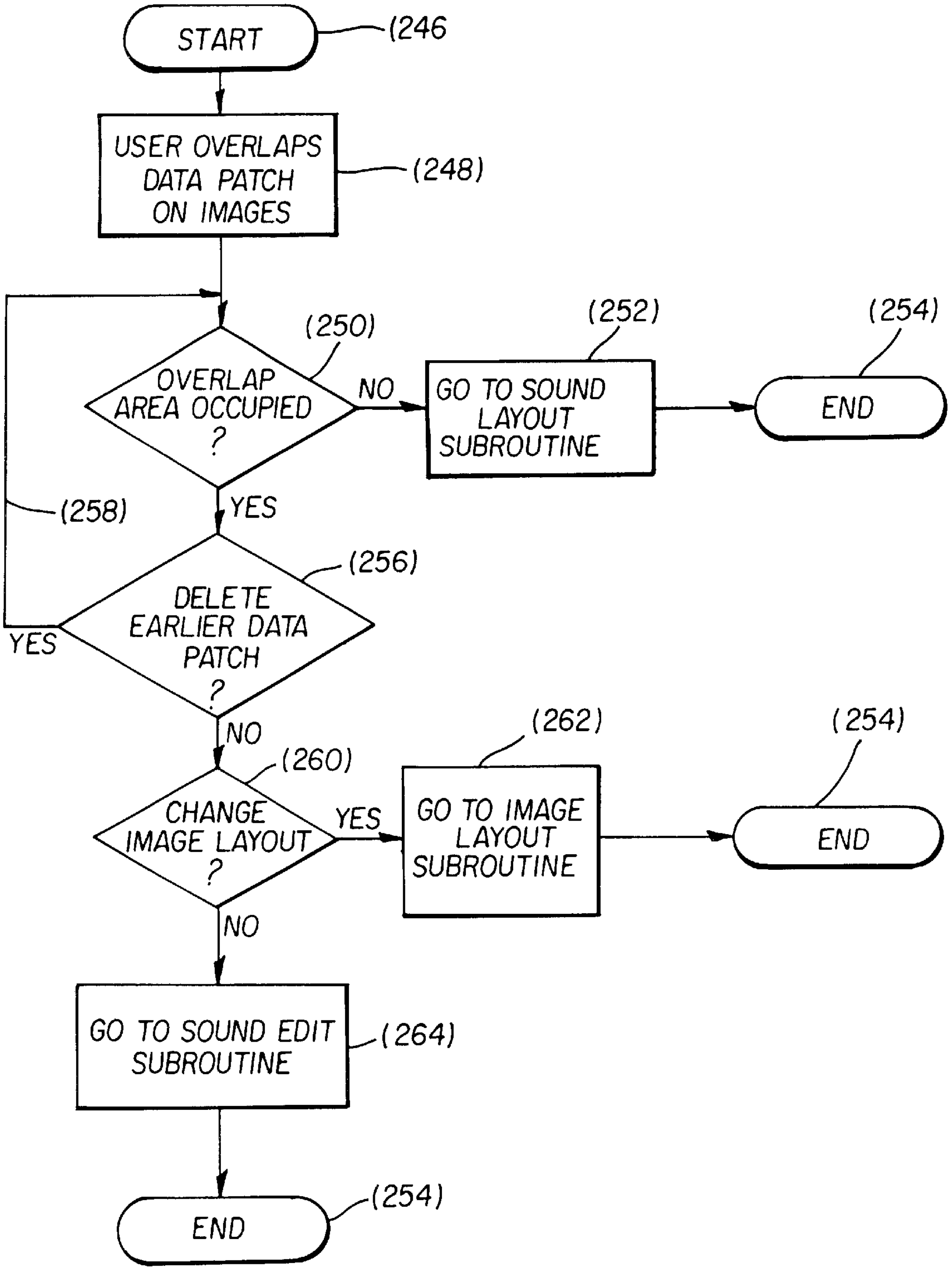
FIG. 16 is a flowchart of the sound recording subroutine of the program of FIG. 12.

FIG. 16 illustrates the data patch layout subroutine. The subroutine starts (246) and user is provided (248) the opportunity to change the overlap of a data patch. When this is completed, the program checks (250) to determine if the overlap area is already occupied by another data patch. If not, then the program goes (252) to the sound layout subroutine and the data patch layout subroutine stops (254). If the overlap area is already occupied, then the program queries (256) the user as to whether to delete the earlier placed data patch. If the earlier placed data patch is to be deleted, then the subroutine loops (258) back as necessary for any additional earlier placed data patches. If the earlier placed data patch is not to be deleted, then the program queries (260) as to whether the layout is to be changed. If the user indicates yes, then the program goes (262) to the image layout subroutine and the data patch layout subroutine stops (254). If the user indicates no, then the program goes (264) to the sound edit subroutine and the data patch layout subroutine stops (254).

Figure 17:
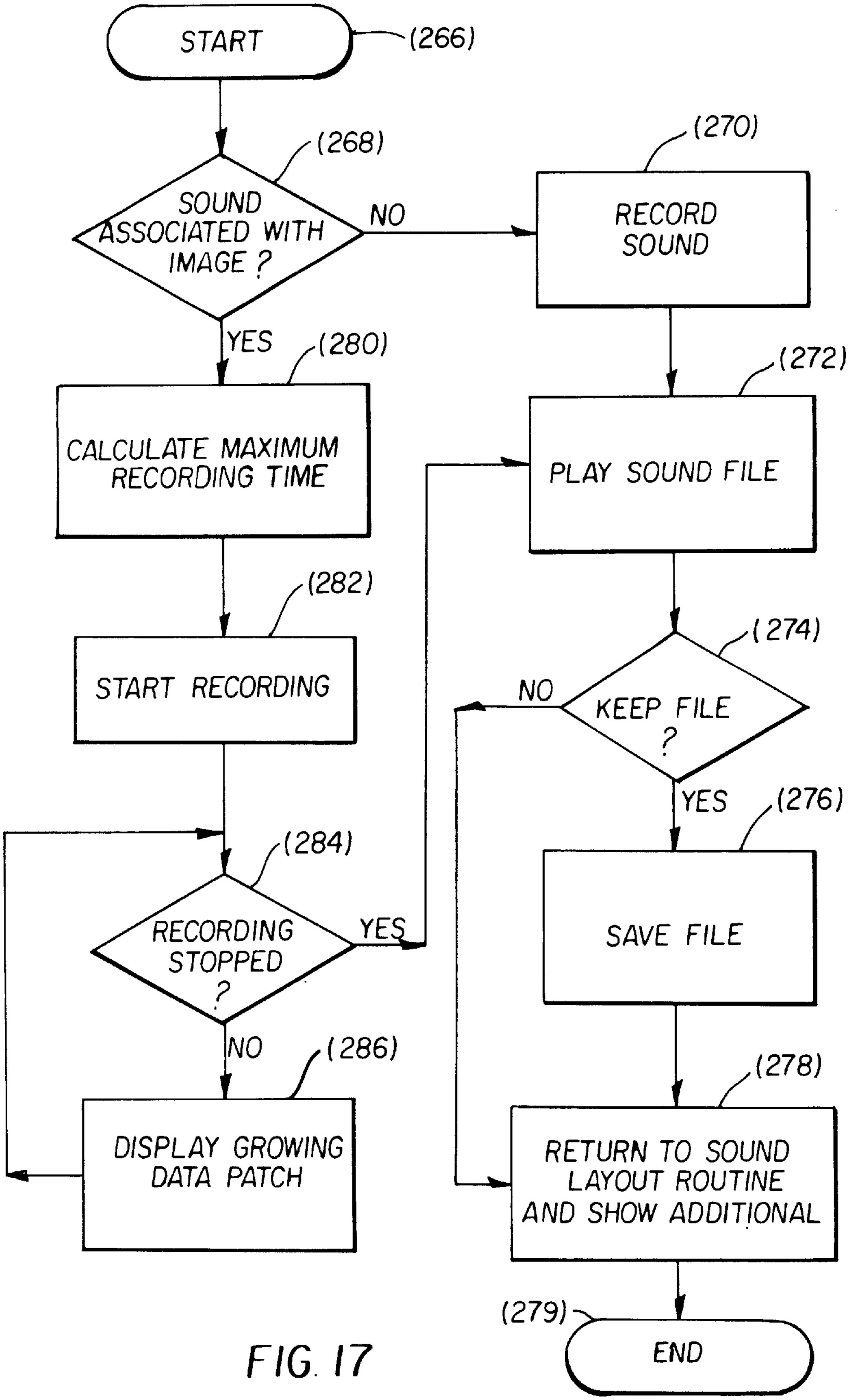
FIG. 17 is a flowchart of the data patch layout subroutine of the program of FIG. 12.

FIG. 17 illustrates the recording subroutine. After the subroutine starts (266), the program checks (268) whether the sound file to be recorded is to associated with one of the images. If the sound file is not to be associated with an image, then the sound file is recorded (270) and played back (272). The user is then queried (274) as to whether the file should be saved, and the file is saved (276) if so indicated. The program then goes (278) to the sound layout subroutine and the recording subroutine stops (279). In the sound layout subroutine, the additional sound file is shown in the tally. If the sound file is to be associated with an image, then the image must be determined. The user can indicate the image or this can occur automatically if the user invoked the recording sound routine from one of the other subroutines, after selecting one of the images. The program then calculates (280) the maximum recording time and recording is started (282) when indicated by the user. As recording continues (284), an indication is displayed (286) that the sound file is growing. The indication is preferably in the form of a representation of the image and the growing sound data patch overlying the image, as shown in FIG. 9. When recording is stopped, the sound file is played (272) back and the user is queried (274) as to whether to save the file. The file is saved (276) if desired, and, in either case, the program goes (278) to the sound layout subroutine and the recording subroutine stops (279). In the sound layout subroutine, the additional sound file is shown with the representation of the associated sound file.

Figure 22:
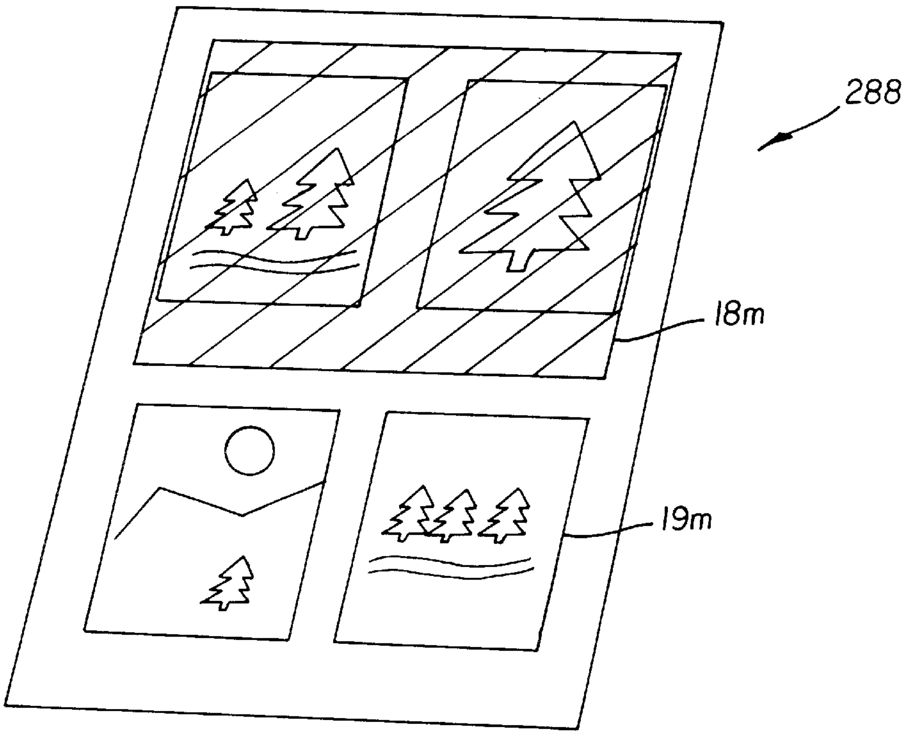
FIG. 22 is a semi-diagrammatical view of a layout page.

In an embodiment directed to the individual user, the program provides the user with assistance in printing the album page 16. During initial album page selection, the program can limit the selections available or alert the user if the selected printer 20 will not accept particular sizes of album page receiver. When the user has completed editing of the page proof 90 and starts the printing process, the program gives the user an option of printing a layout page 288, shown in FIG. 22, which visibly illustrates the relative positions of the image spaces and data patches 18 on the intended album page 16. The layout page can reproduce the final album page on cheaper paper or the like, but it is highly preferred that the layout page have visibly printed versions of the images 19 and data patches, but that both data patches and images be greatly simplified to make the overlap of data patches and images more readily apparent and to reduce costs of inks or other imaging materials. For example, as shown in FIG. 22, simplified data patches **18*m* can be reproduced as cross-hatch patterns or colored areas rather than encodements and simplified images 19*m* can be reproduced in very low resolution gray scale images or line drawings. The printing of the layout page can make use of conventional paper and the ordinary visible inks or other imaging materials provided by the selected printer 20. Filenames or identifying indicia or the like can also be provided. For example, software is commonly available to locate edges in digital images. Images can be shown as black edges against a white background overlapped by colored areas indicating data patches 18. Further details or information can be added, if desired. For example, readable data patches 18** in visible ink can be provided over simplified images.

The layout page gives the user an inexpensive final check before printing the album page 16 itself. For example, the layout sheet can be quickly held behind a transparent album page 16 receiver to confirm that the right page proof 90 was selected and that the arrangement of images and data patches 18 does not extend beyond printable areas of the receiver or onto trademarks or other preprinted regions.

The program can instruct the user on setting up the printer 20 for album page 16 printing. For example, with an ink jet printer 20, the program can check for an appropriate ink cartridge and, if necessary, instruct the user to change to the required cartridge. The invisible ink cartridge can be provided as a full time component of a printer 20 or can be usable in alternation with a visible ink cartridge. In the latter case, it is preferable that the printer 20 be able to detect which cartridge is present using an indicator, such as notch positioned so as to align with a switch. The program can also give the user guidance as to the correct orientation for album page 16 feeding in the selected printer 20.

The invention has been described in detail with particular reference to certain preferred embodiments thereof, but it will be understood that variations and modifications can be effected within the spirit and scope of the invention.

What is claimed is:

1. A keyed data-and-print album page comprising:

a receiver having an array of image spaces, a plurality of invisible printed encodements, and a visible key, said image spaces each having a visible boundary, said encodements each having a margin, said encodements each at least partially overlapping at least one of said image spaces, said margins each being in registration with at least one of said boundaries, said key indicating relative geometry of said boundaries and said margins.

2. The album page of claim 1 wherein said key is spaced from said image spaces.

3. The album page of claim 1 wherein said key reproduces the geometry of said boundaries and said margins at a reduced size.

4. The album page of claim 1 wherein at least one of said encodements overlaps at least two of said image spaces.

5. The album page of claim 4 wherein at least one of said image spaces is free of overlap by said encodements.

6. The album page of claim 1 wherein at least one of said image spaces is free of overlap by said encodements.

7. The album page of claim 1 wherein said receiver has a binding edge and a main portion offset from said binding edge and said key is disposed on said binding edge and said image spaces are disposed in said main portion.

8. The album page of claim 1 wherein said encodements are two-dimensional bar codes.

9. The album page of claim 8 wherein said encodements are sound recordings.

10. The album page of claim 1 wherein visible images are printed in said image spaces.

11. The album page of claim 1 wherein said receiver is a holder having a plurality of pockets, each said pocket defining a respective said image space.

12. An asembly comprising the album page of claim 11 and a plurlity of printed sheets disposed in respective said pockets.

13. A keyed data-and-print album page comprising:

a receiver having a grouping of visible printed images, a plurality of invisible printed encodements, and a visible key, said images each having a boundary, said encodements each having a margin, said encodements each at least partially overlapping at least one of said images, said margins each being in registration with at least one of said boundaries, said key being spaced from said images, said key indicating relative geometry of said boundaries and said margins.

14. The album page of claim 13 wherein said key reproduces the geometry of said boundaries and said margins at a reduced size.

15. The album page of claim 13 wherein at least one of said encodements overlaps at least two of said images.

16. The album page of claim 15 wherein at least one of said images is free of overlap by said encodements.

17. The album page of claim 13 wherein at least one of said images is free of overlap by said encodements.

18. The album page of claim 13 wherein said receiver has a binding edge and a main portion offset from said binding edge and said key is disposed on said binding edge and said images are disposed in said main portion.

19. The album page of claim 13 wherein said encodements are two-dimensional bar codes.

20. The album page of claim 19 wherein said encodements are sound recordings.

21. A keyed data-and-print album page comprising:

a receiver having a front face and an opposed rear face, said receiver having an array of visible printed images on said front face, said images each having a boundary, said receiver having a plurality of invisible, two-dimensional encodements printed on said front face, said encodements each having a margin, said encodements each at least partially overlapping at least one of said images, said margins each being aligned with at least one of said boundaries, said receiver having a printed key disposed on said front face, said key illustrating, at a reduced size, said boundaries and the locations of said encodements.

* * * * *